US011861927B1

(12) United States Patent
Banerjee et al.

(10) Patent No.: US 11,861,927 B1
(45) Date of Patent: Jan. 2, 2024

(54) GENERATING TRACKLETS FROM DIGITAL IMAGERY

(71) Applicant: Amazon Technologies, Inc., Seattle, WA (US)

(72) Inventors: Prithviraj Banerjee, Redmond, WA (US); Leonid Pishchulin, Seattle, WA (US); Jean Laurent Guigues, Seattle, WA (US); Gerard Guy Medioni, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/582,985

(22) Filed: Jan. 24, 2022

Related U.S. Application Data

(63) Continuation of application No. 15/717,792, filed on Sep. 27, 2017, now Pat. No. 11,232,294.

(51) Int. Cl.
*G06V 40/10* (2022.01)
*G06V 10/426* (2022.01)
(Continued)

(52) U.S. Cl.
CPC .......... *G06V 40/10* (2022.01); *G06F 18/2411* (2023.01); *G06F 18/2415* (2023.01);
(Continued)

(58) Field of Classification Search
CPC ............. G06K 9/00362; G06K 9/6277; G06K 9/00771; G06K 9/6269; G06K 9/469;
(Continued)

(56) References Cited

U.S. PATENT DOCUMENTS 6,154,559 A 11/2000 Beardsley
7,050,624 B2 5/2006 Dialameh et al.
(Continued)

FOREIGN PATENT DOCUMENTS

CN 104778690 B 6/2017
EP 1574986 B1 7/2008
(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.
(Continued)

*Primary Examiner* — Bobbak Safaipour
(74) *Attorney, Agent, or Firm* — Athorus, PLLC

(57) ABSTRACT

Actors may be detected and tracked within a scene using multiple imaging devices provided in a network that are aligned with fields of view that overlap at least in part. Processors operating on the imaging devices may evaluate the images using one or more classifiers to recognize body parts within the images, and to associate the body parts with a common actor within the scene. Each of the imaging devices may generate records of the positions of the body parts and provide such records to a central server, that may correlate body parts appearing within images captured by two or more of the imaging devices and generate a three-dimensional model of an actor based on positions of the body parts. Motion of the body parts may be tracked in subsequent images, and the model of the actor may be updated based on the motion.

20 Claims, 53 Drawing Sheets

(51) Int. Cl.
*G06V 20/52* (2022.01)
*G06F 18/2411* (2023.01)
*G06F 18/2415* (2023.01)
*H04N 7/18* (2006.01)
*G06T 7/73* (2017.01)
*G06V 10/56* (2022.01)
*G06V 10/75* (2022.01)

(52) U.S. Cl.
CPC ............ *G06V 10/426* (2022.01); *G06V 20/52* (2022.01); *G06T 7/74* (2017.01); *G06V 10/56* (2022.01); *G06V 10/751* (2022.01); *H04N 7/181* (2013.01)

(58) Field of Classification Search
CPC ...... G06K 9/4652; G06K 9/6202; G06T 7/74; H04N 7/181
See application file for complete search history.

(56) References Cited

U.S. PATENT DOCUMENTS

| | | | |
|---|---|---|---|
| 7,225,980 B2 | 6/2007 | Ku et al. | |
| 7,949,568 B2 | 5/2011 | Fano et al. | |
| 8,009,863 B1 | 8/2011 | Sharma et al. | |
| 8,009,864 B2 | 8/2011 | Linaker et al. | |
| 8,175,925 B1 | 5/2012 | Rouaix | |
| 8,189,855 B2 | 5/2012 | Opalach et al. | |
| 8,285,060 B2 | 10/2012 | Cobb et al. | |
| 8,369,622 B1 | 2/2013 | Hsu et al. | |
| 8,423,431 B1 | 4/2013 | Rouaix et al. | |
| RE44,225 E | 5/2013 | Aviv | |
| 8,577,705 B1 | 11/2013 | Baboo et al. | |
| 8,630,924 B2 | 1/2014 | Groenevelt et al. | |
| 8,688,598 B1 | 4/2014 | Shakes et al. | |
| 8,943,441 B1 | 1/2015 | Patrick et al. | |
| 9,158,974 B1 | 10/2015 | Laska et al. | |
| 9,160,979 B1 | 10/2015 | Ulmer | |
| 9,208,675 B2 | 12/2015 | Xu et al. | |
| 9,336,456 B2 | 5/2016 | Delean | |
| 9,449,233 B2 | 9/2016 | Taylor | |
| 9,473,747 B2 | 10/2016 | Kobres et al. | |
| 9,536,177 B2 | 1/2017 | Chalasani et al. | |
| 9,582,891 B2 | 2/2017 | Geiger et al. | |
| 9,727,838 B2 | 8/2017 | Campbell | |
| 9,846,840 B1 | 12/2017 | Lin et al. | |
| 9,881,221 B2 | 1/2018 | Bala et al. | |
| 9,898,677 B1 | 2/2018 | Andjelković et al. | |
| 9,911,290 B1 | 3/2018 | Zalewski et al. | |
| 10,055,853 B1 | 8/2018 | Fisher et al. | |
| 10,133,933 B1* | 11/2018 | Fisher | G06V 20/41 |
| 10,147,210 B1 | 12/2018 | Desai et al. | |
| 10,192,415 B2 | 1/2019 | Heitz et al. | |
| 10,354,262 B1 | 7/2019 | Hershey et al. | |
| 10,474,992 B2* | 11/2019 | Fisher | G06T 7/194 |
| 10,510,219 B1 | 12/2019 | Zalewski et al. | |
| 10,535,146 B1 | 1/2020 | Buibas et al. | |
| 10,839,203 B1 | 11/2020 | Guigues et al. | |
| 11,195,146 B2* | 12/2021 | Fisher | G06V 10/82 |
| 11,270,260 B2* | 3/2022 | Fisher | G01S 3/00 |
| 11,367,083 B1 | 6/2022 | Saurabh et al. | |
| 11,538,186 B2* | 12/2022 | Fisher | G06Q 10/087 |
| 2003/0002712 A1 | 1/2003 | Steenburgh et al. | |
| 2003/0002717 A1 | 1/2003 | Hamid | |
| 2003/0107649 A1 | 6/2003 | Flickner et al. | |
| 2003/0128337 A1 | 7/2003 | Jaynes et al. | |
| 2004/0181467 A1 | 9/2004 | Raiyani et al. | |
| 2005/0251347 A1 | 11/2005 | Perona et al. | |
| 2006/0018516 A1 | 1/2006 | Masoud et al. | |
| 2006/0222206 A1 | 10/2006 | Garoutte | |
| 2007/0092133 A1 | 4/2007 | Luo | |
| 2007/0182818 A1 | 8/2007 | Buehler | |
| 2007/0242066 A1 | 10/2007 | Rosenthal | |
| 2007/0276776 A1 | 11/2007 | Sagher et al. | |
| 2008/0055087 A1 | 3/2008 | Horii et al. | |
| 2008/0077511 A1 | 3/2008 | Zimmerman | |
| 2008/0109114 A1 | 5/2008 | Orita et al. | |
| 2008/0137989 A1 | 6/2008 | Ng et al. | |
| 2008/0159634 A1 | 7/2008 | Sharma et al. | |
| 2008/0166019 A1 | 7/2008 | Lee | |
| 2008/0193010 A1 | 8/2008 | Eaton et al. | |
| 2008/0195315 A1 | 8/2008 | Hu et al. | |
| 2009/0060352 A1 | 3/2009 | Distante et al. | |
| 2009/0083815 A1 | 3/2009 | McMaster et al. | |
| 2009/0121017 A1 | 5/2009 | Cato et al. | |
| 2009/0132371 A1 | 5/2009 | Strietzel et al. | |
| 2009/0210367 A1 | 8/2009 | Armstrong et al. | |
| 2009/0245573 A1 | 10/2009 | Saptharishi et al. | |
| 2009/0276705 A1 | 11/2009 | Ozdemir et al. | |
| 2010/0002082 A1 | 1/2010 | Buehler et al. | |
| 2010/0033574 A1 | 2/2010 | Ran et al. | |
| 2011/0011936 A1 | 1/2011 | Morandi et al. | |
| 2011/0205022 A1 | 8/2011 | Cavallaro et al. | |
| 2012/0148103 A1 | 6/2012 | Hampel et al. | |
| 2012/0159290 A1 | 6/2012 | Pulsipher et al. | |
| 2012/0257789 A1 | 10/2012 | Lee et al. | |
| 2012/0284132 A1 | 11/2012 | Kim et al. | |
| 2012/0327220 A1 | 12/2012 | Ma | |
| 2013/0076898 A1 | 3/2013 | Philippe et al. | |
| 2013/0095961 A1 | 4/2013 | Marty et al. | |
| 2013/0156260 A1 | 6/2013 | Craig | |
| 2013/0253700 A1 | 9/2013 | Carson et al. | |
| 2013/0322767 A1 | 12/2013 | Chao et al. | |
| 2014/0139633 A1 | 5/2014 | Wang et al. | |
| 2014/0279294 A1 | 9/2014 | Field-Darragh et al. | |
| 2014/0282162 A1 | 9/2014 | Fein et al. | |
| 2014/0334675 A1 | 11/2014 | Chu et al. | |
| 2014/0362195 A1 | 12/2014 | Ng-Thow-Hing et al. | |
| 2014/0362223 A1 | 12/2014 | LaCroix et al. | |
| 2014/0379296 A1 | 12/2014 | Nathan et al. | |
| 2015/0019391 A1 | 1/2015 | Kumar et al. | |
| 2015/0039458 A1 | 2/2015 | Reid | |
| 2015/0073907 A1 | 3/2015 | Purves et al. | |
| 2015/0131851 A1 | 5/2015 | Bernal et al. | |
| 2015/0199824 A1 | 7/2015 | Kim et al. | |
| 2015/0206188 A1 | 7/2015 | Tanigawa et al. | |
| 2015/0262116 A1 | 9/2015 | Katircioglu et al. | |
| 2015/0269143 A1 | 9/2015 | Park et al. | |
| 2015/0294483 A1 | 10/2015 | Wells et al. | |
| 2016/0003636 A1 | 1/2016 | Ng-Thow-Hing et al. | |
| 2016/0125245 A1 | 5/2016 | Saitwal et al. | |
| 2016/0127641 A1 | 5/2016 | Gove | |
| 2016/0292881 A1 | 10/2016 | Bose et al. | |
| 2016/0307335 A1 | 10/2016 | Perry et al. | |
| 2017/0116473 A1 | 4/2017 | Sashida et al. | |
| 2017/0206669 A1 | 7/2017 | Saleemi et al. | |
| 2017/0262994 A1 | 9/2017 | Kudriashov et al. | |
| 2017/0278255 A1* | 9/2017 | Shingu | G06T 7/277 |
| 2017/0309136 A1 | 10/2017 | Schoner | |
| 2017/0323376 A1 | 11/2017 | Glaser et al. | |
| 2017/0345165 A1 | 11/2017 | Stanhill et al. | |
| 2018/0084242 A1 | 3/2018 | Rublee et al. | |
| 2018/0164103 A1 | 6/2018 | Hill | |
| 2018/0218515 A1 | 8/2018 | Terekhov et al. | |
| 2018/0315329 A1 | 11/2018 | D'Amato et al. | |
| 2018/0343442 A1 | 11/2018 | Yoshikawa et al. | |
| 2019/0043003 A1 | 2/2019 | Fisher et al. | |
| 2019/0073627 A1 | 3/2019 | Nakdimon et al. | |
| 2019/0156274 A1* | 5/2019 | Fisher | G06V 20/52 |
| 2019/0156277 A1 | 5/2019 | Fisher et al. | |
| 2020/0043086 A1 | 2/2020 | Sorensen | |

FOREIGN PATENT DOCUMENTS

| | | |
|---|---|---|
| JP | 2013196199 A | 9/2013 |
| JP | 201489626 A | 5/2014 |
| KR | 20170006097 A | 1/2017 |
| WO | 0021021 A1 | 4/2000 |

(56) References Cited

FOREIGN PATENT DOCUMENTS

| WO | 02059836 A2 | 8/2002 |
|---|---|---|
| WO | 2017151241 A2 | 9/2017 |

OTHER PUBLICATIONS

Black, J. et al., "Multi View Image Surveillance and Tracking," IEEE Proceedings of the Workshop on Motion and Video Computing, 2002, https://www.researchgate.net/publication/4004539_Multi_view_image_surveillance_and_tracking/link/0c96051ac521f09b5b000000/download, pp. 1-6.

Ciplak G, Telceken S., "Moving Object Tracking Within Surveillance Video Sequences Based on EDContours," 2015 9th International Conference on Electrical and Electronics Engineering (ELECO), Nov. 26, 2015 (pp. 720-723). IEEE.

Cristian Pop, "Introduction to the BodyCom Technology", Microchip AN1391, May 2, 2011, pp. 1-24, vol. AN1391, No. DS01391A, Publisher: 2011 Microchip Technology Inc.

Fuentes et al., "People tracking in surveillance applications," Proceedings 2nd IEEE Int. Workshop on PETS, Kauai, Hawaii, USA, Dec. 9, 2001, 6 pages.

Grinciunaite, A., et al., "Human Pose Estimation in Space and Time Using 3D CNN," ECCV Workshop on Brave New Ideas for Motion Representations in Videos, Oct. 19, 2016, URL: https://arxiv.org/pdf/1609.00036.pdf, 7 pages.

Harville, M.,"Stereo Person Tracking with Adaptive Plan-View Templates of Height and Occupancy Statistics," Image and Vision Computing, vol. 22, Issue 2, Feb. 1, 2004, https://www.researchgate.net/publication/223214495_Stereo_person_tracking_with_adaptive_plan-_view_templates_of_height_and_occupancy_statistics/link/5e294888a6fdcc70a1437262/download, pp. 127-142.

He, K., et al., "Identity Mappings in Deep Residual Networks," ECCV 2016 Camera-Ready, URL: https://arxiv.org/pdf/1603.05027.pdf, Jul. 25, 2016, 15 pages.

Huang, K. S. et al. "Driver's View and Vehicle Surround Estimation Using Omnidirectional Video Stream," IEEE IV2003 Intelligent Vehicles Symposium. Proceedings (Cal. No.03TH8683), Jun. 9-11, 2003, http://cvrr.ucsd.edu/VOW2/papers/IV03DrView_Final_Header.pdf, pp. 444-449.

Liu, C., et al. "Accelerating Vanishing Point-Based Line Sampling Scheme for Real-Time People Localization", IEEE Transactions on Circuits and Systems for Video Technology. vol. 27. No. 3 Mar. 2017 (Year: 2017).

Longuet-Higgins, H.C., "A Computer Algorithm for Reconstructing a Scene from Two Projections," Nature 293, Sep. 10, 1981, https://cseweb.ucsd.edu/classes/fa01/cse291/hclh/SceneReconstruction.pdf, pp. 133-135.

Manocha et al., "Object Tracking Techniques for Video Tracking: A Survey," The International Journal of Engineering and Science (IJES), vol. 3, Issue 6, pp. 25-29, 2014.

Phalke K, Hegadi R., "Pixel Based Object Tracking," 2015 2nd International Conference on Signal Processing and Integrated Networks (SPIN), Feb. 19, 2015 (pp. 575-578). IEEE.

Redmon, J., et al., "You Only Look Once: Unified, Real-Time Object Detection," University of Washington, Allen Institute for AI, Facebook AI Research, URL: https://arxiv.org/pdf/1506.02640.pdf, May 9, 2016, 10 pages.

Redmon, Joseph and Ali Farhadi, "YOLO9000: Better, Faster, Stronger," URL: https://arxiv.org/pdf/1612.08242.pdf, Dec. 25, 2016, 9 pages.

Rossi, M. and Bozzoli, E. A., "Tracking and Counting Moving People," IEEE Int'l Conf. on Image Processing, ICIP-94, Nov. 13-16, 1994, http://citeseerx.ist.psu.edu/viewdoc/download; sessionid=463D09F419FA5595DBF9DEF30D7EC663?doi=10.1.1.331.6672&rep=rep1&type=pdf, 5 pages.

Sikdar A, Zheng YF, Xuan D., "Robust Object Tracking in the X-Z Domain," 2016 IEEE International Conference on Multisensor Fusion and Integration for Intelligent Systems (MFI), Sep. 19, 2016 (pp. 499-504). IEEE.

Toshev, Alexander and Christian Szegedy, "DeepPose: Human Pose Estimation via Deep Neural Networks," IEEE Conference on Computer Vision and Pattern Recognition, Aug. 20, 2014, URL: https://arxiv.org/pdf/1312.4659.pdf, 9 pages.

Vincze, M., "Robust Tracking of Ellipses at Frame Rate," Pattern Recognition, vol. 34, Issue 2, Feb. 2001, pp. 487-498.

Zhang, Z., "A Flexible New Technique for Camera Calibration," IEEE Transactions on Pattern Analysis and Machine Intelligence, vol. 22, No. 11, Nov. 2000, 5 pages.

Zhang, Z., "A Flexible New Technique for Camera Calibration," Technical Report MSR-TR-98-71, Microsoft Research, Microsoft Corporation, microsoft.com/en-us/research/wp-content/uploads/2016/02/tr98-71.pdf, 22 pages.

* cited by examiner

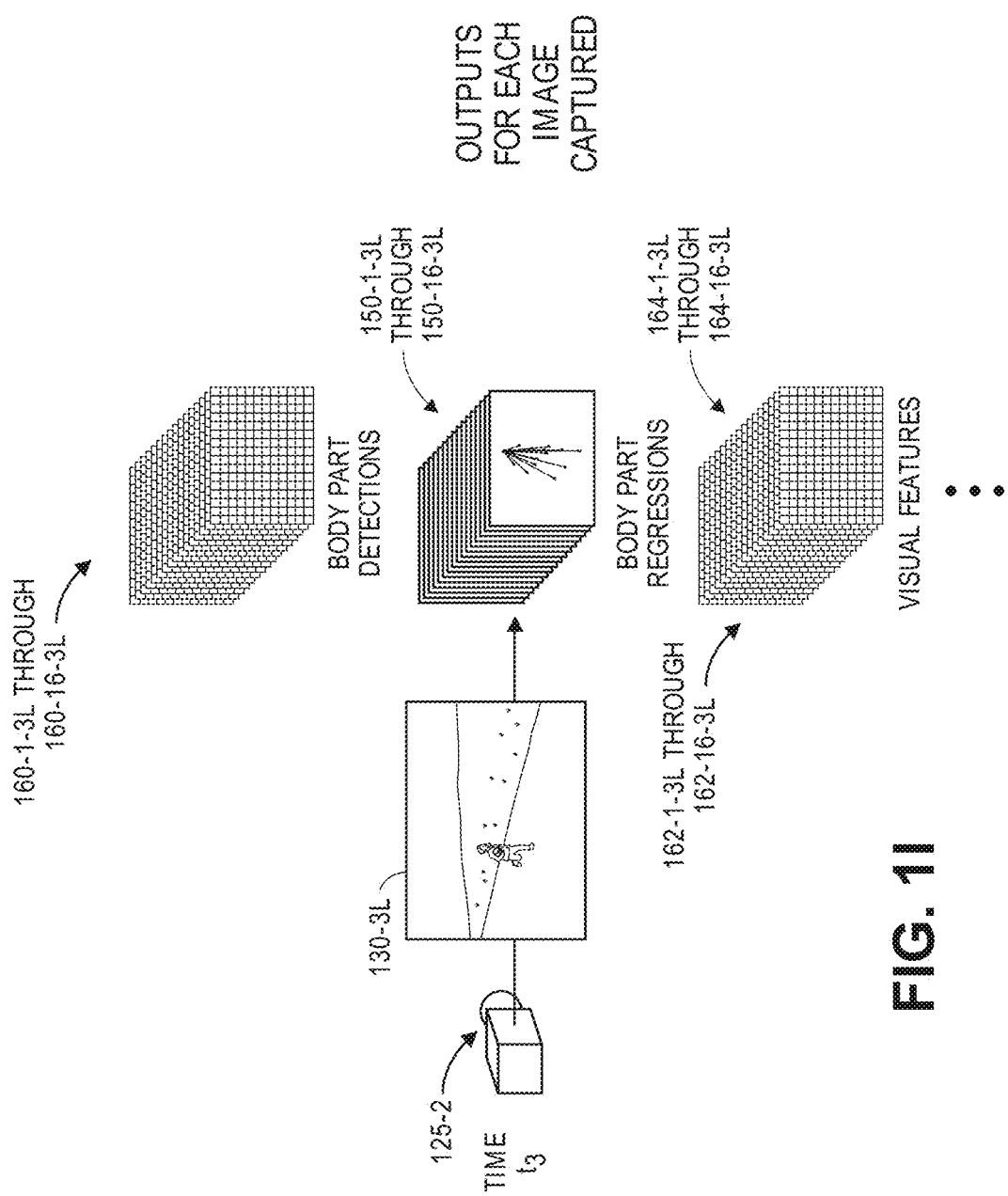

| Visible Body Part | Head | Neck | Shoulder (L) | Shoulder (R) | Elbow (L) | Elbow (R) | Wrist (L) | Wrist (R) | Hand (L) | Hand (R) | Hip (L) | Hip (R) | Knee (L) | Knee (R) | Ankle (L) | Ankle (R) |
|---|---|---|---|---|---|---|---|---|---|---|---|---|---|---|---|---|
| Head | 4 | 85 | 127 | 118 | 275 | 249 | 188 | 175 | 184 | 171 | 351 | 345 | 478 | 495 | 622 | 659 |
| Neck | 71 | 6 | 87 | 91 | 151 | 188 | 98 | 103 | 99 | 101 | 261 | 249 | 419 | 425 | 558 | 579 |
| Shoulder (L) | 141 | 81 | 3 | 108 | 109 | 239 | 89 | 78 | 109 | 76 | 218 | 258 | 381 | 393 | 509 | 514 |
| Elbow (L) | 233 | 149 | 118 | 141 | 7 | 219 | 89 | 69 | 138 | 72 | 131 | 171 | 293 | 285 | 415 | 460 |
| Elbow (R) | 258 | 191 | 239 | 60 | 211 | 5 | 169 | 53 | 158 | 51 | 258 | 141 | 366 | 324 | 469 | 498 |
| Wrist (L) | 178 | 92 | 86 | 67 | 83 | 181 | 2 | 104 | 48 | 100 | 169 | 161 | 310 | 321 | 448 | 486 |
| Hand (L) | 161 | 99 | 79 | 71 | 84 | 181 | 28 | 91 | 49 | 90 | 159 | 163 | 325 | 309 | 449 | 481 |
| Hip (L) | 351 | 241 | 229 | 251 | 128 | 231 | 151 | 177 | 163 | 183 | 9 | 90 | 155 | 172 | 299 | 321 |
| Hip (R) | 329 | 241 | 251 | 208 | 169 | 158 | 167 | 148 | 151 | 136 | 101 | 8 | 214 | 168 | 310 | 339 |
| Knee (L) | 488 | 416 | 372 | 421 | 281 | 360 | 313 | 311 | 331 | 321 | 160 | 201 | 4 | 166 | 311 | 339 |
| Knee (R) | 498 | 400 | 389 | 375 | 299 | 307 | 302 | 298 | 311 | 315 | 171 | 168 | 69 | 7 | 119 | 161 |
| Ankle (L) | 625 | 535 | 506 | 592 | 418 | 478 | 469 | 479 | 452 | 427 | 287 | 315 | 119 | 134 | 3 | 81 |
| Ankle (R) | 638 | 569 | 538 | 510 | 438 | 444 | 482 | 432 | 491 | 439 | 366 | 336 | 180 | 161 | 79 | 4 |

Regressions to Other Body Parts (distances in pixels)

450-1 THROUGH 450-16

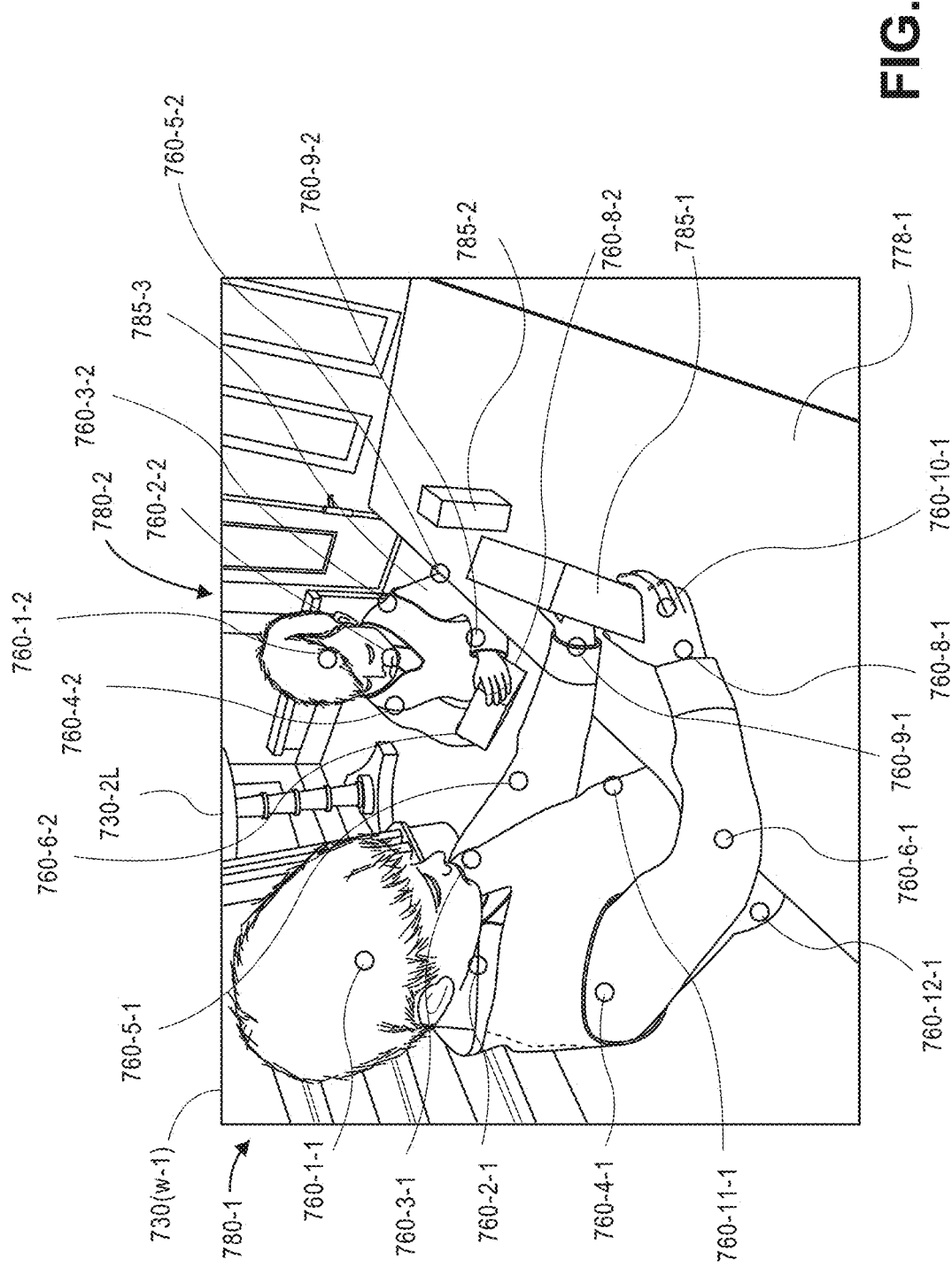

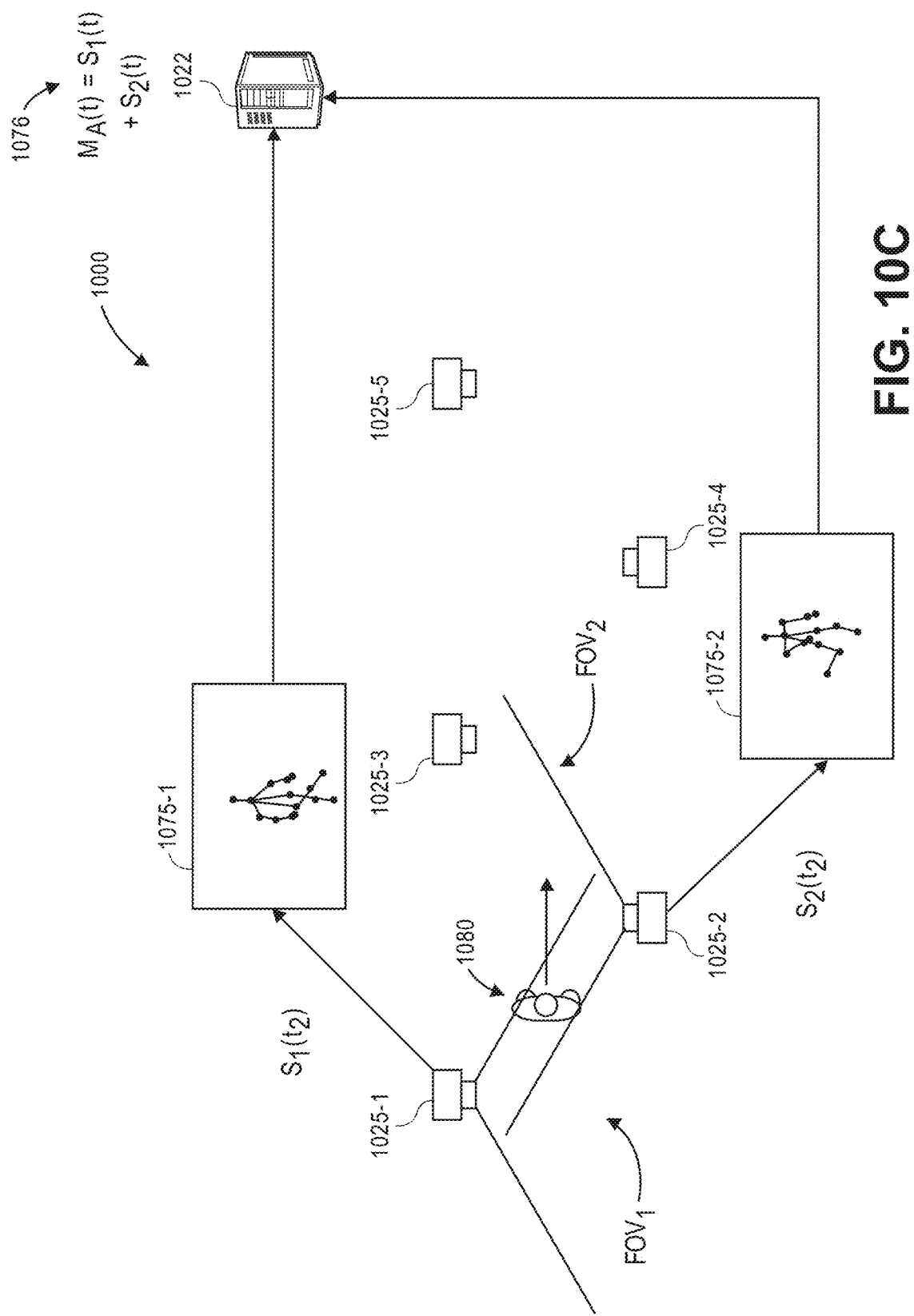

GENERATING TRACKLETS FROM DIGITAL IMAGERY

CROSS-REFERENCE TO RELATED APPLICATIONS

This application is a continuation of U.S. patent application Ser. No. 15/717,792, filed Sep. 27, 2017, now U.S. Pat. No. 11,232,294, the contents of which are incorporated by reference herein in their entirety.

BACKGROUND

Today, imaging devices such as digital cameras are frequently used for conducting surveillance or monitoring operations. For example, digital cameras are also often used to monitor the arrivals or departures of goods or the performance of services in materials handling facilities such as warehouses, fulfillment centers, retail establishments or other like facilities, as well as the travels of persons or objects in locations such as airports, stadiums or other dense environments, or the flow of traffic on one or more sidewalks, roadways or highways. Digital cameras are commonplace in financial settings such as banks or casinos, where money changes hands in large amounts or at high rates of speed.

When conducting surveillance or monitoring operations, a plurality of digital cameras (or other imaging devices) may be provided in a network, and aligned and configured to capture imaging data such as still or moving images of actions or events occurring within their respective fields of view. The digital cameras may include one or more sensors, processors and/or memory components or other data stores. Information regarding the imaging data or the actions or events depicted therein may be subjected to further analysis by one or more of the processors operating on the digital cameras to identify aspects, elements or features of the content expressed therein. Thus, when configured for surveillance or monitoring operations, digital cameras may be programmed to recognize when an action or event has occurred, such as when a frame-to-frame analysis of video imagery suggests that a predetermined threshold has been exceeded or that a predetermined condition has been satisfied, or otherwise implies that the action or the event has occurred based on information or data captured by the digital cameras.

In dynamic environments such as materials handling facilities, transportation centers, financial institutions or like structures in which diverse collections of people, objects or machines enter and exit from such environments at regular or irregular times or on predictable or unpredictable schedules, it is frequently difficult to recognize poses, gestures, actions or other aspects of motion of one or more actors occurring within the fields of view of multiple digital cameras or other imaging devices. In particular, where the digital cameras of a network each have fixed orientations, or where fields of view of the digital cameras include large numbers of people, objects or machines that have varying sizes or shapes and travel at varying velocities, recognizing and distinguishing between poses of multiple actors may be exceptionally challenging.

BRIEF DESCRIPTION OF THE DRAWINGS

FIGS. 7A through 7H are views of aspects of one system for real time tracking of actors using digital imagery in accordance with implementations of the present disclosure.

FIGS. 10A through 10G are views of aspects of one system for real time tracking of actors using digital imagery in accordance with implementations of the present disclosure.

DETAILED DESCRIPTION

Figure 1A:
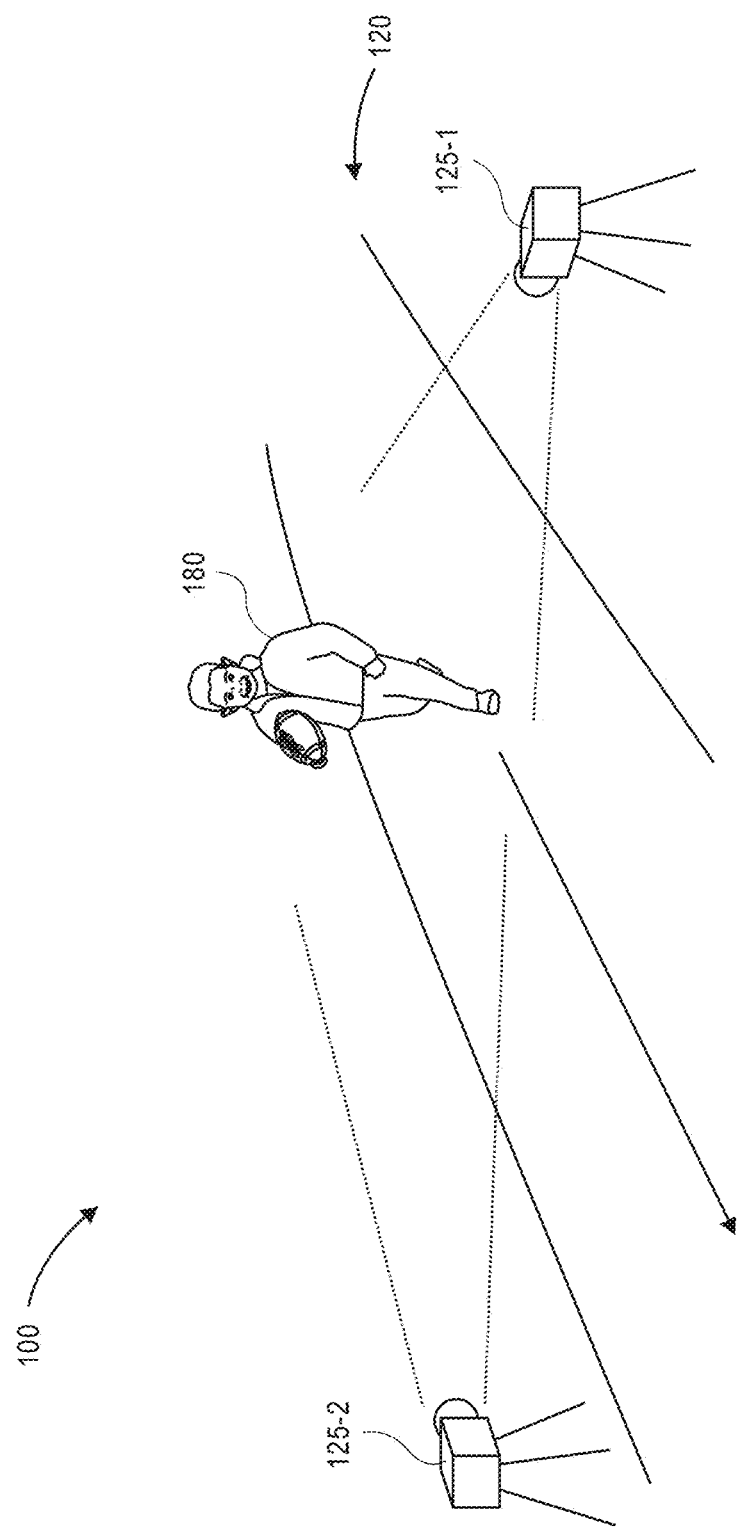
FIGS. 1A through 1N are views of aspects of one system for real time tracking of actors using digital imagery in accordance with implementations of the present disclosure.

As is set forth in greater detail below, the present disclosure is directed to recognizing and tracking one or more actors within a scene in real time or in near-real time using digital imagery captured from the scene by multiple imaging devices in a network and from multiple fields of view. In some implementations of the present disclosure, the tasks of detecting actors on a scene, and tracking the actors across the scene, may be split between processors associated with the imaging devices that captured the digital imagery, and a central server to which each of such processors or imaging devices is connected, thereby reducing the amount of processing power, and time, required to execute each of such tasks.

More specifically, one or more implementations of the present disclosure are directed to capturing one or more series of digital images of a scene from one or more cameras or other imaging devices in a network having overlapping fields of view. In some implementations, the individual processing and computing resources associated with the respective imaging devices may be exploited to detect and recognize one or more body parts of actors within the digital images captured thereby, along with visual features of the body parts, e.g., colors or textures of such parts. One or more processors associated with an imaging device may determine positions of body parts of actors that are visible within a digital image frame captured by the imaging device, as well as visual features of pixels of the digital image frame at or near such positions. The positions and/or visual features of the body parts may be recognized in real time or near-real time as the digital image frames are captured or, alternatively, at a later time, using one or more classifiers (or other algorithms or techniques, e.g., machine learning techniques) operating on the imaging devices that captured the virtual image frames, or in association with such imaging devices. For example, such classifiers, which may include one or more artificial neural networks, support vector machines, or others, may be configured to detect one or more candidates of body parts of actors within the scene, to identify one or more of such candidates that are compatible with one another, and to determine that one or more of such candidates are incompatible with one another.

Once a body part of an actor has been detected within a field of view of an imaging device from a digital image frame captured thereby, the body part may be associated with other body parts of the actor, e.g., to predict positions of body parts of the actor that are not visible within the imaging data, based on one or more actual and/or predicted physiological parameters or constraints, including but not limited to distances between such parts, or ranges of motion of such parts. Where body part candidates are detected within image frames, the body parts candidates may be modeled by the imaging device as nodes or points of a detection graph, with a number of edges or line segments connecting pairs of such nodes, and with each edge corresponding to a probability that the connected nodes correspond to a common actor. Multiple sets of edges may be extended between nodes corresponding to body parts that are depicted within a single frame. Moreover, such edges may be used to correct a detected position of a body part, or to enhance the precision of the detection position, e.g., by a regression analysis that may include a self-regression. Additionally, visual features of one or more of the body part candidates may be determined from the one or more images in which the respective body part candidates appear, e.g., by one or more image segmentation, image filtering, image smoothing and/or image localization techniques. Such visual features may include, but are not limited to, colors, textures or other features of the locations of the digital image frame corresponding to the respective body parts as depicted within the image frames.

Based on the nodes and edges of a detection graph and the visible features corresponding to the nodes, a processor associated with an imaging device may locally generate a virtual skeleton (e.g., an articulated model) of each of the actors depicted within an image frame, as a vector, a record or a function of time representative of the motion of the various body parts of the actor within the field of view of the imaging device. The processor may be embedded with, coupled to or otherwise included within the imaging device that captured the image frame, or associated with the imaging device in any other way. Alternatively, the imaging device may be connected by wired or wireless means to a computer system or device having one or more processors, and the virtual skeleton may be locally generated by such processors. Processors associated with each of the imaging devices from which image frames are captured may independently generate a detection graph for an image frame captured thereby, and determine visible features of each of the body parts having nodes therein. Processors associated with each of the imaging devices may further construct one or more skeletons on a local basis, e.g., by an imaging device that captured the image frames from which the skeletons were generated, or one or more computer systems associated with the imaging device, based on the detection graph and the visible features independently, and without input from any other imaging device or external systems or resources, with one local skeleton generated for each of the discrete actors depicted within a given digital image frame. Moreover, when another digital image frame is captured, the detection graph may be updated based on the detected positions of body parts within the digital image frame, as well as positions of other body parts identified based on one or more parameters or constraints, or by any other means. In some implementations, processors associated with such imaging devices may be further configured to update the detection graph and/or the visible features of nodes of the detection graph based on a finite set of image frames captured thereby. The finite set may include a rolling window of a predetermined number of digital image frames most recently captured by a given imaging device. For each of the digital image frames captured thereby, an imaging device or an associated processor may locally generate one or more skeletons based on the detection graph, as updated based on the digital image frames of the rolling window, e.g., for each of the actors identified therein.

Local skeletons that are generated by each of the imaging devices in a network, or by processors associated with such imaging devices, may be provided to a central server or other system along with identifiers of such skeletons. The central server may determine that local skeletons appearing in digital image frames captured by one or more imaging devices (preferably two or more imaging devices) correspond to a common actor, e.g., based on similarity in the positions of the body parts identified in the respective detection graphs, or on similarity in their respective appearances, and construct a global virtual skeleton (or articulated model) of the actor based on each of the local skeletons. The central server may assign a master identifier to a global skeleton, and associate each of the identifiers of the two or more local skeletons from which the global skeleton was generated with that master identifier.

In accordance with some implementations of the present disclosure, when local skeletons are generated based on image frames subsequently captured by imaging devices that first recognized the actor therein, information or data regarding such skeletons, including identifiers of such skeletons, may be provided to the central server. If an identifier of a local skeleton tracked by an imaging device is associated with a global skeleton tracked by the central server, then the global skeleton may be updated accordingly based on the information or data regarding the local skeleton that is most recently received. Additionally, when other imaging devices provided at the scene recognize one or more actors within image frames captured thereby, and generate local skeletons based on such detections, the other imaging devices may also provide such local skeletons and identifiers to the central server. The central server may then determine whether the local skeletons correspond to one or more global skeletons then being tracked by the central server, or to one or more local skeletons that were recognized and reported by other imaging devices, and may associate identifiers of the local skeletons with global skeletons accordingly. So long as at least one of the local skeletons that is associated with a global skeleton is persistently reported by processors associated with one or more of the imaging devices, the actor may be confirmed to be present within the scene, and the motion of the actor may be represented by the global skeleton, which may take the form of a vector, a record or a function of time representative of the motion of the various body parts of the actor, in three-dimensional space, and continuously refined as the actor travels across the scene.

Because the global skeletons of the present disclosure may take the form of vectors, records or functions of time representative of the motion of the various body parts of actors, the motion of such actors may be determined or predicted even after the actors are no longer within fields of view of one or more imaging devices. For example, where a global skeleton of an actor is generated with respect to a velocity, a gait, or one or other attributes or characteristics of motion of the actor, the positions of the one or more body parts of the actor may be predicted or determined by advancing such body parts according to the velocity, the gait, or the one or more other attributes or characteristics of the motion of the actor, e.g., by dead reckoning. Thus, when an imaging device or an associated processor generates a local skeleton for an actor, the positions and/or appearances of the local skeleton may be compared not only to positions and/or appearances of body parts of other local skeletons, or of global skeletons then being tracked, but also to positions and/or appearances of body parts of global skeletons that were previously generated and tracked. If the positions of body parts of a local skeleton match the predicted positions of the body parts of a previously generated and tracked global skeleton, as determined by dead reckoning or any other technique, the local skeleton may be determined to correspond to the previously generated and tracked global skeleton. Alternatively, if the appearances of the body parts of the local skeleton match the appearances of the body parts of the previously generated and tracked global skeleton, which may be assumed to not have changed since the global skeleton was last identified in a local skeleton and tracked accordingly, the local skeleton may also be determined to correspond to the previously generated and tracked global skeleton.

Thus, by utilizing processing power available to cameras or other imaging devices that are installed or operated in a network, an actor may be detected within the fields of view of such cameras, e.g., by detecting positions and visual features of one or more body parts of the actor within digital image frames, and a skeleton of the actor may be locally generated based on such positions and visual features. In some implementations, each of the imaging devices that has detected the actor may report an identifier of a local skeleton generated thereby, along with information or data regarding the positions and visual features of body parts of the local skeleton, to a central server. Where local skeletons generated by the respective imaging devices may be correlated with one another, and determined to correspond to a common actor, the local skeletons may be used to generate a global skeleton (or articulated model) representative of the positions and motions of the actor. The tasks of detecting and tracking actors on a scene may be bifurcated between processors associated with the imaging devices that captured the image frames, which may detect the actors on the scene as depicted within such image frames, and a central server or other system to which each of the processors or imaging devices is connected, which may track the actors based on skeletons or other models of such actors that are generated by the imaging devices and reported to the central server accordingly.

Figure 1B:
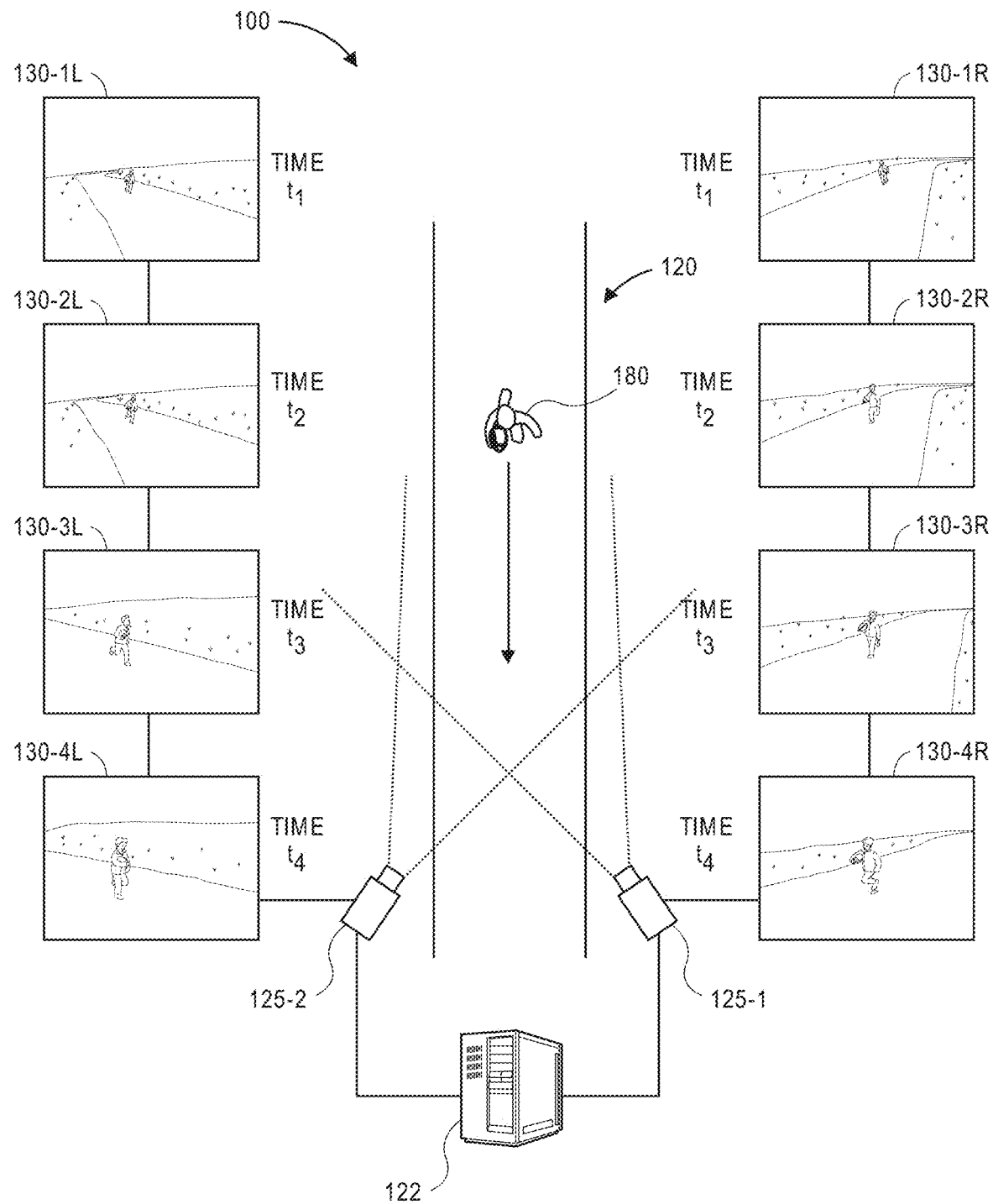
Figure 1C:
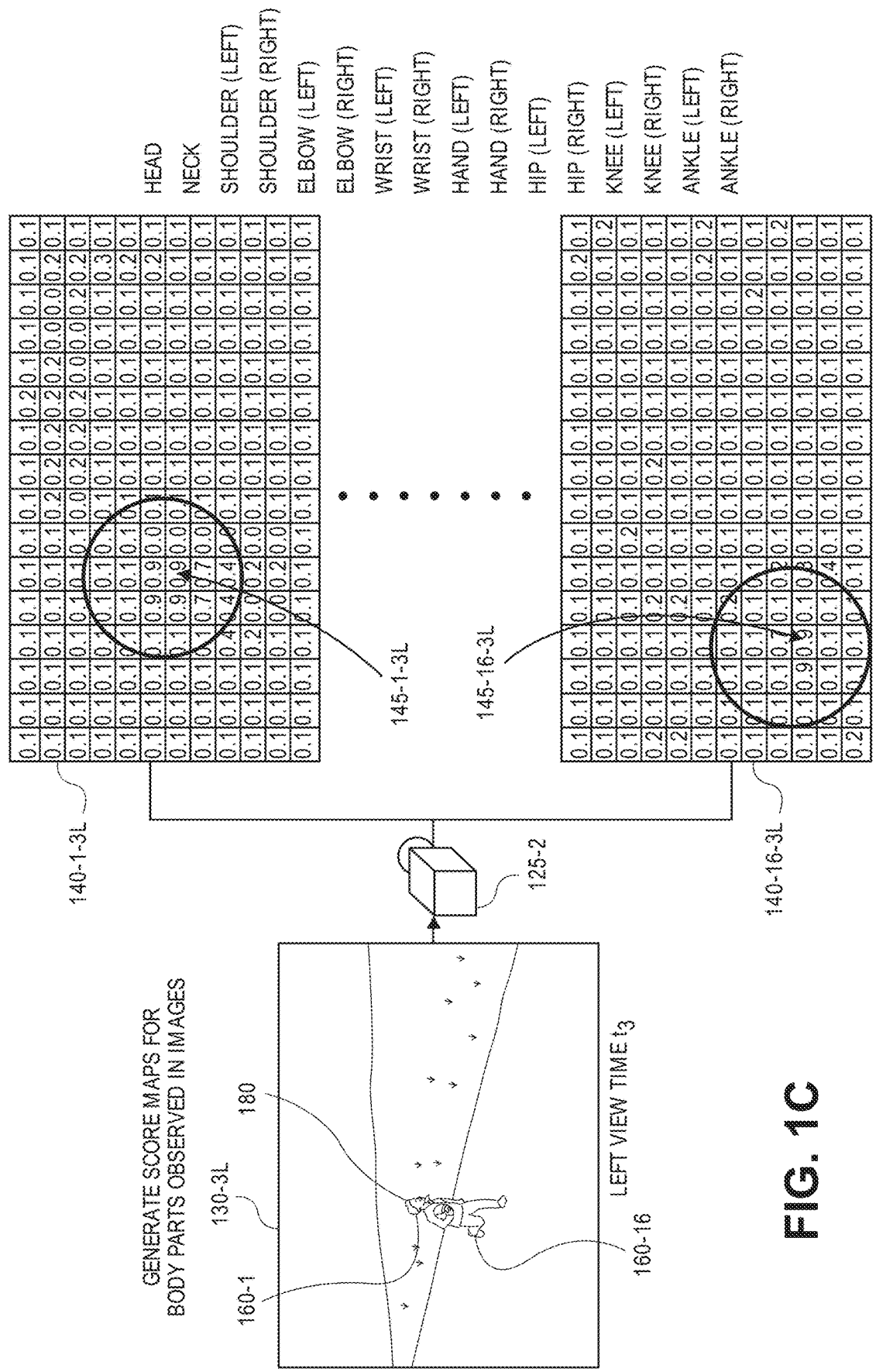
Figure 1D:
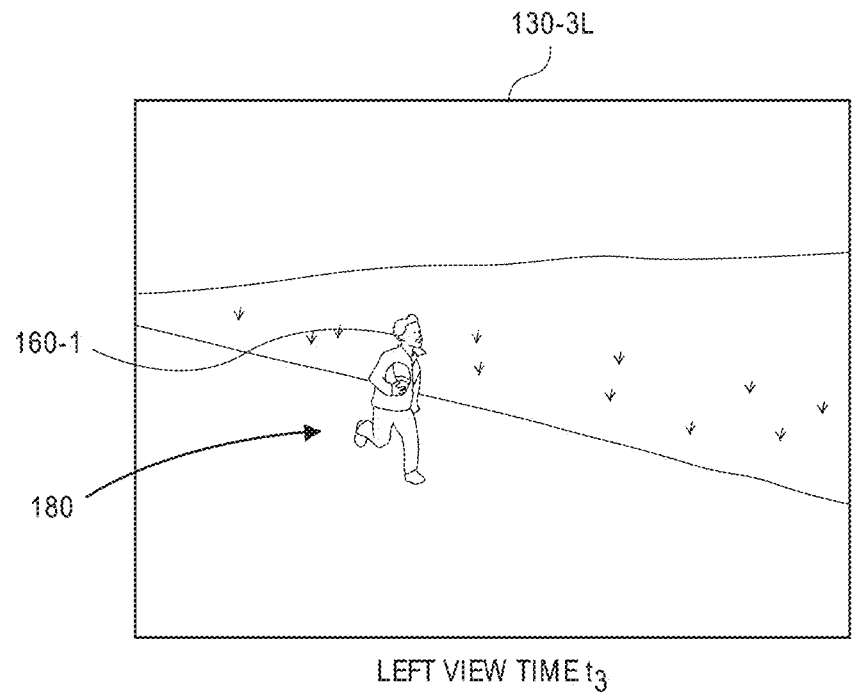
Figure 1E:
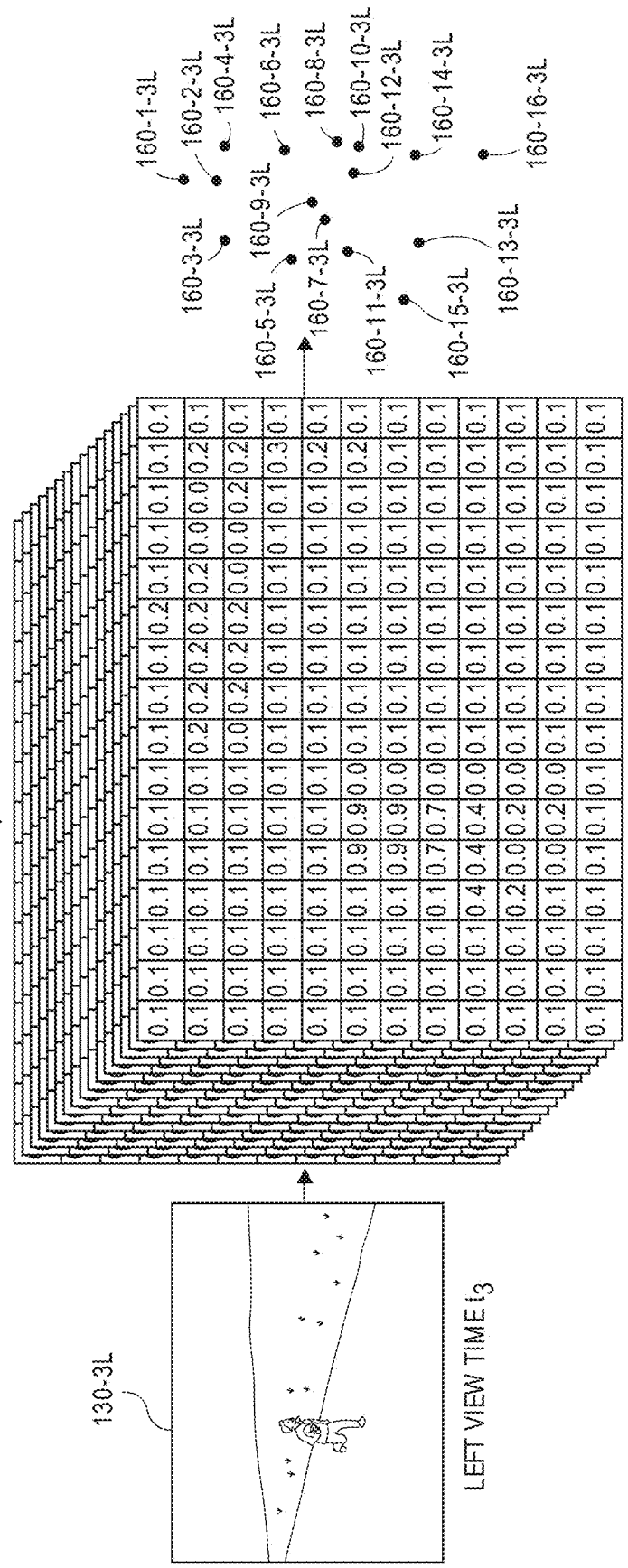
Figure 1F:
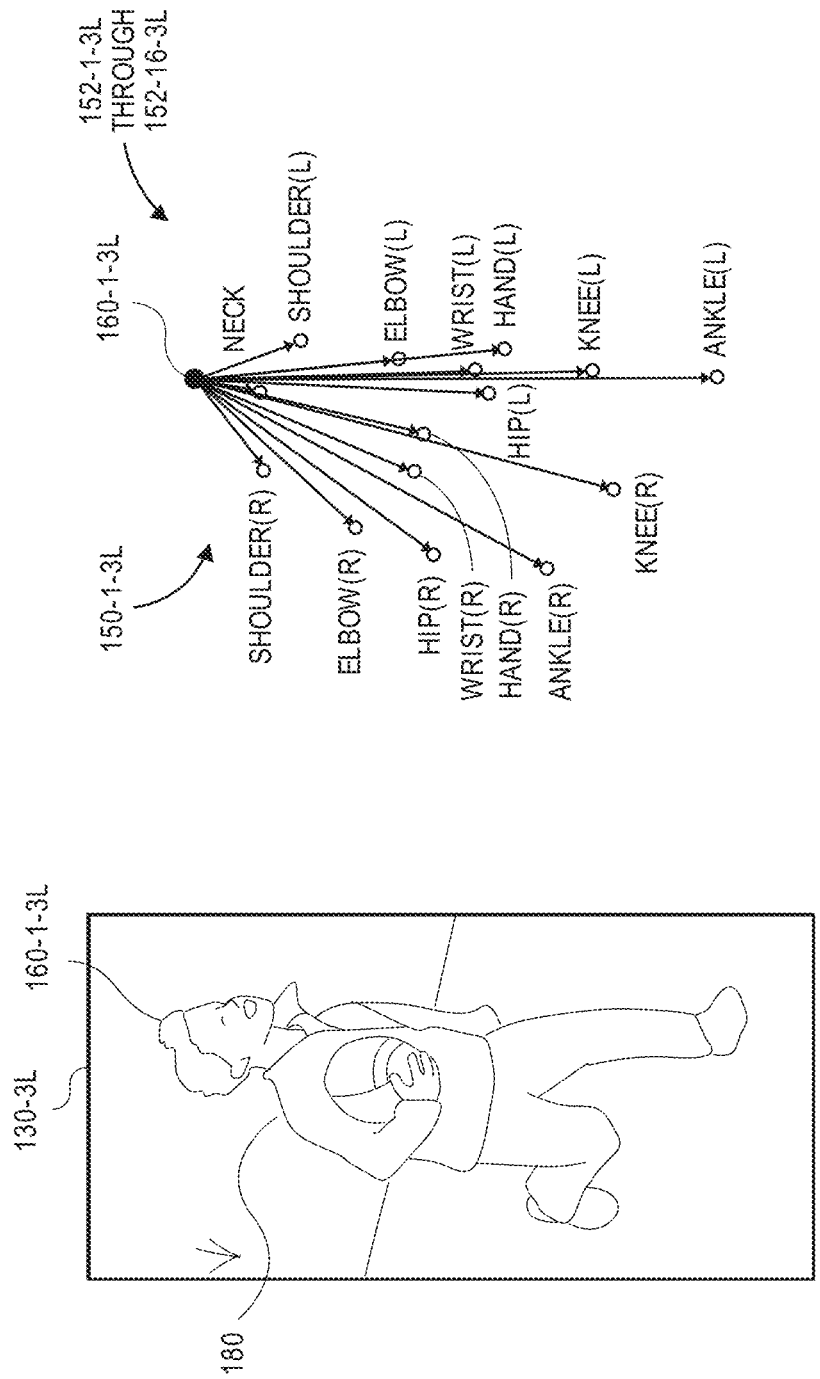
Figure 1G:
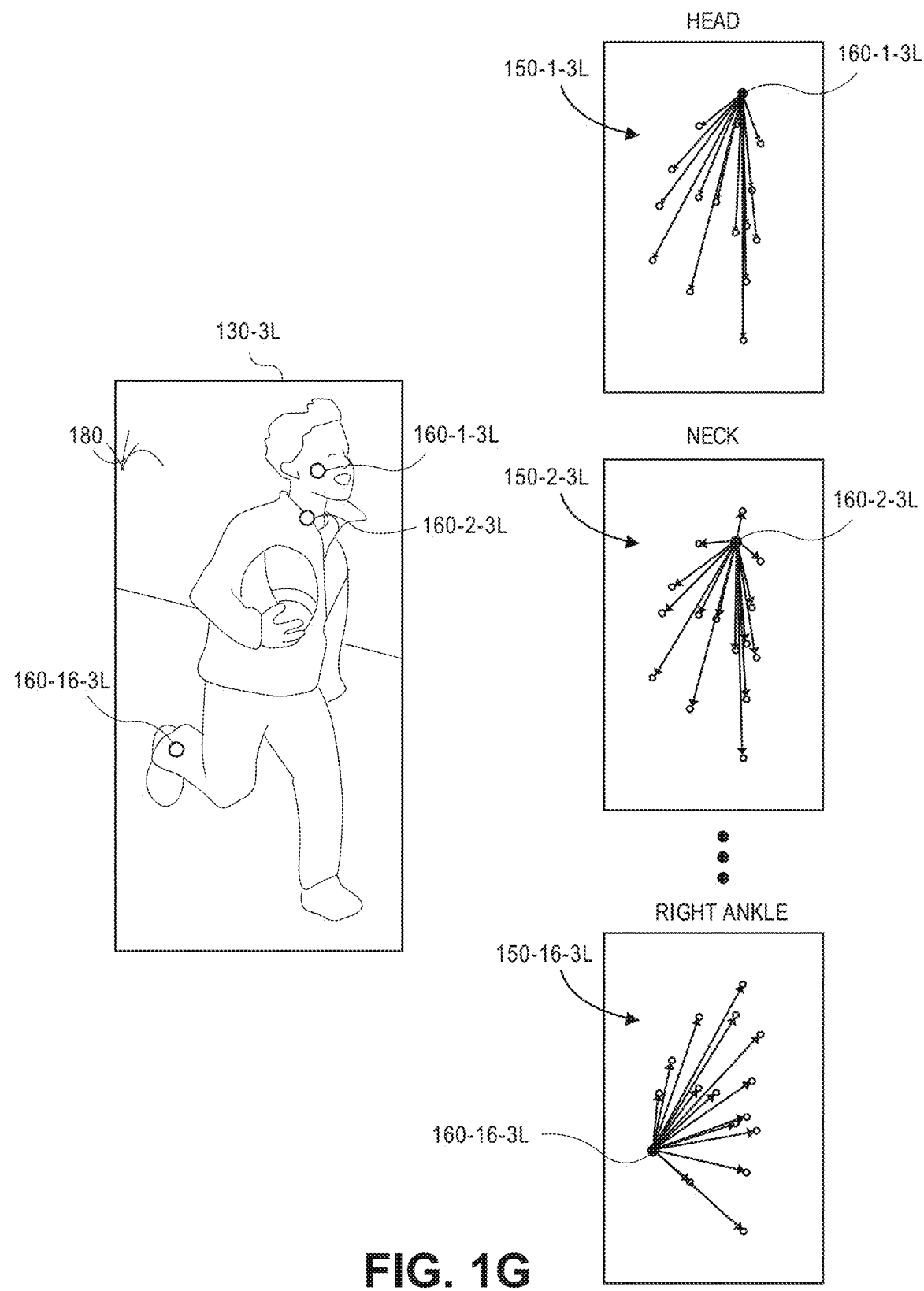
Figure 1H:
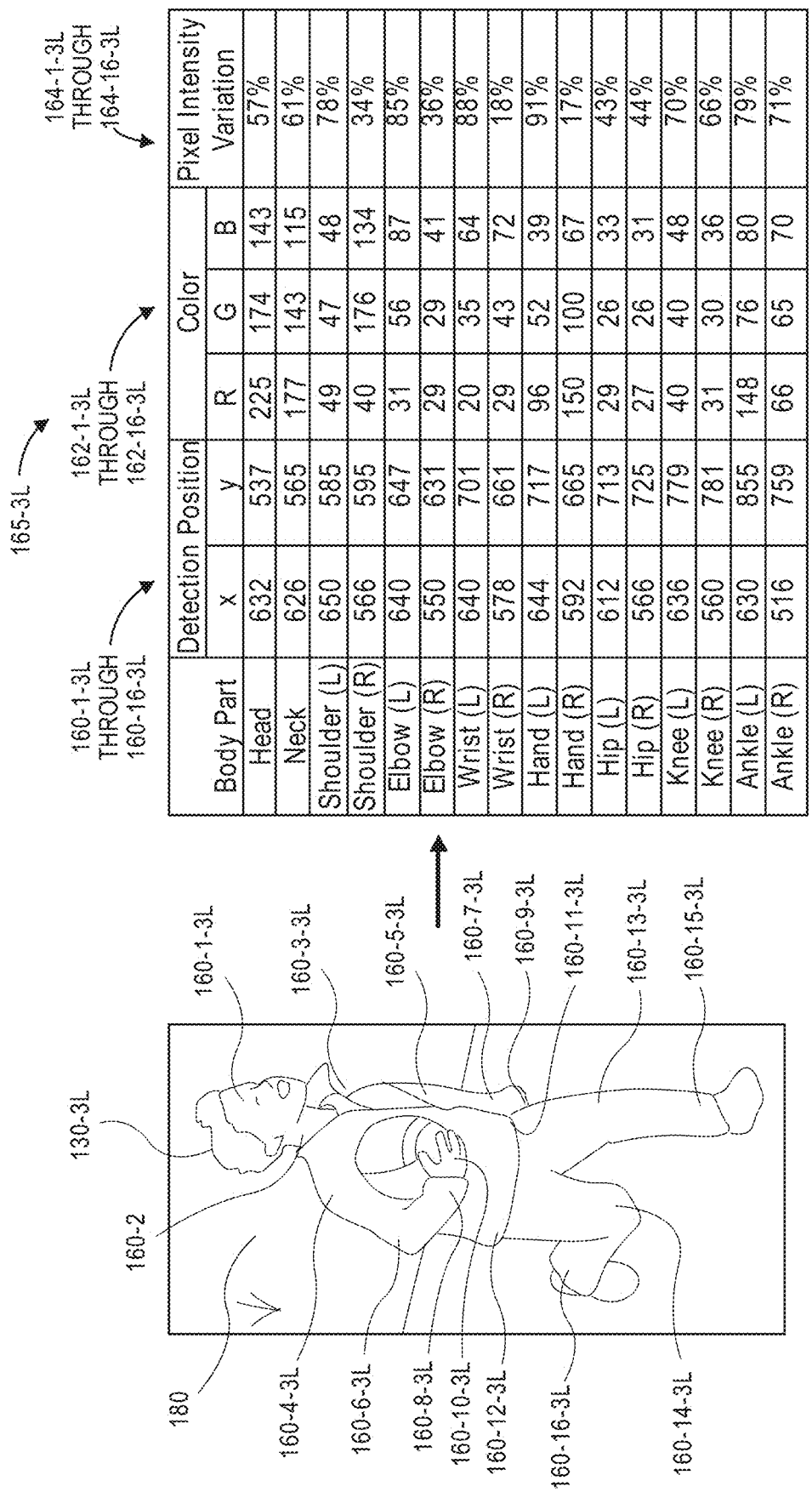
Figure 1J:
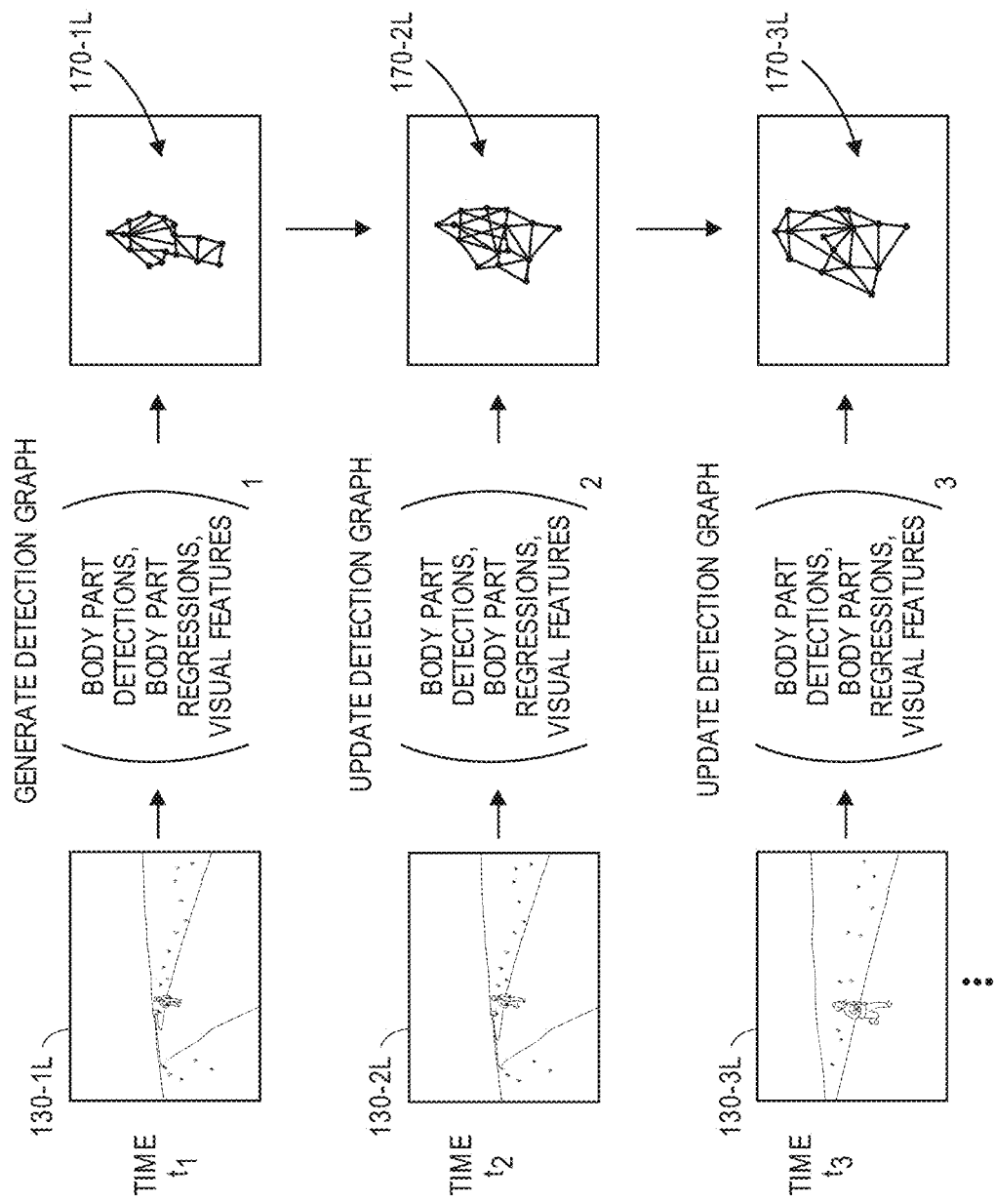
Figure 1K:
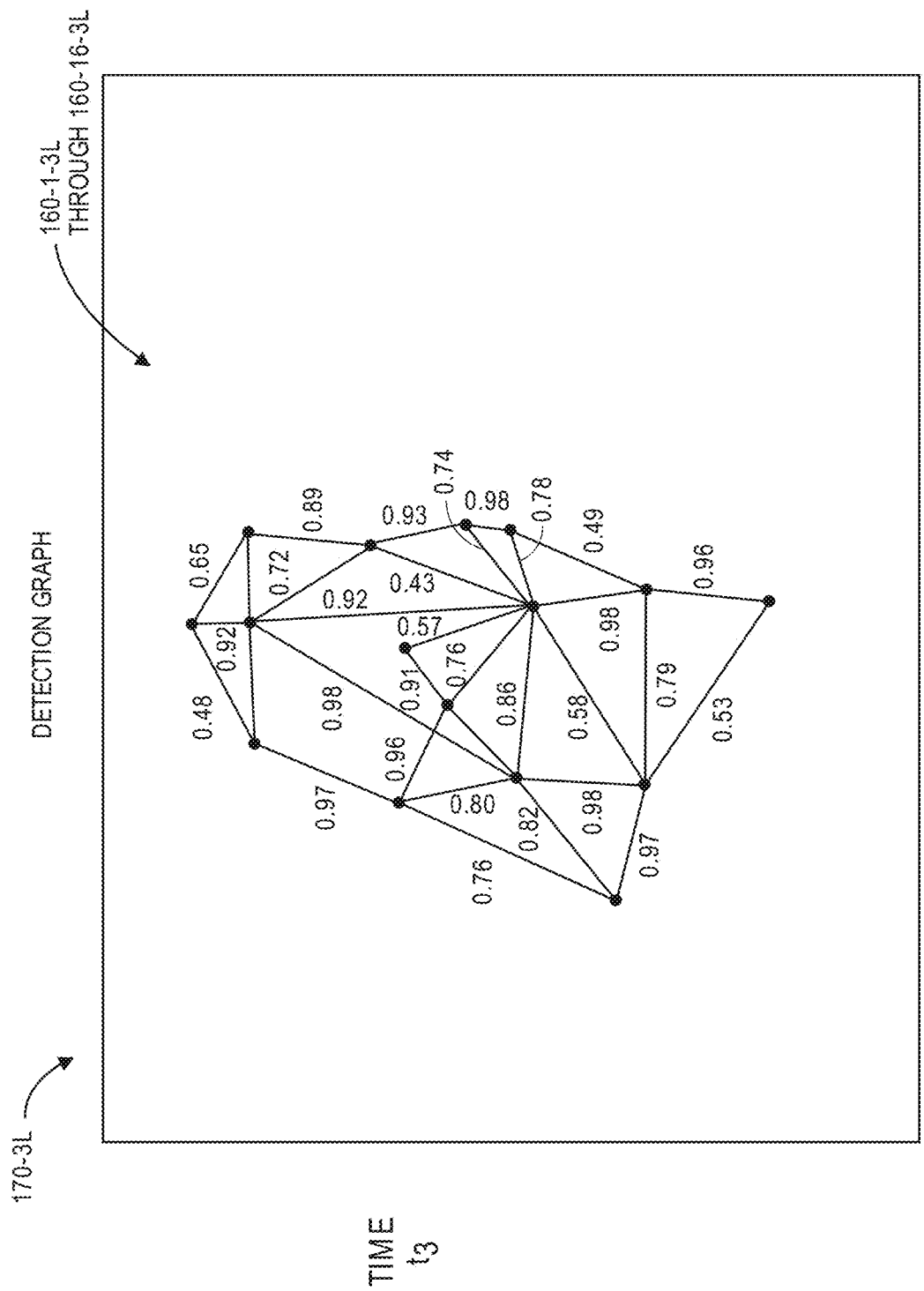
Figure 1L:
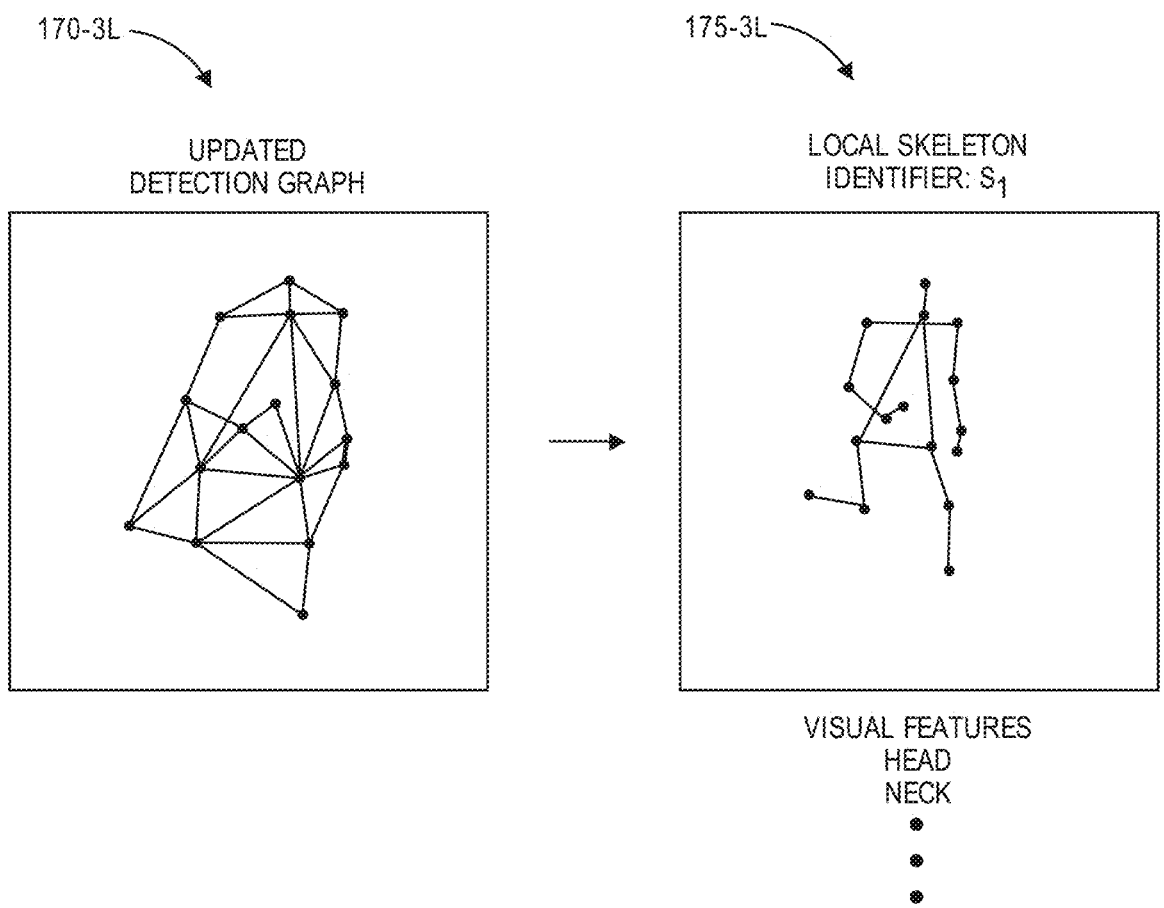
Figure 1M:
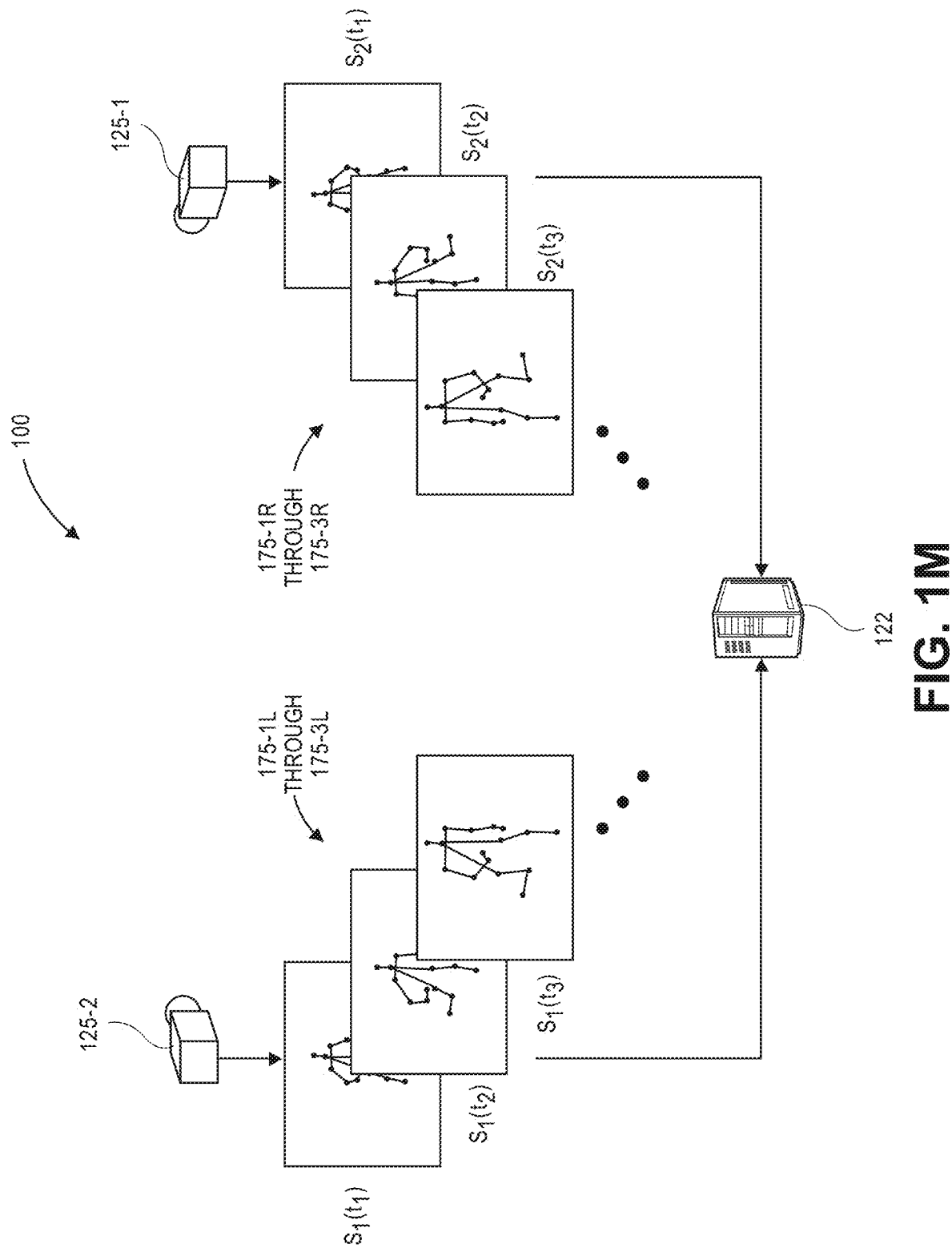
Figure 1N:
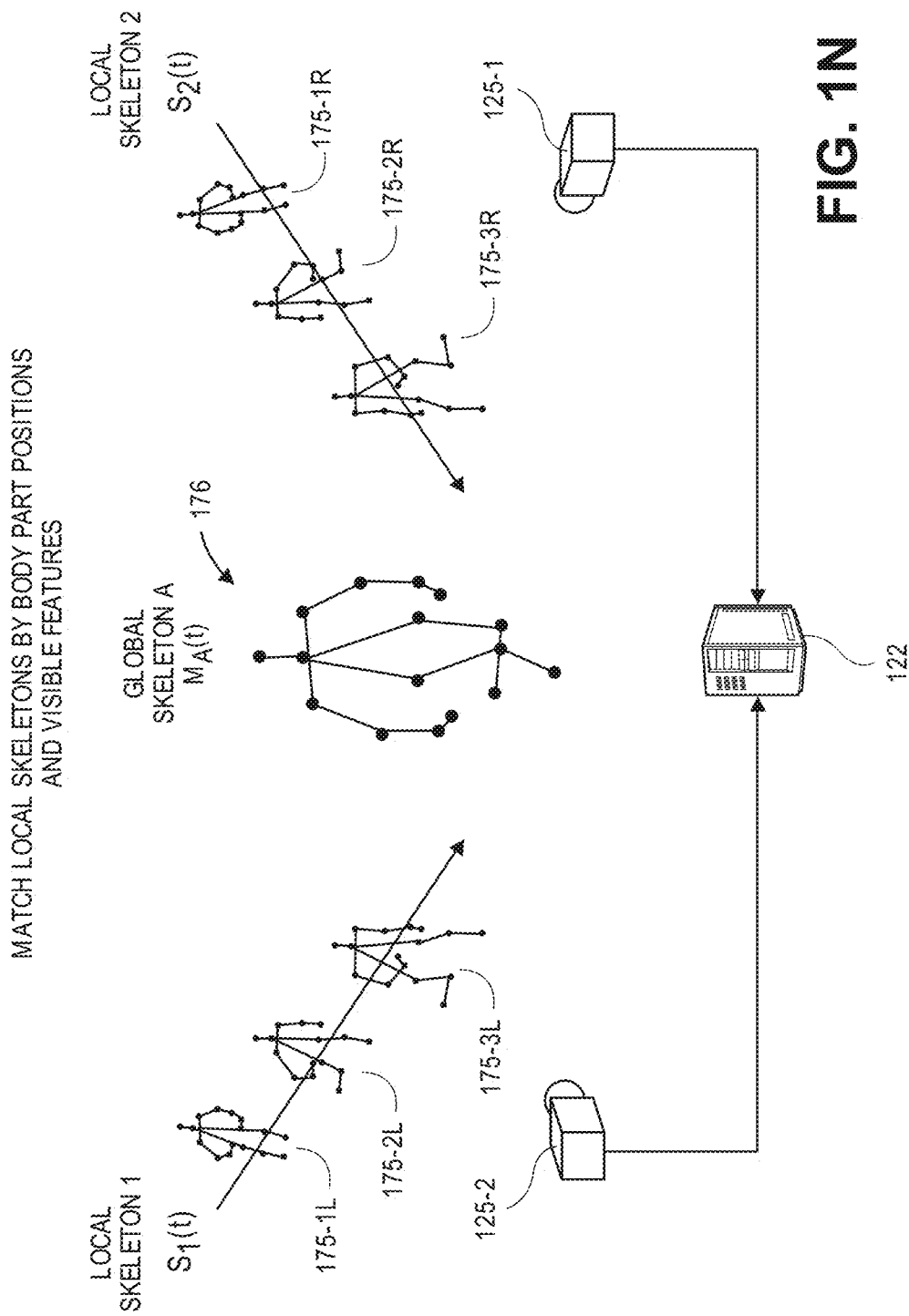

Referring to FIGS. 1A through 1N, views of aspects of one system 100 for real time tracking of actors using digital imagery in accordance with implementations of the present disclosure are shown. As is shown in FIG. 1A, the system 100 includes a scene 120 having a pair of imaging devices 125-1, 125-2 (e.g., digital cameras) that are installed or otherwise operated in an imaging device network (or camera network). The scene 120 may be any open or enclosed environment or space in which any number of actors (e.g., humans, animals other than humans, or machines) may execute one or more poses, gestures or other actions within the fields of view of the imaging devices 125-1, 125-2, which may be calibrated. Additionally, the imaging devices 125-1, 125-2 are aligned with fields of view that overlap at least in part over a portion of the scene 120, and are configured to capture imaging data, such as still or moving digital images, from the scene 120. As is shown in FIG. 1A, an actor 180 is executing one or more gestures in the scene 120, e.g., the actor 180 is running through the scene 120, and such gestures occur within the respective fields of view of each of the imaging devices 125-1, 125-2. Although the scene 120 of FIG. 1A includes only two imaging devices 125-1, 125-2, any number of imaging devices may be utilized in accordance with the present disclosure. For example, in some implementations, dozens or even hundreds of imaging devices may be aligned to capture imaging data from a scene.

As is shown in FIG. 1B, the imaging devices 125-1, 125-2 are configured to capture visual imaging data, e.g., a series of image frames, of the actor 180 within the scene 120. For example, the imaging device 125-1 is shown as capturing a series of image frames 130-1R, 130-2R, 130-3R, 130-4R including the actor 180 within the field of view of the imaging device 125-1 as the actor 180 performs one or more gestures at times $t_1$, $t_2$, $t_3$, $t_4$, and so on. Concurrently, the imaging device 125-2 is shown as capturing a series of image frames 130-1L, 130-2L, 130-3L, 130-4L including the actor 180 within the field of view of the imaging device 125-2 as the actor 180 performs the one or more gestures therein, also at times $t_1$, $t_2$, $t_3$, $t_4$, and so on. The imaging devices 125-1, 125-2 are in communication with a server 122 (or another network-connected computer device or computer resource), e.g., by wired or wireless means, according to any communications protocol.

In accordance with some implementations of the present disclosure, when an image frame is captured with an actor present within a field of view of an imaging device, the image frame may be processed by one or more computer processors operating on the imaging device, or processors associated with the imaging device, to recognize one or more body points (e.g., joints) of the actor depicted within the image frame. The body parts of the actor may be detected by any classifier, algorithm or technique operating by such processors on or in association with the imaging device. For example, in some implementations, a score map identifying which portions of the image frame, if any, include one of a predetermined number of body parts therein may be generated for each of the predetermined number of body parts.

As is shown in FIG. 1C, the image frame 130-3L captured from the left view of the imaging device 125-2 at time $t_3$, may be processed by a classifier, an algorithm or another technique for detecting one or more body parts within image frames that operates on the imaging device 125-2, e.g., by one or more processors provided thereon or otherwise associated therewith. In some implementations, the one or more processors associated with the imaging device 125-2 may operate a deep neural network, a convolutional neural network, a support vector machine, or any other type or form of classifier, algorithm or technique that may be trained to recognize any number of discrete body parts within an image frame. In some implementations, the classifier, algorithm or technique may be trained to generate one score map for each of any number of body parts, including but not limited to one or more of a head, a neck, a left shoulder, a right shoulder, a left elbow, a right elbow, a left wrist, a right wrist, a left hand, a right hand, a left hip, a right hip, a left knee, a right knee, a left ankle or a right ankle. The score maps generated thereby may be images, regression maps or other graphical representations of probabilities that any given pixel within a body frame depicts or is a portion of a depiction of a given body part. Alternatively, in some other implementations, an imaging device may be configured to detect body parts and their respective positions by any other classifiers, algorithms or techniques. For example, an imaging device may be configured to capture depth images, or both visual images and depth images, and may be configured to recognize body parts within one or more of the depth images and/or visual images, or a combination of the depth images and the visual images.

As is shown in FIG. 1C, processors associated with the imaging device 125-2 may generate score maps for each of a plurality (e.g., sixteen) of body parts using a trained classifier operating thereon, based on the image frame 130-3L, which was captured from the field of view of the imaging device 125-2 and depicts the actor 180 during the performance of one or more gestures at time $t_3$. FIG. 1C includes score maps 140-1-3L, 140-16-3L, for two of such body parts, viz., a head 160-1 of the actor 180, and a right ankle 160-16 of the actor 180. The score map 140-1-3L shown in FIG. 1C includes a region 145-1-3L of peak values that are identified by processors associated with the imaging device 125-2 as most likely corresponding to the head 160-1 of the actor 180. Likewise, the score map 140-16-3L shown in FIG. 1C includes a region 145-16-3L of peak values that are identified by the imaging device 125-2 as most likely corresponding to the right ankle 160-16 of the actor 180. The score maps 140-1-3L, 140-16-3L of FIG. 1C may be graphical representations of probabilities that any of the pixels of the image frame 130-3L depicts or is a portion of a depiction of a head or a right ankle of the actor 180. Furthermore, although the score maps 140-1-3L, 140-16-3L of FIG. 1C are shown as having a finite number of values and representing probabilities at a level of resolution that is lower than the level of resolution of the image 130-3L, score maps may have any number of values and may represent probabilities that an image includes a given body part at any level of resolution in accordance with implementations of the present disclosure. Processors associated with the imaging device 125-2 may also generate fourteen other score maps (not shown in FIG. 1C) that include regions of peak values identified as most likely corresponding to the neck, the left and right elbows, the left and right wrists, the left and right hands, the left and right hips, the left and right knees, or the left ankle of the user 180, or any other score maps corresponding to any other body parts, in addition to the score maps 140-1-3L, 140-16-3L. Alternatively, processors associated with an imaging device may operate one or more classifiers, algorithms or techniques to recognize any number of body parts within a digital image frame, including any of the body pats shown in FIG. 1C and/or any number of other body parts that are not shown in FIG. 1C.

Although FIG. 1C includes score maps 140-1-3L, 140-16-3L generated based on the image 130-3L captured by the imaging device 125-2 at time $t_3$, processors associated with the imaging device 125-2 may be configured to generate score maps based on any of the image frames captured thereby, including but not limited to the image frames 130-1L, 130-2L, 130-4L captured at times $t_1$, $t_2$, $t_4$. Likewise, processors associated with the imaging device 125-1 may be configured to generate score maps based on any of the image frames captured thereby, including but not limited to the image frames 130-1R, 130-2R, 130-3R, 130-4R captured by the imaging device 125-1 at times $t_1$, $t_2$, $t_3$, $t_4$, e.g., using the same classifiers, algorithms or techniques utilized by the imaging device 125-2, or by one or more different or alternative classifiers, algorithms or techniques.

After processors associated with each of the imaging devices 125-1, 125-2 independently generates score maps for each of the image frames captured thereby, the respective score maps may be evaluated by such processors to determine positions of body parts within such image frames. Processors associated with an imaging device may identify a set of body part candidates for a given body part based on peak values represented within respective score maps generated for that body part, and locations of such candidates within the image frames, e.g., locations of pixels potentially corresponding to the body part within the image frames, may be extracted from the score maps. For example, referring to FIGS. 1C and 1D, the score map 140-1-3L generated by processors associated with the imaging device 125-2 includes probabilities that pixels representing heads are included in the image frame 130-3L that was captured during the performance of one or more gestures at time $t_3$, and identifies the region 145-1-3L of peak values that most likely correspond to the head 160-1 of the actor 180. Similarly, the score map 140-16-3L generated by processors associated with the imaging device 125-2 includes probabilities that pixels representing right ankles are included in the image frame 130-3L that was captured during the performance of one or more gestures at time $t_3$, and identifies the region 145-16-3L of peak values that most likely correspond to the right ankle 160-16 of the actor 180.

Processors associated with each of the imaging devices 125-1, 125-2 that generate score maps for digital image frames, such as the score maps 140-1-3L and 140-16-3L shown in FIG. 1C and FIG. 1D, may use such score maps to detect and locate a plurality of candidates of body parts based on peak values within such maps. As is shown in FIG. 1E, processors associated with the imaging device 125-2 may identify detections of body parts within a single image frame, viz., the image frame 130-3L that was captured at time $t_3$, based on peak values within respective score maps 140-1-3L through 140-16-3L. Thus, based on such score maps 140-1-3L through 140-16-3L, a head 160-1-3L, a neck 160-2-3L, a left shoulder 160-3-3L, a right shoulder 160-4-3L, a left elbow 160-5-3L, a right elbow 160-6-3L, a left wrist 160-7-3L, a right wrist 160-8-3L, a left hand 160-9-3L, a right hand 160-10-3L, a left hip 160-11-3L, a right hip 160-12-3L, a left knee 160-13-3L, a right knee 160-14-3L, a left ankle 160-15-3L and a right ankle 160-16-3L are detected and located within the image frame 130-3L that was captured at time $t_3$.

Where a position of a body part of an actor is detected in a given image frame, positions of one or more other body parts may be determined based on the detected position, e.g., according to a regression analysis based on one or more actual and/or predicted physiological parameters or constraints of the actor, including but not limited to distances between such parts, or ranges of motion of such parts. For example, a field of vectors extending from a position of one detected body part to possible positions of other body parts may be generated based on one or more of such parameters or constraints and used to determine or refine positions of such other body parts. As is shown in FIG. 1F, a vector field (or regression map) 150-1-3L is generated based on the detected position of the head 160-1-3L of the actor 180 in the image frame 130-3L. The vector field 150-1-3L includes a plurality of vectors 152-1-3L through 152-16-3L extending from the detected position of the head 160-1-3L of the actor 180 to possible positions of the other body parts of the actor 180 within the image frame 130-3L. The vectors 152-1-3L through 152-16-3L are generated with respect to the detected position of the head 160-1-3L within the image frame 130-3L, with each of the vectors having a distance and/or a bearing or angle to a corresponding one of the body parts of the actor 180. The vector field 150-1-3L may include a vector 152-1-3L extending from the detected position of the head 160-1-3L of the actor 180 to a more likely position of the head 160-1-3L, along with vectors 152-2-3L through 152-16-3L extending to positions of other body parts of the actor 180, e.g., a neck, left and right elbows, left and right wrists, left and right hands, left and right hips, left and right knees, or a left ankle.

The vectors 152-1-3L through 152-16-3L of the vector field 150-1-3L may be generated subject to any known physiological parameters or constraints for a human body, including but not limited to lengths or distances of one or more body parts, or configurations of such body parts with respect to one another. For example, a femur extends between a hip and a knee has a length of approximately 50.5 centimeters in an average adult male. Similarly, a tibia and a fibula extend between a knee and an ankle, and have lengths of approximately 43.0 centimeters and 40.5 centimeters, respectively, in an average adult male. A humerus, which extends between a shoulder and an elbow, has a length of approximately 36.5 centimeters in an average adult male, while ulna and radii, which extend between elbows and hands, have lengths of approximately 28.2 centimeters and 26.4 centimeters, respectively, in average adult males. Likewise, it is commonly understood that knees are connected to hips and ankles, but not to shoulders, and that heads are connected to necks, but not to wrists. Such parameters or constraints, which may include not only bone lengths or configurations but also distance constraints, articulation constraints or deformation constraints, should be both feasible and proportional for humans, and must remain constant over time, given that actors may not typically change the lengths of their limbs or their respective configurations or orientations over time. In some implementations, standard body proportions such as those defined by the Vitruvian Man of Leonardo da Vinci, or similar ratios or proportions, may be used determine relations of dimensions of two or more body parts to one another. Alternatively, known physiological parameters or constraints for bodies other than those of humans, or parameters or constraints of robots or other machines, may also be considered when generating such vectors or vector fields.

As is shown in FIG. 1G, processors associated with the imaging device 125-2 may generate a plurality of vector fields 150-1-3L through 150-16-3L based on the image frame 130-3L, with each of the vector fields 150-1-3L through 150-16-3L including vectors having distances and/or bearings or angles to a corresponding one of the body parts of the actor 180. For example, as is discussed above with regard to FIG. 1G, the vector field 150-1-3L may include a plurality of vectors extending from a detected position of the head 160-1-3L within the image frame 130-3L to positions of each of a plurality (e.g., sixteen) of other body parts, including but not limited to the head 160-1-3L.

Additionally, as is also shown in FIG. 1G, vector field 150-2-3L may include a plurality of vectors extending from a detected position of a neck 160-2-3L within the image frame 130-3L to positions of each of a plurality of other body parts, including but not limited to the neck 160-2-3L. The vector field 150-16-3L may include a plurality of vectors extending from a detected position of a right ankle 160-16-3L within the image frame 130-3L to positions of each of a plurality of other body parts, including but not limited to the right ankle 160-16-3L.

Processors associated with the imaging device 125-2 may also generate thirteen other vector fields (not shown in FIG. 1G) including vectors extending from positions of other detected body parts of the actor 180, e.g., a neck, left and right elbows, left and right wrists, left and right hands, left and right hips, left and right knees, or a left ankle of the user 180, to positions of other body parts of the actor 180, in addition to the vector fields 150-1-3L, 150-2-3L, 150-16-3L shown in FIG. 1G.

Once positions of the body parts of an actor are detected within a digital image frame captured by an imaging device, processors associated with the imaging device may determine visual features of pixels of the digital image frame corresponding to such positions and store such visual features in association with such positions. For example, visual features of pixels associated with such positions may be recognized by any algorithm or technique, e.g., by one or more image segmentation, image filtering, image smoothing and/or image localization techniques, using the one or more processors operating on an imaging device.

As is shown in FIG. 1H, a portion of the image frame 130-3L depicting the actor 180 executing one or more gestures at time $t_3$ and a record 165-3L of data generated by the imaging device 125-2 regarding the contents of the image frame 130-3L are shown. The record 165-3L includes data regarding contents of the image frame 130-3L, including but not limited to the positions 160-1-3L through 160-16-3L of the body parts of the actor 180 (e.g., coordinate positions within the image frame 130-3L) that were detected within the image frame 130-3L or identified based on detected positions. Although the positions 160-1-3L through 160-16-3L are expressed in two-dimensional coordinate pairs, e.g., (x, y) positions within the image frame 130-3L, the body part detections identified by processors associated with the imaging devices in accordance with the present disclosure may be represented with either two-dimensional coordinate pairs that identify a position of a body part within an image plane, such as is shown in FIG. 1H, or, alternatively, with three-dimensional coordinate sets, e.g., (x, y, z) coordinates that identify a position of a body part within three-dimensional space.

Additionally, the record 165-3L includes color data 162-1-3L through 162-16-3L regarding one or more pixels located at such positions 160-1-3L through 160-16-3L, e.g., with portions of red, green or blue in image pixels expressed in three corresponding numbers ranging from 0 to 255 in value according to an RGB color model. The record 165-3L further includes texture data 164-1-3L through 164-16-3L regarding one or more pixels located at the positions 160-1-3L through 160-16-3L, e.g., measures of spatial variation in pixel intensities at such positions. Alternatively, or additionally, processors associated with an imaging device may calculate or determine any other measures of the colors and/or textures within the image frame at the positions 160-1-3L through 160-16-3L, including but not limited to the color data 162-1-3L through 162-16-3L or the texture data 164-1-3L through 164-16-3L shown in FIG. 1H.

Thus, as is shown in FIG. 1I, processors associated with the imaging device 125-2 may extract a variety of data from a digital image frame, viz., the image frame 130-3L, regarding one or more actors depicted therein, including but not limited to the positions 160-1-3L through 160-16-3L of the detected body parts, the vector fields 150-1-3L through 150-16-3L (e.g., regressions) of such body parts, and/or the visual features 162-1-3L through 162-16-3L, 164-1-3L through 164-16-3L of the portions of the digital image frame 130-3L corresponding to the positions 160-1-3L through 160-16-3L.

Based on such data, processors associated with imaging devices may also be configured to generate detection graphs having nodes corresponding to positions of the body parts of actors within digital image frames and edges extending between pairs of such nodes and corresponding to probabilities that such nodes are connected to one another, and correspond to a common actor. As is shown in FIG. 1J, processors associated with the imaging device 125-2 may generate a detection graph 170-1L based on the positions of body parts, the body part regressions and the visual features identified in the digital image frame 130-1L captured by the imaging device 125-2 at time $t_1$. Additionally, based on the detection graph 170-1L, and also the positions of body parts, the body part regressions and the visual features identified in the digital image frame 130-2L captured by the imaging device 125-2 at time $t_2$, the processors associated with the imaging device 125-2 may generate an updated detection graph 170-2L. By generating the updated detection graph 170-2L based on both the digital image frame 130-2L captured at time $t_2$ and the detection graph 170-1L, rather than independently generating a detection graph based on the digital image frame 130-2L alone, the processors associated with the imaging device 125-2 may propagate the identities of specific body parts from one digital image frame to a succeeding digital image frame, while also ensuring that a body part may be detected and tracked over a period of digital image frames without any statistically aberrant fluctuations in the positions of nodes or edges extending between such nodes, which may result from temporary occlusions within the field of view of the imaging device 125-2 or any other event or circumstance occurring within the scene 120.

Similarly, as is also shown in FIG. 1J, the processors associated with the imaging device 125-2 may generate an updated detection graph 170-3L based on both the digital image frame 130-3L captured at time $t_3$ and the updated detection graph 170-2L. In some implementations, the processors associated with the imaging device 125-2 may continue to update a detection graph for each of a predetermined number of image frames, e.g., a rolling window of the image frames, rather than an entire set of the image frames captured by the imaging device 125-2, and may discard the effects of data extracted from image frames that were captured outside of the rolling window.

As is shown in FIG. 1K, the detection graph 170-3L generated by the processors associated with the imaging device 125-2 includes nodes corresponding to the positions 160-1-3L through 160-16-3L and edges extending between such nodes, as detected from the image frame 170-3L captured at time $t_3$. The edges may represent probabilities that the respective nodes are associated with a common actor. The number of edges represented in a detection graph, and the probabilities that each of such edges extends between nodes corresponding to a common actor, is dependent upon a number of actors that have one or more body parts depicted within an image frame upon which the detection graph was generated. As is shown in FIG. 1L, the processors associated with the imaging device 125-2 may generate a local skeleton 175-3L for the actor at the time $t_3$, including nodes corresponding to positions of the respective body parts and edges connecting such body parts.

Local skeletons that are generated by processors associated with each of the imaging devices 125-1, 125-2 at the scene 120 may be provided to a server 122, e.g., by wired or wireless means, according to any communications protocol, and utilized to generate global skeletons corresponding to each of the actors that are on the scene 120 and detected within digital image frames captured by the imaging devices 125-1, 125-2, e.g., the actor 180.

As is shown in FIG. 1M, the local skeletons 175-1L, 175-2L, 175-3L generated by the processors associated with the imaging device 125-2 based on the image frames 130-1L, 130-2L, 130-3L captured at time $t_1$, $t_2$, $t_3$ and local skeletons 175-1R, 175-2R, 175-3R generated by the processors associated with the imaging device 125-1 based on the image frames 130-1R, 130-2R, 130-3R captured at time $t_1$, $t_2$, $t_3$ are provided to the server 122, e.g., by wired or wireless means, according to any communications protocol, along with identifiers of such skeletons 175-1L, 175-2L, 175-3L, 175-1R, 175-2R, 175-3R, and visual features (e.g., color data and/or texture data) regarding the respective nodes corresponding to body parts within such skeletons 175-1L, 175-2L, 175-3L, 175-1R, 175-2R, 175-3R. The skeletons 175-1L, 175-2L, 175-3L, 175-1R, 175-2R, 175-3R may be generated based on detection graphs that are generated and/or updated by the processors associated with the imaging devices 125-1, 125-2, and provided to the server 122, e.g., in real time or in near-real time. Once the local skeletons depicted within a plurality of image frames and their identifiers have been provided to the server 122 from each of the cameras or other imaging devices of a network, e.g., the imaging devices 125-1, 125-2, the server 122 may determine which of the local skeletons appearing in two or more fields of view of such imaging devices corresponds to a common actor, and correlate such models or body parts thereof to generate a global skeleton accordingly, in real time or near-real time.

As is shown in FIG. 1N, the server 122 may determine whether nodes corresponding to each of the respective body parts represented in local skeletons generated by processors associated with two or more imaging devices from synchronized image frames correspond to a common body part of an actor within the fields of view of the two or more imaging devices, and generate a global skeleton 176 based on the local skeletons 175-1L, 175-2L, 175-3L, 175-1R, 175-2R, 175-3R. For example, the server 122 may attempt to match the positions of common body parts of two or more of the local skeletons, e.g., by triangulation, or to match the appearances of such body parts in two or more of the local skeletons, e.g., based on the visual features of such body parts provided by the respective imaging devices. Information or data regarding a head of the skeleton 175-1L generated by processors associated with the imaging device 125-2 based on the image 130-1L captured at time $t_1$ (e.g., a position of the head, or visual features of the head, such as colors and/or textures of pixels corresponding to the head) may be probabilistically compared to corresponding information or data regarding a head of the local skeleton 175-1R generated by processors associated with the imaging device 125-1 based on the image 130-1R captured at time $t_1$ to determine whether such detections correspond to the same head, and edges between such detections may be contracted accordingly, i.e., by determining that probabilities corresponding to such edges are sufficiently high. If the probabilities are sufficiently high, the global skeleton 176 may be generated based at least in part on such nodes and edges. Alternatively, where probabilities corresponding to edges between two body parts of different local skeletons are determined to be sufficiently low, such edges may be ignored from consideration. For example, the nodes connected by such edges may be determined to correspond to body parts that do not belong to the same actor, or one or both of such nodes may be determined to not correspond to body parts at all, i.e., to be false detections.

Where a local skeleton generated by processors associated with an imaging device includes position and/or visual features or other appearance data for each a plurality of body parts, the server 122 may attempt to match the local skeleton to one or more local skeletons generated by imaging devices having different views by any means. For example, the central server may attempt to generate virtual three-dimensional rays that originate at optical elements of the respective imaging devices (e.g., optical centers) and extend through one or more pixels corresponding to surfaces of objects within image frames, in real time or near-real time, based on the intrinsic properties of such imaging devices and extrinsic properties of a scene. Such rays may be merged into a single global skeleton (or model), e.g., by merging the rays corresponding to such detections, thereby enabling a body part to be detected and re-detected in the multiple views even if the body part is temporarily occluded in one of the views.

Additionally, the server 122 may assign a unique identifier to the global skeleton, e.g., a master identifier, and associate the unique identifier of the global skeleton with the respective identifiers of the local skeletons identified in image frames captured by the imaging devices 125-1, 125-2. Subsequently, when additional information or data regarding local skeletons generated from image frames captured by the imaging devices 125-1, 125-2 or other imaging devices at the scene 120 (not shown) is received, identifiers of the respective local skeletons may be used to determine whether such other skeletons are already being tracked by the central server, or whether such other skeletons identify a new actor on the scene 120. If a local skeleton is identified as already being tracked based on its identifier, then positions of the respective body parts of the global skeleton having a master identifier associated with the identifier may be updated accordingly. If a local skeleton is identified as not being tracked based on its identifier, then the local skeleton may be used to generate a global skeleton if a corresponding local skeleton is received from another imaging device. Alternatively, the local skeleton may be stored in a data store in one or more records of unmatched local skeletons if no other imaging device has identified any corresponding local skeletons. A predetermined number of detection graphs may be generated from image frames captured by each of the imaging devices over a finite period of time and provided to the central server for consideration, and the global skeletons may be updated based on such positions accordingly.

Accordingly, the systems and methods of the present disclosure may enhance the processes by which actors are detected and tracked in three-dimensional space by cameras or other imaging devices of a network by splitting the processes into two parts, viz., detection, a task that may be performed by processors associated with the cameras or imaging devices, and tracking, a task that may be performed by a server in communication with the cameras or imaging devices. In some implementations, the processing power of the respective cameras or other imaging devices may be exploited in order to detect body parts and independently generate local skeletons or other models on a local level, while a server may receive such local skeletons and generate and track global skeletons on a global level, based on local skeletons generated by processors associated with the cameras or other imaging devices in the network, from image frames captured thereby. For example, in some implementations, one or more classifiers operating on processors associated with such imaging devices may be used to detect and track positions of body parts depicted within the image frames, and detection graphs representing body parts of local skeletons or other articulated models of actors may be generated accordingly. Such models may be generated subject to an assumption that detections for a given actor in an image frame captured by one imaging device are independent of and not related to detections in image frames captured by any other imaging device.

Detection graphs generated by processors associated with imaging devices may be provided to a server, which may generate global skeletons or models from local skeletons or models of a common actor that are generated by processors associated with imaging devices based on image frames captured thereby and correlated. Vectors or trajectories representative of motion of the individual body parts, e.g., splines, such as basic splines or B-splines, may be formed from the detections within each image frame, and used to temporally merge motion of a given body part within consecutive image frames captured by a single imaging device. The server may merge the motion of the given body part across synchronized image frames captured by multiple imaging devices, e.g., into one or more basic splines, and to merge the motion of multiple body parts into a common global skeleton (or model) of an actor. The mergers of the body parts may be made between detections of compatible body parts within image frames captured by multiple imaging devices, and made subject to logical and physiological parameters and constraints, including one or more of the parameters or constraints discussed above. Moreover, such parameters and constraints may be used to determine a self-regression of a given body part, and to correct its actual position versus a detected position identified in one or more image frames. From the local skeletons, a global skeleton or model of an actor may be generated by a server in real time or near-real time. In some implementations, a local skeleton, or a global skeleton, may be generated as a vector or record that is representative of the smoothed three-dimensional motion of the various body parts that are merged together and best fits the respective detections of the respective body parts by the respective imaging devices.

Accordingly, implementations of the systems and methods of the present disclosure may recognize and track one or more actors within a scene, and the gestures executed by such actors, using digital images (e.g., visual images and/or depth images) captured by one or more imaging devices that include all or portions of a scene within a common field of view. The digital images may be processed by processors associated with the respective imaging devices using one or more trained classifiers, e.g., deep neural networks, convolutional neural networks, support vector machines, or the like, operating thereon to recognize body part candidates within the images, e.g., as represented in one or more score maps or other metrics generated by such classifiers. Detection graphs generated by processors associated with the respective imaging devices, along with identifiers of two-dimensional articulated models or virtual skeletons depicted therein, may be provided by the respective imaging devices to a server or other computer device, where such detection graphs may be evaluated to determine which of such detections corresponds to a common actor, in real time or near-real time.

The compatibility of body part candidates that are detected within image frames, e.g., whether such body part candidates may possibly correspond to body parts of the same actor (e.g., a person), may be determined according to at least three content-based relationships between and among the respective image frames. First, for a selected image frame and a selected imaging device, whether two detections of candidates identified by the imaging device for the selected image frame may possibly correspond to two different body parts of a single actor may be determined by processors associated with the imaging device. Second, for a selected body part type and a selected imaging device, whether two detections of candidates identified by the imaging device for a pair of successive image frames may possibly correspond to a single body part in motion over a period of time between the capture of each of the successive image frames by the imaging device may be determined by processors associated with the imaging device. Third, for a selected pair of synchronized image frames and a selected body part type, whether two detections of candidate body parts identified by imaging devices may possibly correspond to a single body part of the given body part type located in a common position in three-dimensional space may be determined by a server or other system in communication with each of the imaging devices. This tripartite analysis of body part candidates that are detected in two-dimensional imaging data, e.g., image frames captured by one or more imaging devices, simplifies processes for recognizing body parts or gestures involving such body parts by logically determining which of a plurality of body parts belongs to the same person, or to different people.

Likewise, a number of content-based relationships may determine whether body part candidates do not correspond to the same person, e.g., whether such body part candidates are incompatible with one another. For example, it is axiomatic that each person has only one head, only one neck, only one left shoulder, and so on and so forth. Therefore, where it is determined that an image frame is determined to likely depict two or more heads, necks or left shoulders, such body parts must necessarily belong to different people, and are incompatible with one another, or, alternatively, one or more of the detections may be false. Next, where one image frame is determined to likely depict a type of body part in a specific location in space, and a synchronized image frame depicts the same type of body part in a different, non-corresponding location in space, the two body parts cannot be the same, and are incompatible with one another.

Body parts that are identified as likely depicted within one or more image frames may also be subjected to a number of immutable, physiological parameters or constraints. Where two distinct body parts are likely depicted in an image frame, the two body parts must be within a typical physiological range of one another, e.g., a distance ordinarily observed in humans, if the two body parts may be determined to belong to the same person. For example, in nearly every adult human, shoulders are typically located no closer than ten centimeters from a head, and no farther than fifty centimeters from the head. Therefore, where a shoulder and a head are likely depicted in an image frame at a range of less than ten centimeters or greater than fifty centimeters from one another, the two body parts cannot belong to the same person, and are incompatible with one another. Similarly, separations between a hip and a knee, a knee and an ankle, must remain consistent with traditional lengths of a femur and a tibia or fibula, respectively, if such body parts are to be determined to belong to the same person. Furthermore, humans are typically ground-based animals that move at predictable speeds and in predictable directions or angular extents.

After a plurality of body part candidates have been identified, compatible body part candidates may be associated with one or more other body part candidates, e.g., within common image frames, or with each other, e.g., across multiple image frames, and incompatible body part candidates may be removed from consideration. Compatible body party candidates may be grouped together subject to a number of logical operations. First, edges between detections of a body part may be tracked over time, e.g., within image frames captured from a single imaging device, and temporally merged. A trajectory, or "tracklet," representative of the motion of the body part within image frames may be generated based on the presence of the body part within image frames captured by a single imaging device, e.g., from a common field of view. The trajectories may be generated over a predetermined number or series of frames (e.g., tens of frames or more), subject to any compatibility or incompatibility parameters or constraints.

Finally, detected body parts may be merged together into a virtual skeleton or another articulated model of a common actor. To merge detected body parts, first, strong reciprocal affinities between body parts may be identified, such as by evaluating consecutive image frames captured by an imaging device, and identifying pairs of body parts that are observed to consistently move with respect to one another, or to regress to one another, without any other options for compatible body parts. For example, for each detected body part, and for each of the other body parts, a nearest detection of another body part is identified and a level of affinity between the body parts is determined. In some implementations, edges between pairs of nodes corresponding to detections of body parts may be assigned probabilities that the detections each correspond to body parts of the same actor, or weights that favor a given of nodes over a different pair of nodes. A pair of body parts are deemed to have strong reciprocal affinity if each of the body parts has mutual one-directional affinity with one another, i.e., if a head is determined to have sufficiently strong affinity with only one neck, and if the neck is determined to have sufficiently strong affinity with only the head. Each of the affinities between pairs of body parts may be weighted and sorted in decreasing weight order, and such affinities must satisfy any known incompatibility constraints. A detection graph having nodes corresponding to each of the detections, and edges extending between such nodes, may be generated by an imaging device for each of the image frames captured thereby. Next, body parts identified in detection graphs may be matched across multiple views and converted to virtual three-dimensional rays that begin at optical elements of the respective imaging devices (e.g., optical centers) and extend through portions of images corresponding to objects within image planes to surfaces of objects corresponding to a given pixel, based on the intrinsic properties of the calibrated imaging devices and extrinsic properties of a scene, and merged into one, e.g., by triangulating the rays corresponding to such detections, thereby enabling a body part to be detected and re-detected in the multiple views even if the body part is temporarily occluded in one of the views.

In accordance with implementations of the present disclosure, the capture and/or analysis of imaging data by one or more imaging devices or servers in accordance with the present disclosure, may be initiated or triggered in any manner, or based on the detection of any specific occurrence or event requiring the real time tracking of actors using digital imagery. For example, where one or more imaging devices is provided in a network at a materials handling facility, and aligned or configured to capture imaging data such as still or moving images of actions or events occurring within their respective fields of view, the capture and/or analysis of imaging data in accordance with the present disclosure may be initiated upon detecting based changes in loading on a storage unit at the materials handling facility (e.g., due to picking or stowing events, or other events in which one or more items are placed thereon or removed therefrom), as detected by one or more load sensors. In other implementations, the capture and/or analysis of imaging data may be initiated upon receiving one or more signals from radiofrequency identification (RFID) sensors (e.g., antennas and/or tags), light detection and ranging (LIDAR) sensors (e.g., laser light sources and/or receivers), or from any other type or form of sensors provided at the materials handling facility.

In some other implementations, the analysis of imaging data in accordance with the present disclosure may be initiated based on the imaging data itself. For example, in any set of imaging data (e.g., video data captured by an imaging device), aspects of any number of occurrences or events may be depicted therein, and imaging data may be continuously or regularly monitored in order to determine whether an occurrence or an event requiring the real time tracking of actors using digital imagery has occurred.

An occurrence or event requiring the real time tracking of actors using digital imagery may be detected based on any analysis of imaging data captured by one or more imaging devices, such as where contents of a scene are determined to have changed in any pair of images (e.g., a before-and-after comparison of images depicting aspects of a storage unit or other aspect of a materials handling facility, or another scene, at different times). In some other implementations, an occurrence or an event may be detected where one or more body parts (e.g., a hand of an actor) are determined to be located within a predetermined range or distance of a specific object (e.g., a storage unit or other aspect of a materials handling facility) in one or more images. Therefore, a scene such as a materials handling facility need not require or include any sensors other than imaging devices to determine that an event involving one or more items has occurred, particularly where imaging data being captured by the imaging devices is analyzed on a regular basis. Rather, occurrences or events may be detected and locations of such occurrences or events may be determined based on information or data that has already been captured, e.g., by one or more imaging devices. For example, in some implementations, imaging data may be continuously or regularly evaluated to determine whether an occurrence or event has occurred. In such implementations, imaging data may be processed according to one or more of the systems or methods disclosed herein if an event is determined to have occurred, to a predetermined level of confidence or accuracy, or discarded when it is determined that no event has occurred.

Moreover, an event may be determined to have occurred based on information or data obtained by a combination of sensors. For example, information or data may be captured by an imaging device, a load sensor, or any other sensors (e.g., any RFID sensors, LIDAR sensors, or any other type or form of sensors). The information or data captured by the variety of sensors may be independently or collectively evaluated in order to determine a measure of a probability or likelihood that an occurrence or an event has taken place at a scene such as a materials handling facility, and processed according to one or more of the systems or methods disclosed herein if an event is determined to have occurred, to a predetermined level of confidence or accuracy, or discarded when it is determined that no event has occurred. Likewise, a location of an event may be determined based on information or data captured by any of such sensors, which may be independently or collectively evaluated in order to identify the location at which the event has most likely occurred.

Those of ordinary skill in the pertinent arts will recognize that imaging data, e.g., visual imaging data, depth imaging data, infrared imaging data, radiographic imaging data, or imaging data of any other type or form, may be captured using one or more imaging devices such as digital cameras, depth sensors, range cameras, infrared cameras or radiographic cameras. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green or blue) of the reflected light, or distances to objects from which the light was reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network, such as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBz or RGBD imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue is expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by identifying areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

Implementations of the present disclosure are directed to determining poses (e.g., positions and orientations) of one or more actors in a scene or other common region of interest, e.g., within a materials handling facility, as depicted within digital image frames captured from the fields of view of multiple imaging devices. In some implementations, the systems and methods disclosed herein may be configured to produce a full body model of an arbitrary (and unknown) number of actors such as humans or, alternatively, one or more other non-animals or machines that have been simultaneously recorded by multiple color cameras during a certain time interval. Such systems and methods may be configured to predict or determine positions, first at a local level, e.g., by processors associated with one or more of the imaging devices, and next at a global level, e.g., by a central server or other computer device, of each of the body parts of each of one or more actors over an entire time interval, with a goal of both determining a number of the actors present within a scene, and also independently tracking their respective motion.

In some implementations, imaging devices may be configured to capture a plurality of digital image frames, in series, and to process such image frames according to one or more body part detection techniques, to recognize one or more joints or other body parts depicted within each of the image frames. The imaging devices may include or be associated with processors operating one or more classifiers, algorithms or techniques that are trained to recognize body parts such as heads, necks, and left or right shoulders, elbows, wrists, hands, hips, knees, ankles, or any other body parts, that are depicted within image frames captured thereby. Such processors may be embedded with, coupled to or otherwise included within the imaging devices. Additionally, the processors associated with an imaging device may operate any classifier, algorithm or technique on an image frame to identify body parts depicted therein, in accordance with the present disclosure, including but not limited to classifiers, algorithms or techniques such as deep neural networks, convolutional neural networks or support vector machines.

Based on the detections of body parts within an image frame, a detection graph having nodes corresponding to originally detected body parts and edges that link pairs of such nodes may be generated by processors associated with the imaging device that captured the image frame, with each of the linked nodes having a sufficiently strong affinity with one another. Processors associated with the imaging devices may each independently generate a detection graph based on image frames captured thereby, and use the detection graph to generate local skeletons. The local skeletons may be transferred to a central server or other computer device, where the respective local skeletons may be compared to one another in order to determine which of the local skeletons correspond to a single actor. Moreover, motion of the actor may be determined by optimizing a global skeleton or model of an actor over time. For example, trajectories of the respective body parts of the actor may be independently modeled by the imaging devices as trajectories or splines within single fields of view and best fit together with one another by the server across multiple fields of view in forming and refining the global skeleton accordingly.

In some implementations of the present disclosure, processors associated with an imaging device may generate score maps representative of probabilities that a given body part appears in an image frame captured by the imaging device, e.g., by a trained classifier, such as a deep neural network, a convolutional neural network or a support vector machine, and peak values in the score maps may be extracted accordingly in order to obtain unique detections of each body part from a field of view of the imaging device. For a given image frame, one score map may be generated for each body part under consideration. For example, where an imaging device operates a neural network that is trained to recognize discrete body parts such as head, necks, left shoulders and right shoulders, among others, within images, the neural network may generate, for a given image frame, one score map indicating probabilities that each of the pixels within the image frame includes a head, a neck, a left shoulder, a right shoulder, and so on and so forth. Using the score maps and the peak values extracted therefrom, possible correspondences between pairs of detections in the multiple fields of view (e.g., compatible detections), and impossible correspondences between such pairs of detections (e.g., incompatible detections) may be identified. Based on detections of body parts that are compatible with one another, hypothetical positions of body parts may be established, e.g., where rays corresponding to the peak values of score maps from each of the respective fields of view may be deemed to intersect. Three-dimensional trajectories or "tracklets" consistent with the motion of the body parts may be constructed, subject to compatibility (or incompatibility) parameters or constraints.

In some implementations of the present disclosure, an imaging device may be configured to capture both visual images (e.g., color, grayscale and/or black-and-white images) and depth images, and to recognize one or more body parts based on the visual images and the depth images. For example, processors associated with an imaging device may operate one or more classifiers, algorithms or techniques that are trained to recognize outlines, colors, textures or other visual features of specific body parts, as depicted within a visual image captured by the imaging device, and also shapes, contours or other external surface features of specific body parts, as depicted within depth images captured by the imaging device. Processors associated with the imaging device may detect a body part based on both the visual features of the body part, and the external surface features of the body part. Processors associated with the imaging device may further generate and update a detection graph based on the detected positions of the body parts in three dimensions, e.g., defined by (x, y, z) coordinate sets for such positions, and also their visual features, and may generate one or more local skeletons based on detection graphs as generated or updated for each of a plurality of visual image frames and/or depth image frames captured thereby.

In some implementations of the present disclosure, an imaging device may be configured to generate and update detection graphs having nodes corresponding to positions of body parts and edges extending therebetween based on monocular cues detected from single image frames. For example, processors associated with an imaging device may be configured to operate a classifier, an algorithm or a technique that is trained to recognize one or more actors on a scene, as well as features of specific scenes such as structural elements including but not limited to walls, buildings and/or windows, ground-based features such as streets, walkways, or the like, or plant life, depicted within image frames captured thereby. Positions of the actors in two-dimensional space, e.g., within an image plane of the imaging device, or in three-dimensional space, e.g., based on distances or depths to the actors may be determined based on the one or more specific features of the scene. In some implementations, the classifiers, algorithms or techniques may take into account one or more known attributes of a scene, or prior activities that occurred on the scene, in determining positions of body parts of actors on the scene either in two-dimensional space within an image plane of the imaging device or in three-dimensional space on the scene. Such classifiers, algorithms or techniques may include, but are not limited to, a Markov Random Field, a Markov network or other like model. Processors associated with the imaging device may also detect one or more body parts of actors within image frames captured thereby and determine their respective positions or extend edges therebetween based on one or more actual and/or predicted physiological parameters or constraints (e.g., known or predicted bone lengths).

A global skeleton may be generated by a server or other computer device based on local skeletons generated by processors associated with imaging devices according to any method or technique. For example, a global skeleton may be generated based on a first local skeleton generated by a first imaging device using score maps calculated for each of a plurality of body parts from one or more image frames captured thereby, based on a second local skeleton generated by a second imaging device using visual image frames and depth image frames, and/or based on a third local skeleton generated by a third imaging device from a single visual image, e.g., by monocular depth analyses. Each of the local skeletons may include a plurality of points in two-dimensional planes and/or in three-dimensional space.

The systems and methods of the present disclosure may be utilized in any number of applications in which the detection and tracking of actors within multiple views is desired, including but not limited to the motion of one or more human operators within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

In some implementations, one or more of the systems and methods disclosed herein may be used to detect and distinguish between actors (e.g., customers) and recognize their respective interactions within a materials handling facility, including but not limited to interactions with one or more items (e.g., consumer goods) within the materials handling facility. For example, in some implementations, a large number of imaging devices may be installed in various locations and aligned with uniquely overlapping fields of view. Each of the imaging devices may capture streams of imaging data from their respective fields of view, and may process the respective image frames of such streams according to one or more body part detection techniques. The imaging devices may then generate detection graphs for each of the image frames, with the detection graphs including nodes corresponding to positions of joints or other body parts within the image frames and edges connecting the nodes. The respective imaging devices may provide the detection graphs for each of the image frames to a central server along with identifiers of local skeletons or models (e.g., "local skeletons") or portions thereof depicted within such image frames, as well as visual features of the portions of the image frames corresponding to each of the nodes. The server may synchronize the detection graphs and correlate the positions of their corresponding body parts to determine which of the body parts belong to a common actor. Where a local skeleton of an actor appears within the fields of view of two or more imaging devices, positions of aspects of the actor (e.g., body parts) may be correlated, e.g., by triangulation, and a three-dimensional skeleton or model (or a "global skeleton") may be generated based on the positions of the body parts of each of the local skeletons. An identifier of the global skeleton (e.g., a "master identifier") may be associated with identifiers of the one or more local skeletons from which the global skeleton was generated. Subsequently, when a detection graph is received from an imaging device, and includes position data for one or more body parts of a local skeleton that is associated with a global skeleton already being tracked, the server may immediately associate such points with the global skeleton and update the global skeleton accordingly.

In this regard, the server may more rapidly track positions of actors within a scene based on local skeletons or models generated by a number of imaging devices. Because the initial detections are made by processors associated with the respective imaging devices, either embedded with, coupled to or otherwise included within such devices, data transferred to the server by such imaging devices may include detection graphs (e.g., positions of body parts) as well as identifiers of local skeletons expressed within the detection graphs, and visual features of the local skeletons, and the server need not receive and process actual image frames thereon in their entirety. For this reason, the server may model the poses (e.g., positions and orientations) of actors within a scene based on the positions of any number of imaging devices and their respective detection graphs for each image frame captured thereby, more quickly, efficiently and accurately than if the server had been required to conduct all processing operations thereon, including both detection and tracking of such actors. Implementations of the systems and methods disclosed herein may thus be utilized to detect and track actors within transportation centers, financial institutions or like structures in which diverse collections of people, objects or machines enter and exit from such environments at regular or irregular times or on predictable or unpredictable schedules. By relying on multiple imaging devices, motion of an actor may be detected and tracked even when the actor, or one or more body parts thereof, is temporarily occluded in one or more of the fields of view of the imaging devices.

Figure 2A:
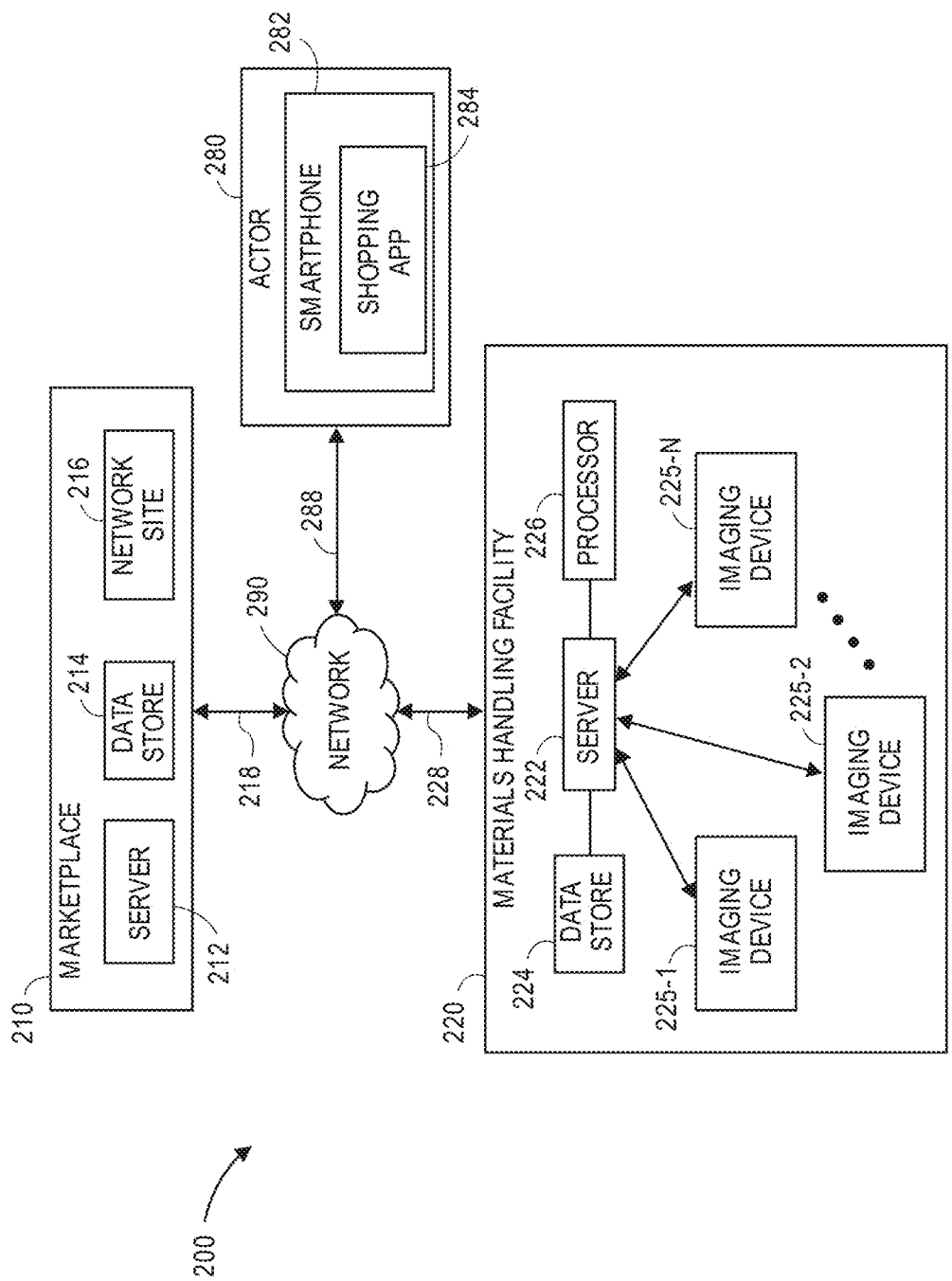
FIGS. 2A and 2B are block diagrams of components of one system for real time tracking of actors using digital imagery in accordance with implementations of the present disclosure.
Figure 2B:
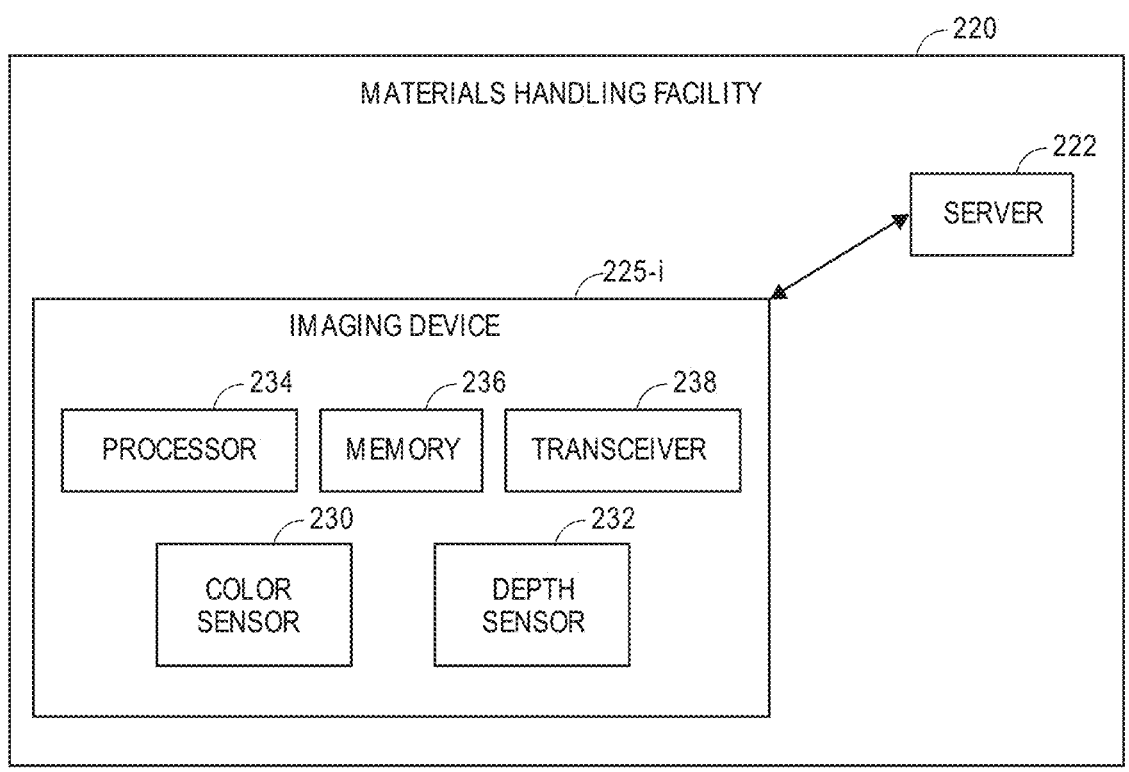

Referring to FIGS. 2A and 2B, a block diagram of components of one system 200 for real time tracking of actors using digital imagery in accordance with implementations of the present disclosure is shown. The system 200 includes a marketplace 210, a materials handling facility 220 and an actor 280 (e.g., a customer, or worker, or other human operator) that are connected to one another across a network 290, which may include the Internet in whole or in part. Except where otherwise noted, reference numerals preceded by the number "2" shown in FIG. 2A or 2B indicate components or features that are similar to components or features having reference numerals preceded by the number "1" shown in FIGS. 1A through 1N.

The marketplace 210 may be any entity or individual that wishes to make items from a variety of sources (e.g., manufacturers, merchants, sellers or vendors) available for download, purchase, rent, lease or borrowing by customers using a networked computer infrastructure, including one or more physical computer servers 212 and data stores (e.g., databases) 214 for hosting a network site 216 (e.g., a web site). The marketplace 210 may be physically or virtually associated with one or more materials handling facilities, including but not limited to the materials handling facility 220, as well as any number of other materials handling facilities (not shown). The network site 216 may be implemented using the one or more servers 212, which connect or otherwise communicate with the one or more data stores 214 as well as the network 290, as indicated by line 218, through the sending and receiving of digital data by wired or wireless means, and according to any communications protocol. The servers 212 may cause the display of information associated with the network site 216 in any manner, e.g., by transmitting code such as Hypertext Markup Language (HTML), over the network 290 to another computing device or resource that may be configured to generate and render the information into one or more pages or to cause a display of such pages on a computer display of any kind. Moreover, the data stores 214 may include any type of information regarding items that have been made available for sale through the marketplace 210, or ordered by customers (e.g., the actor 280) from the marketplace 210. The servers 212 may further execute any type of computer-based function or compute any type or form of calculation, including but not limited to any formulas, equations, algorithms or techniques for determining one or more probabilities or performing any number of statistical tests.

The materials handling facility 220 may be any facility that is adapted to receive, store, process and/or distribute items on behalf of the marketplace 210. The materials handling facility 220 may be configured to receive any type or kind of inventory items from various sources, to store the inventory items until a user orders or retrieves one or more of the items, or to distribute the inventory items to the user. For example, inventory items such as merchandise, commodities, perishables or any other type of item may be received from one or more suppliers, e.g., manufacturers, distributors, wholesalers, vendors or the like, at the materials handling facility 220. Upon their arrival at the materials handling facility 220, the inventory items may be prepared for storage, such as by unpacking or otherwise rearranging the inventory items, and updating one or more records to reflect the types, quantities, conditions, costs, locations or any other parameters associated with the arrival of the inventory items. Subsequently, the inventory items may be "stowed," e.g., stocked, managed or dispensed in terms of countable, individual units or multiples of units, such as packages, cartons, crates, pallets or other suitable aggregations, by the actor 280. Alternatively, one or more of the items, such as bulk products, commodities, or the like, may be stored in continuous or arbitrarily divisible amounts that may not be inherently organized into countable units, and may instead be managed in terms of measurable quantities such as units of length, area, volume, weight, time duration or other dimensional properties characterized by units of measurement.

Inventory items may be stored within an inventory area on an inventory shelf, a storage unit or another like system, such as in bins, on shelves or via other suitable storage mechanisms. The inventory shelves, storage units or like units may be flat or angled, stationary or mobile, and of any shape or size. In some implementations, all inventory items of a given type or kind may be stored in a common location within an inventory area. In other implementations, like inventory items may be stored in different locations. For example, to optimize the retrieval of inventory items having high turnover rates or velocities within a large materials handling facility, such inventory items may be stored in several different locations to reduce congestion that might be encountered if the items are stored at a single location.

When a request or an order specifying one or more of the inventory items is received, or as the actor 280 progresses through the materials handling facility 220, inventory items that are listed in the request or order, or are desired by the actor 280, may be selected or "picked" from an inventory area at the materials handling facility 220. For example, in one implementation, the actor 280 may travel through the materials handling facility 220 with a list (e.g., a paper list, or a handheld mobile device displaying or including such a list) and may pick one or more of the inventory items from an inventory area at the materials handling facility 220. In other implementations, the actor 280 may be an employee of the materials handling facility 220 and may pick one or more inventory items, as may be directed by one or more written or electronic pick lists derived from orders. In some instances, an inventory item may be retrieved and delivered to a customer or another user who placed a request for the inventory item. In other instances, the inventory item may require repositioning from one location within an inventory area to another location. For example, in some instances, an inventory item may be picked from a first location (e.g., a first inventory shelf or other storage unit) in an inventory area, moved a distance, and placed at a second location (e.g., a second inventory shelf or other storage unit) in the inventory area.

As is shown in FIG. 2A, the materials handling facility 220 includes a networked computer infrastructure for performing various computer-related functions associated with the receipt, storage, processing and distribution of such items, including one or more physical computer servers 222, data stores (e.g., databases) 224 and processors 226, that may be provided in the same physical location as the materials handling facility 220, or in one or more alternate or virtual locations, e.g., in a "cloud"-based environment. In some implementations, the servers 222, the data stores 224 and/or the processors 226 or any number of other computing devices or resources may further execute any type of computer-based function or compute any type or form of calculation, including but not limited to any formulas, equations, algorithms or techniques for determining one or more probabilities or performing any number of statistical tests.

Such computer devices or resources may also operate or provide access to one or more reporting systems for receiving or displaying information or data regarding workflow operations, and may provide one or more interfaces for receiving interactions (e.g., text, numeric entries or selections) from the actor 280 or one or more other customers, operators, users or workers in response to such information or data. Such computer devices or resources may be general purpose devices or machines, or dedicated devices or machines that feature any form of input and/or output peripherals such as scanners, readers, keyboards, keypads, touchscreens, voice interaction or recognition components or modules, or like devices, and may further operate or provide access to one or more engines for analyzing the information or data regarding the workflow operations, or the interactions received from the one or more operators, users or workers.

The materials handling facility 220 may include one or more inventories having predefined two-dimensional or three-dimensional storage units for accommodating items and/or containers of such items, such as aisles, rows, bays, shelves, slots, bins, racks, tiers, bars, hooks, cubbies or other like storage means, or any other appropriate regions or stations, which may be flat or angled, stationary or mobile, and of any shape or size. Additionally, as is discussed above, the materials handling facility 220 may further include one or more receiving stations featuring any apparatuses that may be required in order to receive shipments of items at the materials handling facility 220 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The materials handling facility 220 may further include one or more distribution stations where items that have been retrieved from a designated inventory area may be evaluated, prepared and packed for delivery from the materials handling facility 220 to addresses, locations or destinations specified by customers, also by way of carriers such as cars, trucks, trailers, freight cars, container ships or cargo aircraft (e.g., manned aircraft or unmanned aircraft, such as drones).

Alternatively, an item received at a receiving station of the materials handling facility 220 may be transferred directly to a distribution station for further processing, or "cross-docked," without first being placed into storage in an intermediate inventory area. The materials handling facility 220 may also include one or more additional stations for receiving and distributing items to customers, as well as one or more conveying systems, autonomous mobile robots, or other manual or automated vehicles for transporting items between such stations or areas (not shown in FIG. 2A or FIG. 2B). The materials handling facility 220 may operate one or more order processing and/or communication systems using computer devices or resources in communication with one or more of the servers 222, the data stores 224 and/or the processors 226, or through one or more other computing devices or resources that may be connected to the network 290, as is indicated by line 228, in order to transmit or receive information in the form of digital or analog data, or for any other purpose.

The imaging devices 225-1, 225-2 . . . 225-n may be any form of optical recording device that may be used to photograph or otherwise record imaging data of structures, facilities or any other elements within the materials handling facility 220, as well as any items within the materials handling facility 220, or for any other purpose. The imaging devices 225-1, 225-2 . . . 225-n may be mounted in any specific location or orientation within the materials handling facility 220, e.g., above, below or alongside one or more inventory areas or stations for receiving or distributing items.

Each of the imaging devices 225-1, 225-2 . . . 225-n shown in FIG. 2A may include one or more sensors, memory or storage components and processors, and such sensors, memory components or processors may further include one or more photosensitive surfaces, filters, chips, electrodes, clocks, boards, timers or any other relevant features (not shown). As is shown in FIG. 2B, a representative imaging device 225-i includes one or more color sensors (or grayscale sensors or black-and-white sensors) 230 and one or more depth sensors 232 configured to capture visual imaging data (e.g., textures) or depth imaging data (e.g., ranges) to objects within one or more fields of view of the imaging device 225-i. The imaging device 225-i further includes one or more processors 234, one or more memory components 236 and one or more transceivers 238, and any other components (not shown) that may be required in order to capture, analyze and/or store imaging data from within the materials handling facility 220 environment in which the imaging device 225-i is provided. For example, the imaging device 225-i may capture one or more still or moving images (e.g., streams of visual and/or depth image frames), along with any relevant audio signals or other information (e.g., position data), and may also connect to or otherwise communicate with the server 222, or any other computer devices within the materials handling facility 220 (not shown), or with one or more external computer devices over the network 290, through the sending and receiving of digital data. In some implementations, the transceiver 238 may be configured to enable the imaging device 225-i to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the server 222 or over the network 290 directly.

In some implementations, the processors 234 are included within the imaging device 225-i, as is shown in FIG. 2B. Alternatively, although the imaging device 225-i is shown as including one or more processors 234 therein, the imaging device 225-i may but need not include any such processors, and may instead be coupled to one or more processors 234, e.g., by wired or wireless means, and one or more of the functions disclosed herein may be executed or operated by such processors 234. For example, the imaging device 225-i may be connected to the one or more processors 234 by a USB cable (or any other cable), or by one or more wireless protocols such as Bluetooth® or Wi-Fi, or in any other manner. The processors 234 may be associated with the imaging devices 225-1, 225-2 . . . 225-n in any manner in accordance with the present disclosure.

The imaging devices 225-1, 225-2 . . . 225-n may be homogenous or heterogeneous in nature, in accordance with the present disclosure. For example, one or more of the imaging devices 225-1, 225-2 . . . 225-n may have both the color sensor 230 and the depth sensor 232. Alternatively, one or more of the imaging devices 225-1, 225-2 . . . 225-n may have just a color sensor 230 (or grayscale sensor or black-and-white sensor) or just a depth sensor 232. For example, in some implementations, one or more of the imaging devices 225-1, 225-2 . . . 225-n may be configured to capture depth imaging data, e.g., distances or ranges to objects within their respective fields of view. In some implementations, one or more of the imaging devices 225-1, 225-2 . . . 225-n may be configured to capture visual imaging data, e.g., visual images or image frames in color, grayscale or black-and-white.

For example, one or more of the imaging devices 225-1, 225-2 . . . 225-n may be an RGB color camera, a still camera, a motion capture/video camera or any other type or form of camera. In other implementations, one or more of the imaging devices 225-1, 225-2 . . . 225-n may be depth-sensing cameras, such as a RGBD (or RGBz) camera. In still other implementations, one or more of the imaging devices 225-1, 225-2 . . . 225-n may be a thermographic or infrared (IR) camera. Additionally, in some implementations, the imaging devices 225-1, 225-2 . . . 225-n may simply be camera modules that include a lens and an image sensor configured to convert an optical image obtained using the lens of the camera into a digital signal or digital representation of the image (generally referred to herein as imaging data). In one implementation, the image sensor may be a RGB sensor capable of supporting an image resolution of at least 860×480 at six frames per second that may likewise be configured to provide image data to other components (e.g., a graphics processing unit) for processing. In some implementations, the imaging devices 225-1, 225-2 . . . 225-n may be paired to provide stereo imagery and depth information, and may include a pair of camera modules. Additionally, imaging data may be stored in any variety of formats including, but not limited to, YUYV, RGB, RAW, .bmp, .jpeg, .gif, or the like.

The imaging devices 225-1, 225-2 . . . 225-n may also include manual or automatic features for modifying their respective fields of view or orientations. For example, one or more of the imaging devices 225-1, 225-2 . . . 225-n may be configured in a fixed position, or with a fixed focal length (e.g., fixed-focus lenses) or angular orientation. Alternatively, one or more of the imaging devices 225-1, 225-2 . . . 225-n may include one or more motorized features for adjusting a position of the imaging device, or for adjusting either the focal length (e.g., zooming the imaging device) or the angular orientation (e.g., the roll angle, the pitch angle or the yaw angle), by causing changes in the distance between the sensor and the lens (e.g., optical zoom lenses or digital zoom lenses), changes in the location of the imaging devices 225-1, 225-2 . . . 225-n, or changes in one or more of the angles defining the angular orientation.

For example, one or more of the imaging devices 225-1, 225-2 . . . 225-n may be hard-mounted to a support or mounting that maintains the device in a fixed configuration or angle with respect to one, two or three axes. Alternatively, however, one or more of the imaging devices 225-1, 225-2 . . . 225-n may be provided with one or more motors and/or controllers for manually or automatically operating one or more of the components, or for reorienting the axis or direction of the device, i.e., by panning or tilting the device. Panning an imaging device may cause a rotation within a horizontal axis or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some of the imaging devices 225-1, 225-2 . . . 225-n may digitally or electronically adjust an image identified in a field of view, subject to one or more physical and operational constraints. For example, a digital camera may virtually stretch or condense the pixels of an image in order to focus or broaden a field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices. Once the characteristics of stationary or moving objects or portions thereof have been recognized in one or more digital images, such characteristics of the objects or portions thereof may be matched against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more digital images correspond to one or more of the characteristics of the known objects.

The operability of networks including one or more of the imaging devices 225-1, 225-2 . . . 225-n, e.g., digital cameras, may be affected based on the lighting conditions and characteristics of the scenes in which the imaging devices 225-1, 225-2 . . . 225-n are deployed, e.g., whether such scenes have sufficient lighting at appropriate wavelengths, whether such scenes are occluded by one or more objects, or whether such scenes are plagued by shadows or other visual impurities. The operability may also depend on the characteristics of the objects within the scenes, including variations, reflectances or deformations of their respective surfaces, as well as their sizes or textures.

Although the materials handling facility 220 of FIG. 2A includes boxes corresponding to three imaging devices 225-1, 225-2 . . . 225-n, those of ordinary skill in the pertinent arts will recognize that any number or type of imaging devices may be provided within the materials handling facility 220 in accordance with the present disclosure, including but not limited to digital cameras, depth sensors or range cameras, infrared cameras, radiographic cameras or other optical sensors. In some implementations, the system 200 may include dozens or even hundreds of imaging devices of any type or form.

The materials handling facility 220 may also include any number of other sensors, components or other features for controlling or aiding in the operation of the materials handling facility 220, including but not limited to one or more thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), laser sensors, weight sensors, attitude indicators, depth gauges, accelerometers, or sound sensors (e.g., microphones, piezoelectric sensors, vibration sensors or other transducers for detecting and recording acoustic energy from one or more directions).

The actor 280 may be any entity or individual that wishes to manually or automatically retrieve, evaluate and/or purchase one or more items maintained in an inventory area of the materials handling facility 220, or to download, purchase, rent, lease, borrow or otherwise obtain items (e.g., goods, products, services or information of any type or form) from the marketplace 210. The actor 280 may utilize one or more computing devices, such as a smartphone 282 or any other like machine that may operate or access one or more software applications, such as a web browser (not shown) or a shopping application 284, and may be connected to or otherwise communicate with the marketplace 210, or the materials handling facility 220 through the network 290, as indicated by line 288, by the transmission and receipt of digital data. For example, the actor 280 may use the smartphone 282 or another like client device to interact with one or more computer devices and/or input/output devices within the materials handling facility 220, and for any purpose. Moreover, the actor 280 may retrieve items from the materials handling facility 220, and also receive deliveries or shipments of one or more items from facilities maintained by or on behalf of the marketplace 210, such as the materials handling facility 220.

Alternatively, or in addition to the actor 280, the materials handling facility 220 may also include one or more human operators (not shown), such as one or more workers, who may be any designated personnel tasked with performing one or more tasks within the materials handling facility 220 in general, or within one or more inventory areas, receiving stations, distribution stations or other locations of the materials handling facility 220 in particular. Such workers may handle or transport items (e.g., any type or form of good, product, media or other tangible consumer article) within the materials handling facility 220, or operate one or more pieces of equipment therein (not shown). The workers may also operate one or more specific computing devices or resources for registering the receipt, retrieval, transportation or storage of items within the materials handling facility 220, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

In some implementations, such devices may include one or more wireless modules to facilitate communications with the server 222, with one or more of the imaging devices 225-1, 225-2 . . . 225-n, or with one or more computer devices or resources, such as the server 212 or the smartphone 282, over the network 290, as well as a display (e.g., a touchscreen display) to facilitate the visible presentation to and interaction with a human operator. Such devices may be configured to store a unique identifier associated with a given human operator, and provide the unique identifier to the server 222 or to another computer device or resource in order to identify the human operator. In some implementations, a portable device may also include one or more other features, e.g., audio input/output peripherals or accessories, such as speakers or microphones, as well as video input/output peripherals or accessories, such as cameras, projectors, haptic peripherals, accessories such as keyboards, keypads, touchscreens, joysticks, control buttons, or other components. Such portable devices may operate in conjunction with or may otherwise utilize or communicate with one or more components of the materials handling facility 220.

The computers, servers, devices and other resources described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method (e.g., speech recognition or gesture recognition devices or techniques) to interact with the computers, servers, devices and the like, or to "select" an item, link, node, hub or any other aspect of the present disclosure.

Those of ordinary skill in the pertinent arts will understand that process steps described herein as being performed by a "marketplace," a "materials handling facility," or a "customer" (or "human operator" or "user") or like terms, may be automated steps performed by their respective computer devices or resources, or implemented within software modules (or computer programs) executed by one or more general purpose computers. Those of ordinary skill in the pertinent arts would also recognize that process steps described as being performed by a "marketplace," a "fulfillment center," or a "customer" (or "human operator" or "user") may be typically performed by a human, but could, alternatively, be performed by an automated agent.

The marketplace 210, the materials handling facility 220 and/or the actor 280 may use any web-enabled or Internet applications or features, or any other client-server applications or features including electronic mail (or E-mail), or other messaging techniques, to connect to the network 290 or to communicate with one another, such as through short or multimedia messaging service (SMS or MMS) text messages. For example, the server 222 may be adapted to transmit information or data in the form of synchronous or asynchronous messages from the materials handling facility 220 to the server 212, the smartphone 282 or any other computer device (e.g., any device having any number of other servers, data stores, processors or the like) in real time or in near-real time, or in one or more offline processes, via the network 290. Those of ordinary skill in the pertinent art would recognize that the marketplace 210, the materials handling facility 220 or the actor 280 may operate any of a number of computing devices or resources that are capable of communicating over the network 290, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a transitory and/or non-transitory computer-readable medium that is within or accessible by computers or computer components such as the server 212, the server 222, the imaging devices 225-1, 225-2 . . . 225-n or the smartphone 282, or any other computers or control systems utilized by the marketplace 210, the materials handling facility 220 or the actor 280 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

The present disclosure references a number of computer-based functions or tasks that may be executed by one or more computer processors, systems or resources associated with imaging devices. In some implementations, one or more of such functions or tasks may be executed by processors that are embedded within or physically coupled to an imaging device, or two or more imaging devices, which may control one or more aspects of the capture, processing and/or storage of imaging data. In some other implementations, one or more of such functions or tasks may be executed by processors that are external to an imaging device, such as in one or more other physical, alternate or virtual locations, e.g., in a "cloud"-based environment. In still other implementations, such functions or tasks may be executed in a distributed manner, such as by computer processors, systems or resources in two or more distributed locations. For example, some of such functions or tasks may be executed by processors that are embedded within or physically coupled to one or more imaging devices, while other functions or tasks may be executed by processors located in one or more other physical, alternate or virtual locations.

Figure 3:
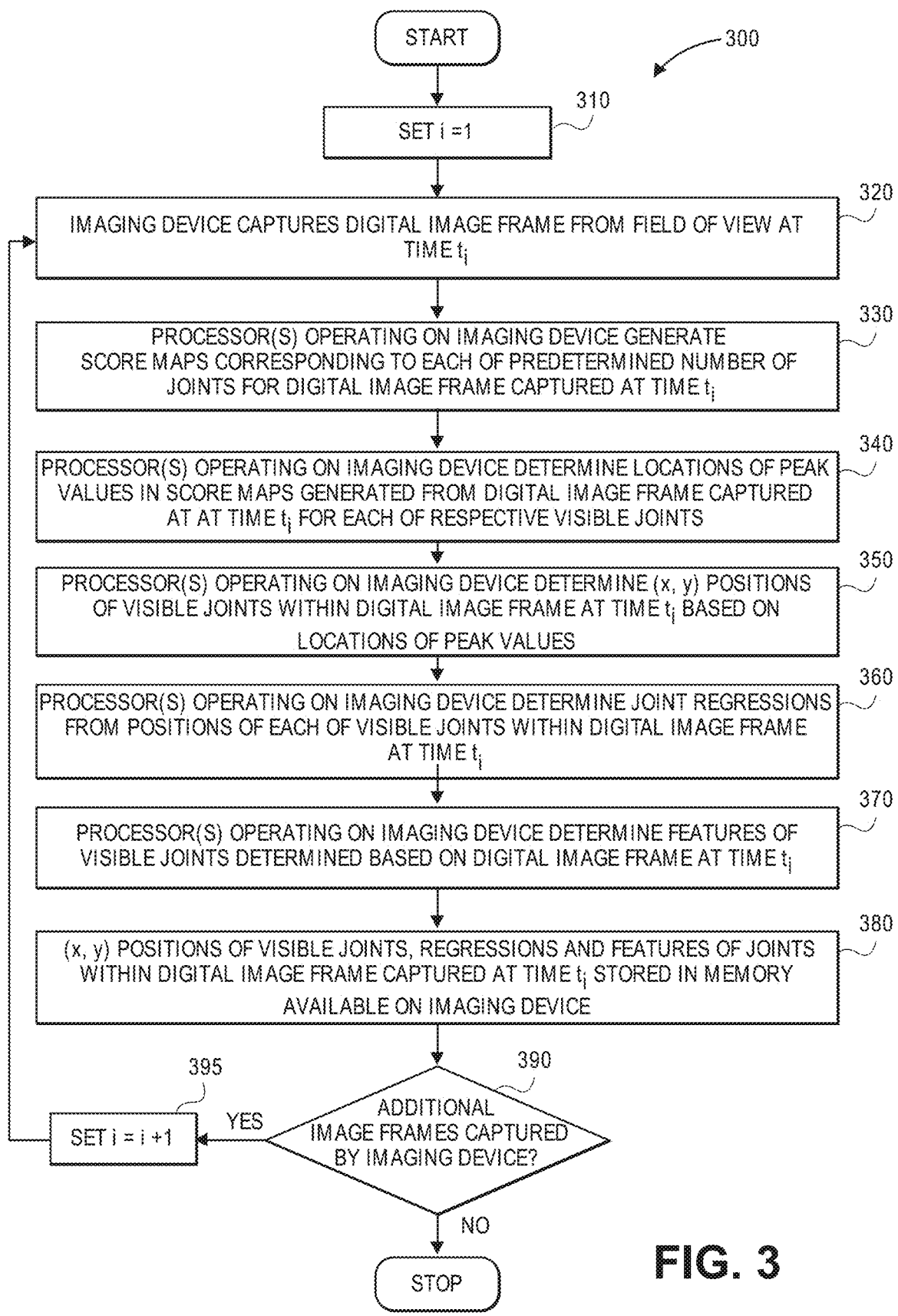
FIG. 3 is a flow chart of one process for real time tracking of actors using digital imagery in accordance with implementations of the present disclosure.

As is discussed above, some implementations of the present disclosure rely on processing power associated with imaging devices to detect positions of body parts (e.g., joints) of actors depicted within image frames captured by the imaging devices. Referring to FIG. 3, a flow chart 300 of one process for real time tracking of actors using digital imagery in accordance with implementations of the present disclosure is shown. At box 310, a value of a step variable i is set to equal 1. At box 320, an imaging device captures a digital image frame from a field of view at a time $t_i$. The imaging device may be one of a plurality of digital cameras or other imaging devices provided in a network, each of which may be aligned with different fields of view and may include one or more visual sensors (e.g., color sensors, grayscale sensors, black-and-white sensors) or depth sensors. The imaging device may also be configured to capture still or moving image frames along with any relevant audio signals or other information (e.g., position data). In some implementations, the imaging device may be a thermographic or infrared (IR) camera.

At box 330, score maps corresponding to each of a predetermined number of joints (or other body parts) are generated for the digital image frame that was captured at time $t_i$ by one or more processors operating on the imaging device. For example, the imaging device may be configured to operate one or more trained classifiers, e.g., a deep neural network, a convolutional neural network, a support vector machine or another classifier, which may receive an image frame as inputs and generate maps of scores corresponding to probabilities that a pixel or given sets of pixels depicts one of the predetermined number of discrete joints as outputs, such as the score maps 140-1-3L through 140-16-3L shown in FIG. 1E, which represent locations of the head 160-1 and fifteen other body parts of the actor 180 within the image frame 130-3L captured by the imaging device 125-2. As is discussed above, a classifier may be trained to generate a variety of information regarding positions of body parts and their relationships with other body parts, e.g., any number of body parts including but not limited to heads, necks, and left or right shoulders, elbows, wrists, hands, hips, knees, ankles, or others. Score maps generated thereby may be graphical representations of probabilities that a given pixel depicts all or a portion of a given body part, with one score map being generated for each of the body parts under consideration from each of the image frames captured thereby. Alternatively, a classifier could also be trained to determine probability values and/or vectors that are similar (or close) to one another for body parts belonging to a common actor, values and/or vectors that are dissimilar (or distant) for body parts that do not belong to a common actor. Moreover, in some implementations, a classifier may be trained to produce, for each detection, a value or a set of values such that body parts which belong to a common actor produce similar (or close) values and body parts which belong to different actors produce dissimilar (or distant) values. Distances between such values may then be utilized to evaluate a probability that any two given body parts belong to the common actor.

The processors on the imaging device may be configured to generate scores indicative of likelihoods that any number of heads, necks, shoulders, elbows, wrists, hands, hips, knees, ankles, or any other body parts are depicted within an image frame. Alternatively, the processors may be configured to identify joints or other body parts according to any other algorithms or techniques. In some other implementations, an imaging device may be configured to recognize body parts by any other classifiers, algorithms or techniques. For example, an imaging device may be configured to capture both visual images and depth images, and may be configured to recognize body parts within one or more of the visual images or the depth images, or a combination of the visual images and the depth images. In some embodiments, the processors may be associated with the imaging device in any other manner, and need not reside or be operated on the imaging device, or embedded within the imaging device.

At box 340, locations of peak values in the score maps generated from the digital image frame captured at the time $t_i$ are determined for each of the respective joints or other body parts that are visible within the digital image frame. The peak values may be identified by any algorithms or techniques, and may represent maximum peak values, e.g., portions of the score maps having the highest absolute values, or localized peak values, e.g., portions of the score maps having the highest localized values. Any number of regions having peak values may be identified in each of the score maps, and such regions may represent candidates of a body part associated with the score map appearing within a given image frame. For example, where a score map generated for a given body part from an image frame includes one location of sufficiently high peak values, the image frame may depict, at most, one of the given body part. Where the score map includes two or more locations of sufficiently high peak values, however, the image frame may depict two or more of the given body part, and may, therefore, depict two or more actors therein. For example, one or more local or absolute maxima within the score maps generated at box 330 may be identified as candidate locations of body parts associated with the score maps. In some implementations, a location within a score map may be identified as a candidate for a body part where the values in the score map at the location exceed a predetermined threshold or extent, which may be the same for all body parts, or different for each specific body part. In some other implementations, a location within the score map may be identified as a candidate for a body part where the values in the score map at the location are greater than neighboring values by a predetermined threshold or extent. Any technique or standard for distinguishing values at locations within score maps from one another may be utilized in accordance with implementations of the present disclosure.

At box 350, coordinate positions of the visible joints within the digital image frame that was captured at time $t_i$ are determined by the one or more processors operating on the imaging device. Such positions may be determined according to a Cartesian coordinate system within an image plane of the digital image frame, e.g., by one or more pairs of x-coordinates and y-coordinates, based on the locations of the peak values in the score maps determined at box 340. Such positions may be defined as a single pixel, or as sets of pixels, e.g., including but not limited to pixels of a predetermined number, shape, radius or buffer around one or more pixels.

At box 360, joint regressions are determined from the positions of each of the visible joints within the image frame captured at time $t_i$ by the one or more processors operating on the imaging device. For example, referring again to FIGS. 1F and 1G, the imaging device may generate a plurality of vector fields, e.g., one vector field for each of a plurality of body parts, with each of the vector fields including a plurality of vectors extending from the detected position of the body part to possible positions of the other body parts within the image frame captured at the time $t_i$. Such vector fields may comprise images, or regression maps, in which each image pixel in the images has a value corresponding to a vector extending to an image pixel of a given body part. The vectors may include a distance and/or a bearing or angle to a corresponding one of the body parts, and may be generated subject to any known physiological parameters or constraints for a human body, including but not limited to lengths or distances of one or more body parts, or configurations of such body parts with respect to one another.

At box 370, features of the visible joints that were identified based on the digital image frame that was captured at time $t_i$ by the one or more processors operating on the imaging device are determined. For example, such features may identify colors of pixels associated with the visible joints, textures of such pixels, or any other attributes of the visible joints that may be determined from the digital image frames by the processors of the imaging device. At box 380, the coordinate positions of the visible joints within the digital image frame that was captured at time $t_i$ and the features of the joints are stored in memory available on the imaging device.

At box 390, whether additional image frames were captured by the imaging device is determined. If additional image frames were captured by the imaging device, then the process advances to box 395, where the value of the step variable i is incremented by 1, such that the value of i equals i+1, before returning to box 320. If no additional image frames were captured by the imaging device, then the process ends. Subsequently, the coordinate positions of the visible joints, the regressions and the features may be stored in association with one another, e.g., in a common record, or in two or more distinct records, or processed or disposed in any other manner, such as by transferring information or data regarding the coordinate positions and/or features to a central server configured to receive such information or data from multiple imaging devices.

As is discussed above, an imaging device may be configured to capture an image frame depicting one or more actors within a field of view, and to process the image frame, e.g., by one or more classifiers operating on the imaging device, to recognize any number of body parts (e.g., joints) that are depicted therein. A record of the body parts depicted within an image frame, and their respective positions within the image frame, as well as visual features of such body parts, may be generated and utilized for further processing by the imaging device or one or more external computer devices or systems. Referring to FIGS. 4A through 4E, views of aspects of one system 400 for real time tracking of actors using digital imagery in accordance with implementations of the present disclosure are shown. Except where otherwise noted, reference numerals preceded by the number "4" shown in FIGS. 4A through 4E indicate components or features that are similar to components or features having reference numerals preceded by the number "2" shown in FIG. 2A or 2B or by the number "1" shown in FIGS. 1A through 1N.

Figure 4A:
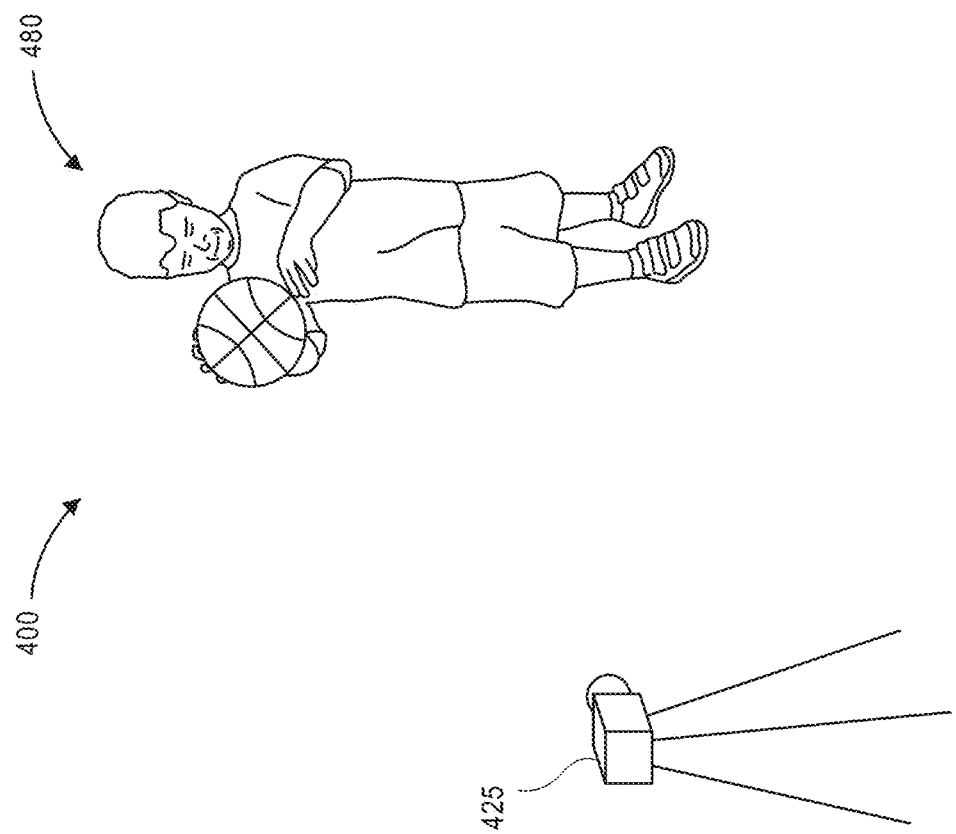
FIGS. 4A through 4E are views of aspects of one system for real time tracking of actors using digital imagery in accordance with implementations of the present disclosure.

As is shown in FIG. 4A, the system 400 includes an imaging device 425 having an actor 480 provided within a field of view of the imaging device 425. In some implementations, the imaging device 425 of FIG. 4A is one of a plurality of calibrated imaging devices provided in a network and having overlapping fields of view. The actor 480 is a child dribbling a basketball within the field of view of the imaging device 425.

Figure 4B:
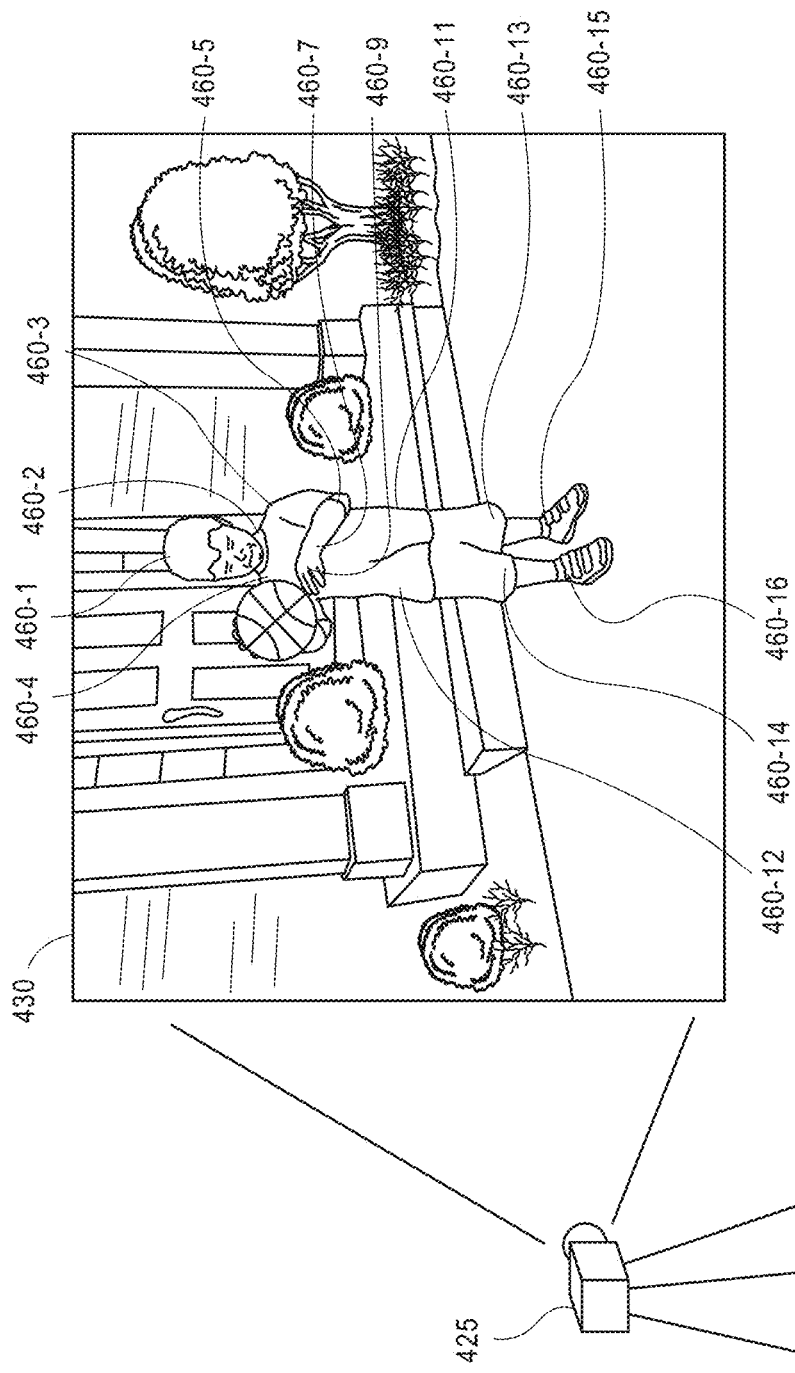

As is shown in FIG. 4B, the imaging device 425 may capture and process an image frame 430 to recognize any number of body parts of the actor 480 that may be shown therein. For example, referring to FIG. 4B, the image frame 430 depicts all or portions of a head 460-1, a neck 460-2, left and right shoulders 460-3, 460-4, a left elbow 460-5, a left wrist 460-7, a left hand 460-9, a left hip 460-11, a right hip 460-12, a left knee 460-13, a right knee 460-14, a left ankle 460-15 and a right ankle 460-16 of the actor 480.

Figure 4C:
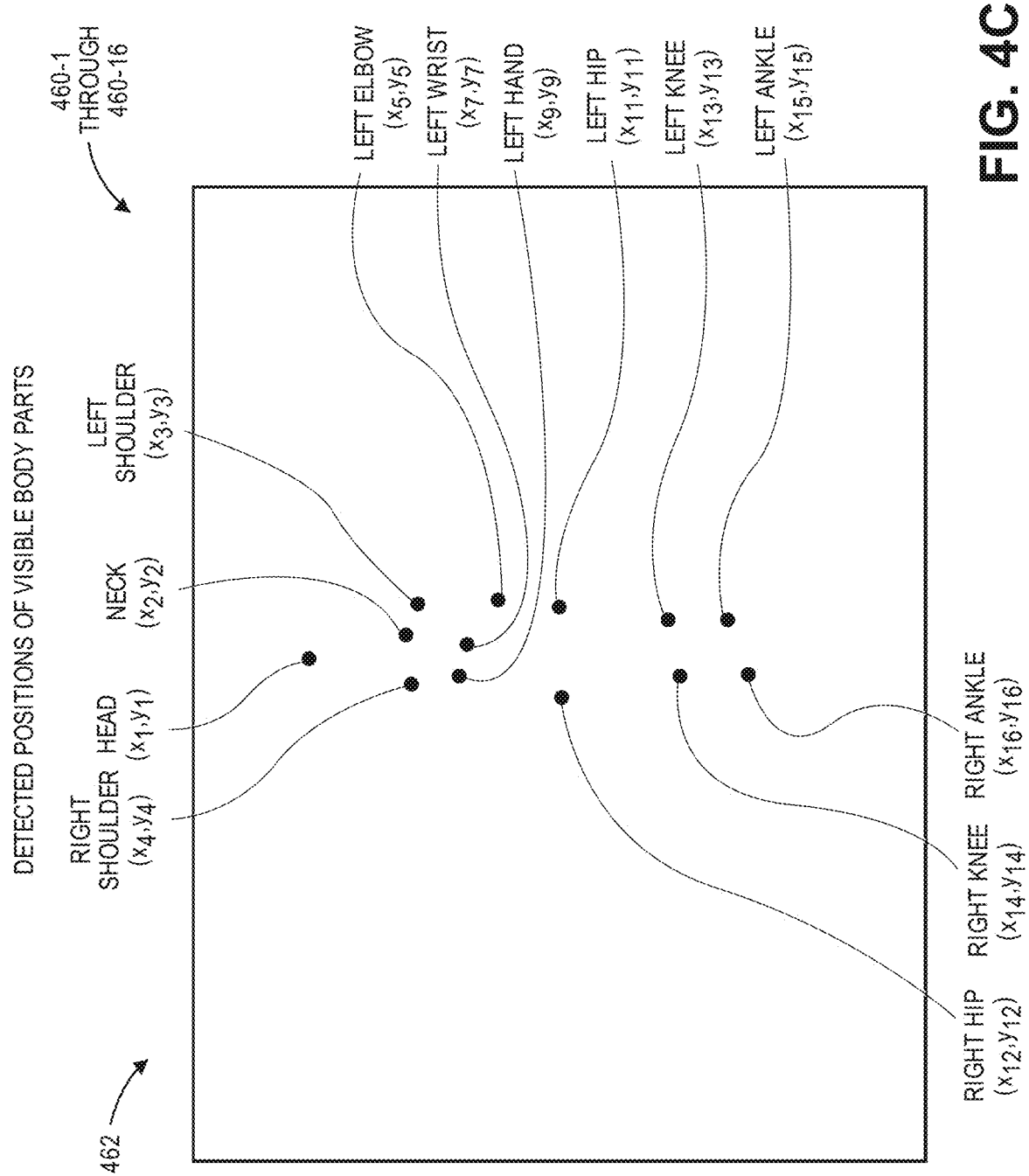

In accordance with the present disclosure, one or more classifiers operating on the imaging device 425 may determine positions of the body parts 460-1 through 460-5, 460-7, 460-9, and 460-11 through 460-16 that are depicted within the image frame 430. For example, as is shown in FIG. 4C, the imaging device 462 may detect a plurality of coordinate positions of the respective body parts 460-1 through 460-5, 460-7, 460-9, and 460-11 through 460-16 within the image frame 430, including a position $(x_1, y_1)$ of the head of the actor 480, a position $(x_2, y_2)$ of the neck of the actor 480, a position $(x_3, y_3)$ of the left shoulder of the actor 480, a position $(x_4, y_4)$ of the right shoulder of the actor 480, a position $(x_5, y_5)$ of the left elbow of the actor 480, a position $(x_7, y_7)$ of the left wrist of the actor 480, a position $(x_9, y_9)$ of the left hand of the actor 480, a position $(x_{11}, y_{11})$ of the left hip of the actor 480, a position $(x_{12}, y_{12})$ of the right hip of the actor 480, a position $(x_{13}, y_{13})$ of the left knee of the actor 480, a position $(x_{14}, y_{14})$ of the right knee of the actor 480, a position $(x_{15}, y_{15})$ of the left ankle of the actor 480 and a position $(x_{16}, y_{16})$ of the right ankle of the actor 480.

Figure 4D:

In accordance with the present disclosure, a record of the positions of visible joints of an actor depicted within an image frame that are detected by an imaging device may be generated and stored along with any associated information or data regarding the body parts and/or the image frame. As is shown in FIG. 4D, the imaging device 425 may generate a record of regression data 450-1 through 450-16 for each of a plurality of body parts based on the detected positions of the body parts 460-1 through 460-5, 460-7, 460-9, and 460-11 through 460-16 within the image frame 430, as shown in FIG. 4C. For example, for each of the body parts 460-1 through 460-5, 460-7, 460-9, and 460-11 through 460-16, the imaging device 425 may generate regression data 450-1 through 450-16 identifying distances from the detections of such body parts to each of a plurality of body parts, including but not limited to body parts that are not depicted within the image frame 430 (viz., a right shoulder, a right wrist and a right hand of the actor 480). The regression data 450-1 through 450-16 may be used to adjust or correct detected positions of body parts that are visible within the image frame 430, or to identify positions of body parts that are not visible within the image frame 430, e.g., based on physiological parameters or constraints.

Figure 4E:
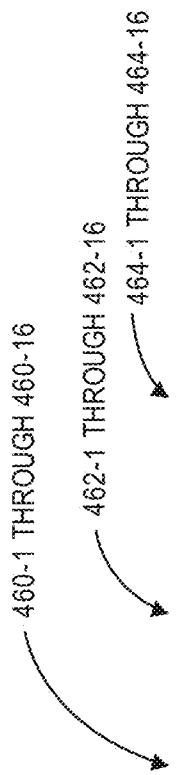

As is shown in FIG. 4E, the imaging device 425 may also generate a record of the detected positions of body parts depicted in the image frame 430 (e.g., the body parts 460-1 through 460-5, 460-7, 460-9, and 460-11 through 460-16), as well as coordinate positions of such body parts, As is also shown in FIG. 4E, the imaging device 425 may further determine visual features of such body parts, including not only color data 462-1 through 462-16 including measures of red, green or blue color within the pixels corresponding to such body parts according to the RGB color model and texture data 464-1 through 464-16 regarding such body parts, e.g., measures of pixel intensity variation among such pixels. The visual features of pixels associated with such body parts may be recognized by any algorithm or technique, e.g., by one or more image segmentation, image filtering, image smoothing and/or image localization techniques, using the one or more processors operating on the imaging device 425.

The data that was generated by the imaging device 425 based on the detections of the body parts 460-1 through 460-5, 460-7, 460-9, and 460-11 through 460-16 in the image frame 430, as shown in FIGS. 4D and 4E, may be used to generate a detection graph including nodes corresponding to each of the respective body parts of the actor 480 and edges extending between pairs of such nodes. The imaging device 425 may further use such a detection graph to generate a local skeleton for the actor 480, or for any other actors that are present within the field of view of the imaging device 425 (not shown). The detection graph and/or any records of local skeletons depicted therein may also be transferred to a central server or other computer device, e.g., via one or more wired or wireless means, and processed along with records of local skeletons generated based on other image frames that are captured by the imaging device 425, or based on image frames captured by one or more other imaging devices (not shown) in a network in real time or near-real time, in order to track skeletons that appear in two or more of such imaging devices. In accordance with the present disclosure, records of body parts, skeletons and/or identifiers may be generated by an imaging device for each frame captured thereby, and each of such records generated by each of the imaging devices in a network may be transferred to a central server for processing. Alternatively, or additionally, the data may be stored in one or more memory components residing on the imaging device 425, or transferred to an external data store that may be provided in the same physical location as the imaging device 425, or in one or more alternate or virtual locations, e.g., in a "cloud"-based environment, where the data and any other data similarly generated by the imaging device 425 and/or any other imaging devices in a network may be maintained for subsequent processing or analysis. In some embodiments, the processors may be associated with the imaging device in any other manner, and need not reside or be operated on the imaging device, or embedded within the imaging device.

A detection graph may be generated by an imaging device based on a record of positions of body parts and visual features of such parts that are depicted within an image frame captured thereby, and updated for image frames subsequently captured by the imaging device. For example, where a plurality of body parts are visible within an image frame captured by an imaging device, the imaging device may determine positions of invisible body parts with respect to the image frame, and generate a new local skeleton based on such body parts, or associate the visible and invisible body parts with a previously generated local skeleton, and update a detection graph or other record of body parts accordingly. In generating or updating a detection graph, an imaging device may consider a "rolling window" comprising a finite number of prior image frames most recently captured by the imaging device in generating and updating the detection graph or other record of body parts, skeletons and/or identifiers thereof that are detected within the field of view of the imaging device.

Figure 5A:
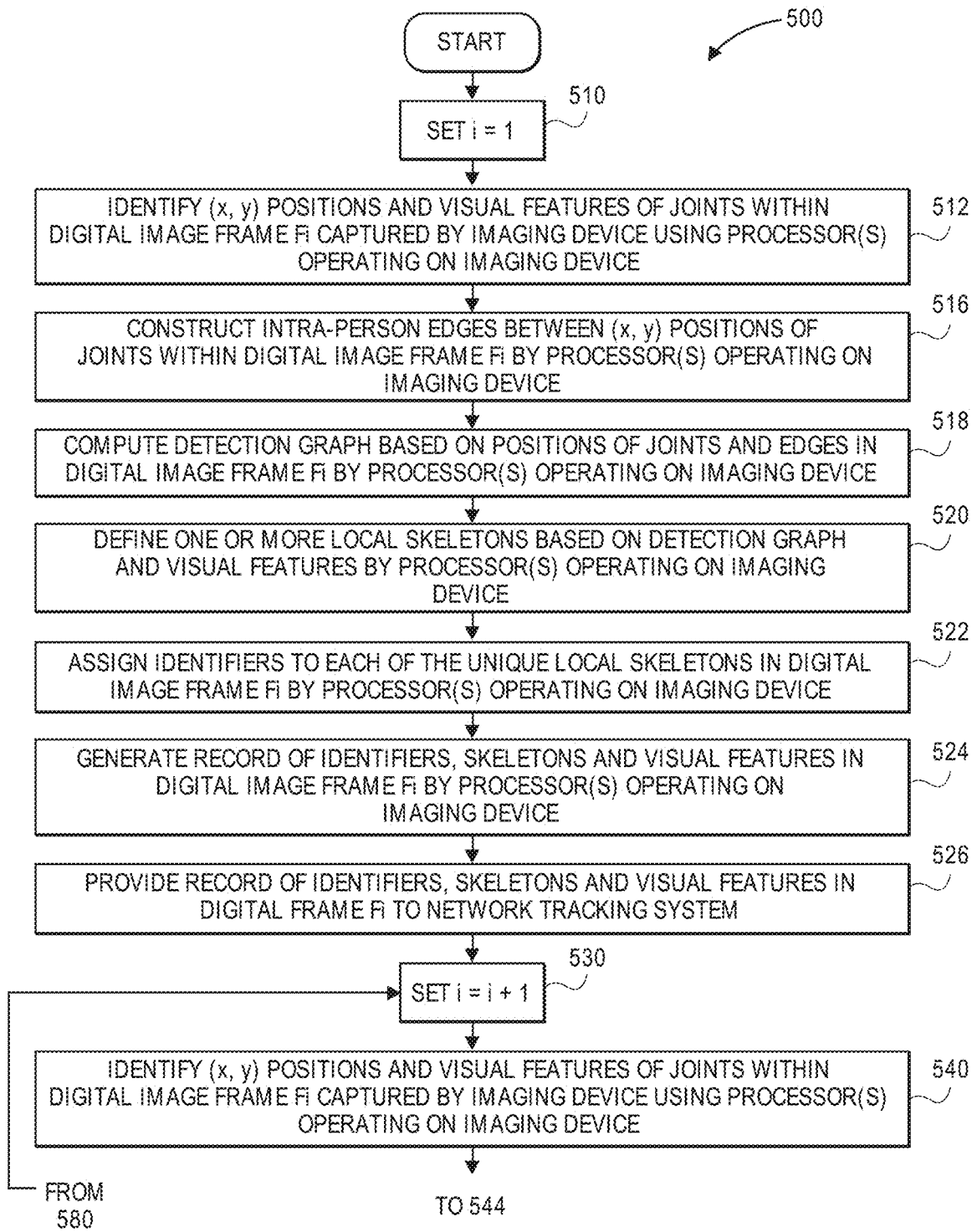
FIGS. 5A and 5B are a flow chart of one process for real time tracking of actors using digital imagery in accordance with implementations of the present disclosure.
Figure 5B:
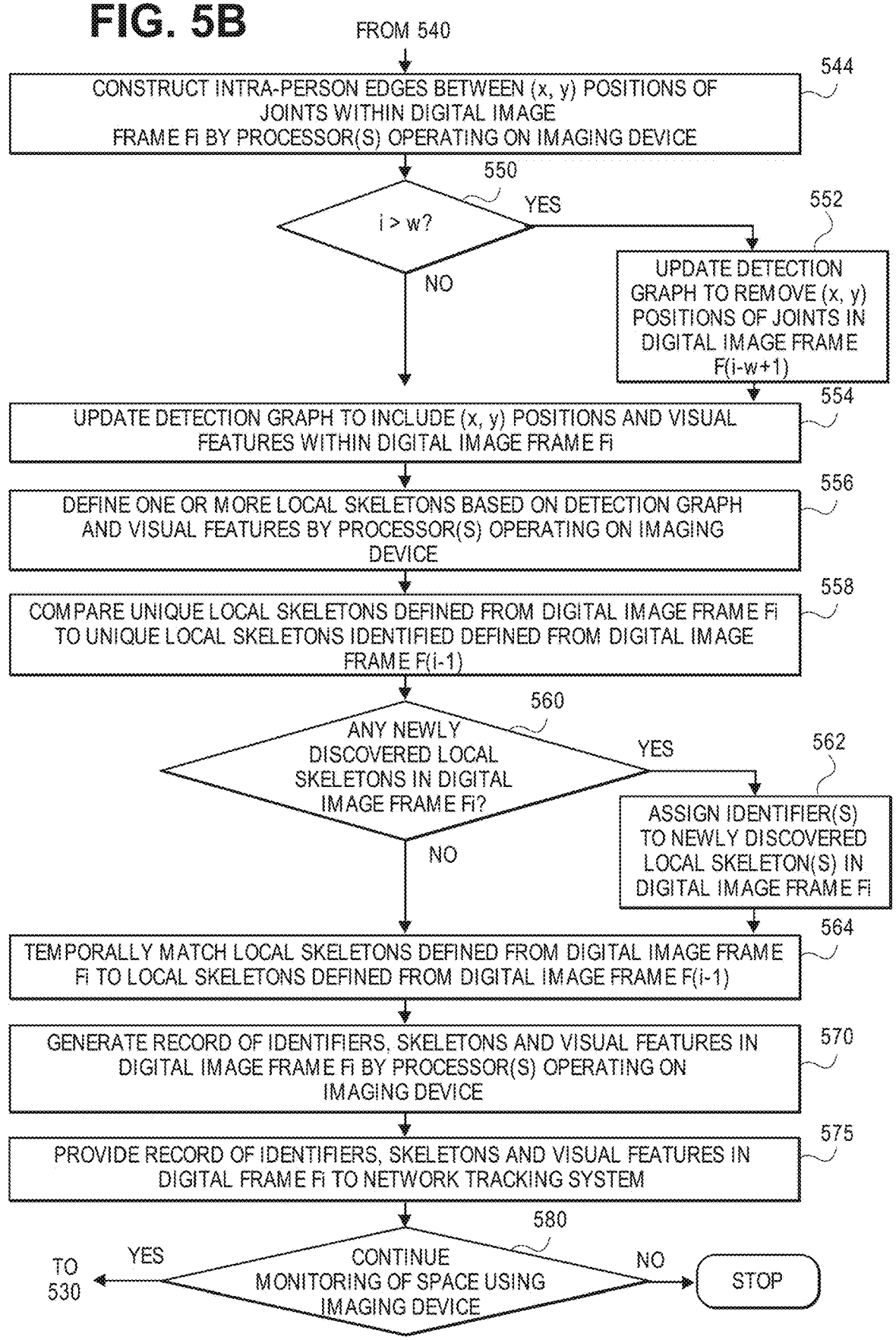

Referring to FIGS. 5A and 5B, a flow chart 500 of one process for real time tracking of actors using digital imagery in accordance with implementations of the present disclosure is shown. At box 510, a value of a step variable i is set to equal 1. At box 512, coordinate positions of joints within a digital image frame F captured by an imaging device and features of such joints are identified by one or more processors operating on the imaging device. For example, referring again to the score maps 140-1-3L through 140-16-3L shown in FIG. 1D, which represent locations of body parts of the actor 180 within the image frame 130-3L captured by the imaging device 125-2, the coordinate positions may be determined by generating one or more score maps for each of a predetermined number of joints and identifying one or more locations of local or absolute maximum values within the score maps for each of the joints. The coordinate positions may be identified with respect to an image plane of the digital image frame, e.g., defined according to a Cartesian coordinate system within the image plane, by one or more pairs of x-coordinates and y-coordinates. Alternatively, any other technique for identifying positions of joints or other body parts within a digital image frame may be utilized in accordance with the present disclosure. Additionally, visual features corresponding to such body parts, including but not limited to colors, textures or other aspects of such joints, may be identified based on the positions of the joints. In some embodiments, the processors may be associated with the imaging device in any other manner, and need not reside or be operated on the imaging device, or embedded within the imaging device. At box 516, intra-person edges are constructed between the coordinate positions of the joints within the digital image frame F by the processors operating on the imaging device. Such edges may link pairs of visible joints, pairs of invisible joints, or pairs consisting of one visible joint and one invisible joint.

Edges may be established between nodes corresponding to detections of different body parts within image frames at the time $t_i$. For example, where an image frame is determined to include two or more body parts based on peak values of score maps corresponding to such body parts, edges may be extended between body parts (e.g., between a head and a neck, a left shoulder, a right shoulder, or the like), and a probability that the body parts connected by the edge correspond to the same person may be assigned to the edge. The edges between nodes may be probabilistically contracted and/or eliminated based on physiological parameters and/or constraints. For example, where a node corresponding to one body part is located at a distance that is too close, or too far from, a node corresponding to another body part in order for the body parts to belong to the same actor, the nodes may be reasonably determined to not belong to the same actor, and an edge between such nodes may be eliminated accordingly. Similarly, in some implementations, where two or more nodes corresponding to detections of the same body part are identified and are sufficiently proximate to one another, physically and/or logically, the nodes may be grouped together and the respective probabilities of edges with the grouped nodes may be multiplied.

Any basis for enhancing a probability that a node is associated with another node, or determining that a node is not associated with another node, may be utilized to alter or eliminate edges between nodes in accordance with the present disclosure. For example, the respective probabilities of edges between nodes may be reevaluated based on any information that may be newly obtained, e.g., by the evaluation of subsequently or concurrently captured image frames. In some implementations, for example, when detections of wrists are grouped across views, and elbows are subsequently detected, the wrists and the elbows may be positioned in three-dimensions, e.g., by triangulation, and the probability that a given wrist and a given elbow belong to the same actor may be reevaluated based on this newly constructed information, as distances between wrists and elbows are much more constrained in three-dimensional space than in two-dimensional images. For example, where detections of body parts of a right arm (e.g., a shoulder, an elbow, a wrist or a hand) of an actor are grouped together and modeled, then determinations of possible detections corresponding to a left arm of the same actor are simplified once the length and other dimensions of the right arm are known, because humans typically have left arms and right arms of the same length.

Therefore, in some implementations, detections of body parts that are most obviously related to or correlated with one another, e.g., where edges established between nodes corresponding to such body parts have highest levels of probability, may be merged, grouped or contracted with one another first, and any information gained based on the merger, grouping or contraction of such body parts may be further utilized to identify the most accurate probabilities associated with edges extending between pairs of other nodes.

At box 518, a detection graph is computed for each of the unique local skeletons identified in the digital image frame F based on the coordinate positions and the features of the joints within the digital image frame F determined at box 512 and the edges constructed at box 516 by the one or more processors operating on the imaging device. For example, one or more nodes may be generated based on locations of peak values within each of a plurality of score maps, with each node corresponding to a detection of a body part at the first time. Alternatively, the imaging device may generate one or more nodes based on visual image frames, depth image frames or visual and depth image frames captured by the imaging device.

At box 520, the imaging device identifies one or more unique local skeletons within the image plane of the digital image frame F by the one or more processors operating thereon, based on the detection graph computed at box 518, and any visual features detected at such locations. The skeletons are identified based on the coordinate positions and the features of the joints identified at box 512, as well as the intra-person edges constructed at box 516. At box 522, the imaging device assigns identifiers to each of the unique local skeletons identified in the digital image frame F by the one or more processors operating thereon. Such identifiers may take the form of one or more alphanumeric characters or sets of such characters, e.g., letters, numbers, symbols, icons or other indicators.

At box 524, a record of the identifiers, local skeletons and visual features identified based in the digital image frame F by is generated the one or more processors operating on the imaging device, and at box 526, the record of the identifiers, the local skeletons and the visual features is provided by the imaging device to a network tracking system, e.g., over one or more communications networks, according to any communications protocol. For example, the imaging device that captured the digital image frame F may generate the record of the identifiers, the local skeletons and the visual features, and transmit the record to a server or other computer device in communication with each of a plurality of imaging devices of a network. The network tracking system may include or operate one or more physical computer servers, data stores (e.g., databases) and/or processors that may be provided in the same physical location as the imaging devices of the network, or in one or more alternate or virtual locations, e.g., in a "cloud"-based environment.

At box 530, the value of the step variable is incremented by 1, such that the value of i equals i+1. Thereafter, at box 540, coordinate positions of joints within a digital image frame F captured by the imaging device and features of such joints are identified by one or more processors operating on the imaging device. At box 544, intra-person edges are constructed between the coordinate positions of the joints within the digital image frame F by the processors operating on the imaging device.

At box 550, whether the value of the step variable i exceeds the predetermined number w of image frames within a rolling window is determined. For example, in order to reduce the number or complexity of computations required in order to track an actor within a monitored space, only the connections between the digital image frame $F_i$, and a most recent digital image frame, viz., digital image frame $F_{(i-1)}$ need be considered. Moreover, in forming and updating a detection graph, a number of image frames that are considered when tracking the actor may be reduced by only considering a cache, a buffer or another set of the prior number w of image frames captured by the imaging device.

If the step variable i exceeds the predetermined number w of image frames, then the process advances to box 552, where the detection graph is updated to remove the coordinate positions of the joints in the digital image frame $F_{(i-w+1)}$. If the step variable i does not exceed the predetermined number w of image frames at box 550, or after the coordinate positions of the joints depicted in the digital image frame $F_{(i-w+1)}$ have been removed from the detection graph at box 552, then the process advances to box 554, where the detection graph is updated to include the coordinate positions and visible features within the digital image frame $F_i$.

At box 556, the imaging device identifies one or more unique local skeletons within the image plane of the digital image frame $F_i$ by the one or more processors operating thereon, e.g., based on the detection graph updated at box 554, and the visual features. The skeletons are identified based on the coordinate positions and the features of the joints identified at box 540, as well as the intra-person edges constructed at box 544.

At box 558, the local skeletons identified in the digital image frame F are compared to the local skeletons identified in the digital image frame $F_{(i-1)}$. At box 560, whether any newly discovered local skeletons are identified in the digital image frame $F_i$ is determined. If any newly discovered local skeletons are identified in the digital image frame $F_i$, the process advances to box 562, where an identifier is assigned to each of the newly discovered local skeletons identified in the digital image frame $F_i$.

If no unique local skeletons are identified in the digital image frame $F_i$ at box 560, or after identifiers have been assigned to any unique local skeletons identified in the digital image frame $F_i$ at box 562, the process advances to box 564, where local skeletons generated from the digital frame $F_i$ are temporally matched to local skeletons generated from the digital image frame $F_{(i-1)}$. For example, where a given body part is detected in a first location of a first image frame by an imaging device, and where visual features such as colors or textures are identified in the first location, then a local skeleton that is generated based on the position and appearance of the given body part in the first image frame may be matched with a local skeleton generated based on a second image frame that is subsequently or previously captured by the imaging device where the same body part is detected in a second location of the second image frame, or where the same colors or textures are identified in the second location.

At box 570, a record of the identifiers, local skeletons and visual features identified based in the digital image frame $F_i$ by is generated the one or more processors operating on the imaging device, and at box 575, the record of the identifiers, the local skeletons and the visual features is provided by the imaging device to the network tracking system, e.g., over one or more communications networks, according to any communications protocol. The network tracking system may store the record of the identifiers and the poses in one or more data stores, e.g., as an update to the record that was provided to the network tracking system at box 526, or as a new record. At box 580, whether the continued monitoring of the space using the imaging device is desired is determined. If the continued monitoring of the space is desired, then the process returns to box 530, where the value of the step variable is incremented by 1, such that the value of i equals i+1. If the continued monitoring of the space is not desired, however, then the process ends.

As is discussed above, processors associated with an imaging device may be configured to detect body parts within image frames captured thereby, and to determine positions of such body parts, using any classifiers, algorithms or techniques in accordance with the present disclosure. Additionally, body parts may be detected, and their positions determined, based on any type or form of imaging data including but not limited to visual imaging data or depth imaging data. Moreover, an imaging device may be configured to generate a local skeleton based on such detections, and a global skeleton may be generated by two or more of such local skeletons, even if the local skeletons were generated according to different classifiers, algorithms or techniques, or based on different types of imaging data. Each of the local skeletons may be two-dimensional or three-dimensional in nature. For example, an imaging device may generate coordinate positions of body parts of local skeletons with respect to an image plane of the digital image frame from which the coordinate positions were determined. A server or other computer device may determine if body parts in a local skeleton are consistent with body parts of other local skeletons generated by one or more other imaging devices, e.g., by matching the respective positions of the body parts of such skeletons, such as by triangulation based on one or more known attributes of the imaging devices from which such local skeletons were generated, or by matching the appearances of the body parts of such skeletons, e.g., based on visual features of such body parts as determined by such imaging devices, or in any other manner.

Figure 6A:
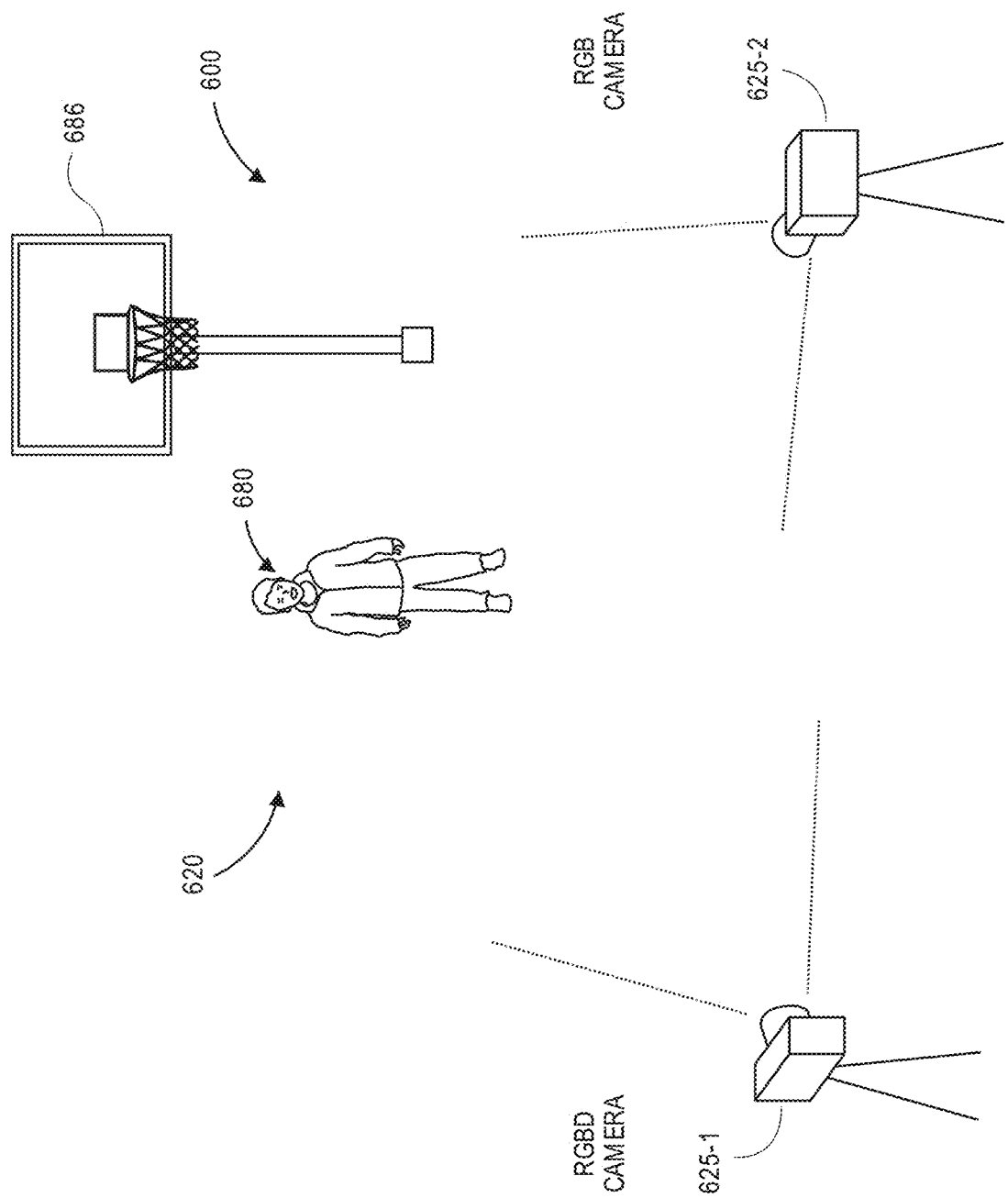
FIGS. 6A through 6C are views of aspects of one system for real time tracking of actors using digital imagery in accordance with implementations of the present disclosure.
Figure 6B:
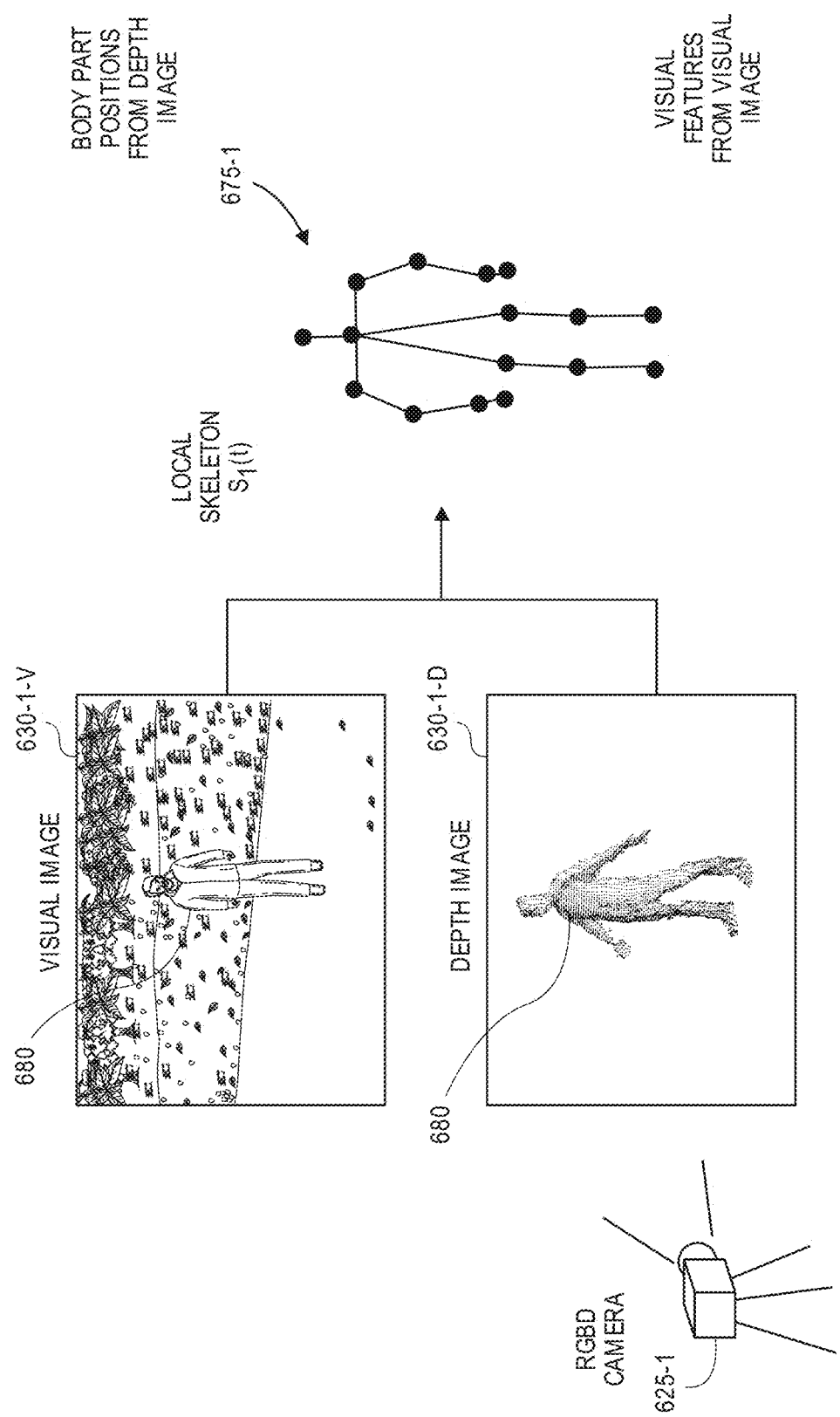
Figure 6C:
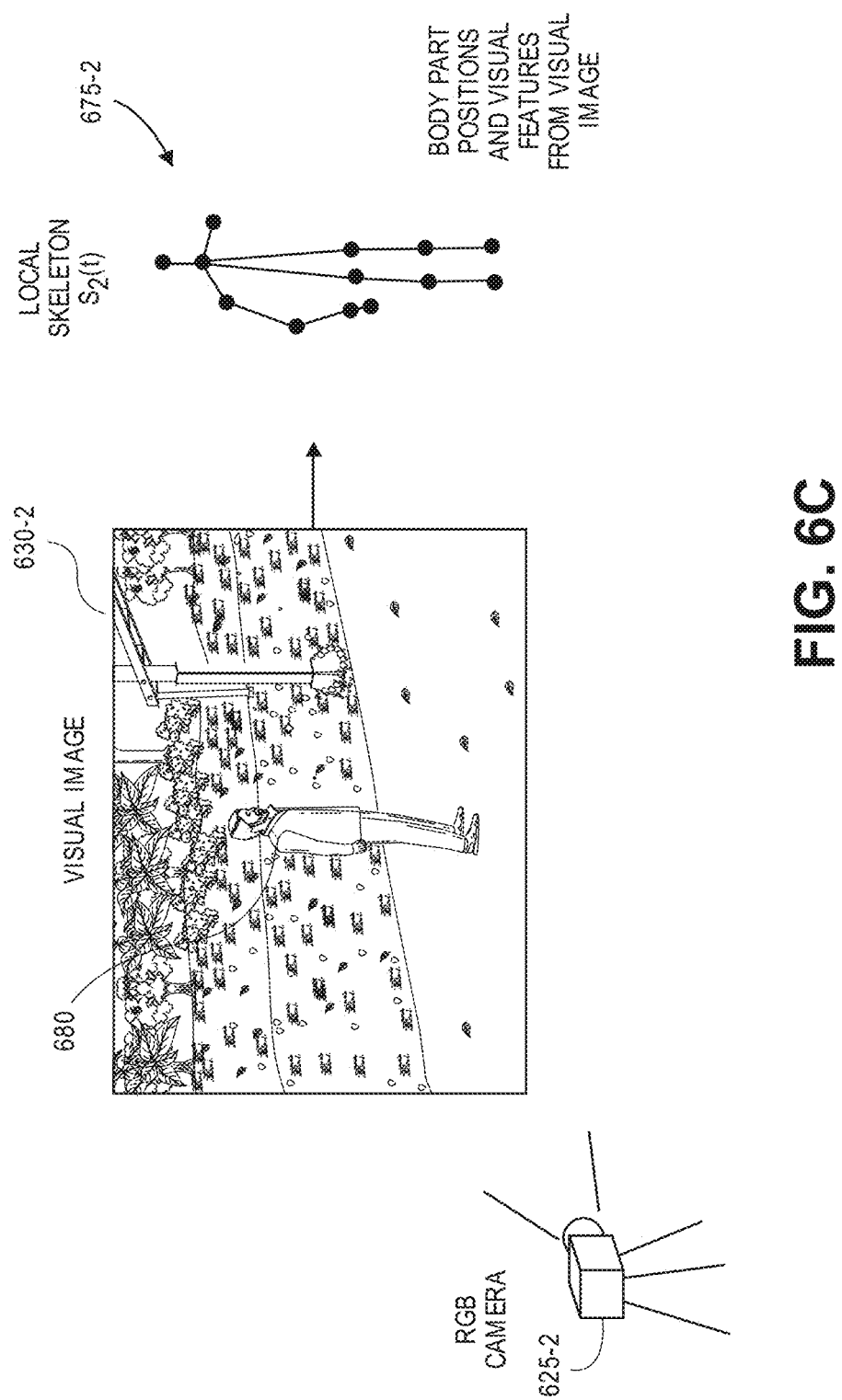

Referring to FIGS. 6A through 6C, views of aspects of one system 600 for real time tracking of actors using digital imagery in accordance with implementations of the present disclosure are shown. Except where otherwise noted, reference numerals preceded by the number "6" shown in FIGS. 6A through 6C indicate components or features that are similar to components or features having reference numerals preceded by the number "4" shown in FIGS. 4A through 4E, by the number "2" shown in FIG. 2A or 2B or by the number "1" shown in FIGS. 1A through 1N.

As is shown in FIG. 6A, the system 600 includes a scene 620 having a pair of imaging devices 625-1, 625-2 and a structural feature 686 (e.g., a support structure for a basketball hoop). The imaging device 625-1 is an RGBD camera configured to capture both visual image frames and depth image frames from a common or similar field of view, while the imaging device 625-2 is an RGB camera configured to capture visual image frames from a field of view. The fields of view of the imaging devices 625-1, 625-2 overlap at least in part. Additionally, the scene 620 includes an actor 680 executing one or more gestures therein.

As is shown in FIG. 6B, the imaging device 625-1 may generate a local skeleton 675-1, viz., skeleton $S_1(t)$, by determining positions of body parts from a depth image 630-1-D and a visual image 630-1-V captured thereby. For example, where an outline or other visual attribute of a body part such as a head, a neck, a shoulder, an elbow, a wrist, a hand, a hip, a knee or an ankle is detected within the visual image frame 630-1-V, and a contour or other external surface feature of a body part are detected within the depth image frame 630-1-D, the outline and the contour may be correlated with respect to one another, and positions of the body part may be determined in three-dimensional space accordingly. A detection graph may be generated from such positions, and the local skeleton 675-1 may be generated from the detection graph accordingly. In some embodiments, detection graphs may be generated by processors that are associated with imaging devices in any manner, and such processors need not reside or be operated on the imaging devices, or embedded within the imaging devices.

As is shown in FIG. 6C, the imaging device 625-2 may generate a local skeleton 675-2, viz., skeleton $S_2(t)$, by determining positions of body parts from a visual image 630-2 captured thereby. For example, the imaging device 625-2 may execute one or more classifiers, algorithms or techniques for detecting not only the body parts of the actor 680 but also one or more monocular cues depicted within the visual image 630-2, such as monocular cues relating to the structural feature 686, and use such monocular cues to determine positions of the body parts of the actor 680 in three-dimensional space. In some implementations, such classifiers, algorithms or techniques may include, but are not limited to, a Markov Random Field, a Markov network or other like model. The imaging device 625-2 may also detect one or more body parts of actors within image frames captured thereby and determine their respective positions or extend edges therebetween based on one or more actual and/or predicted physiological parameters or constraints (e.g., known or predicted bone lengths). A detection graph may be generated from such positions, and the local skeleton 675-2 may be generated from the detection graph accordingly.

The local skeletons 675-1, 675-2 may be provided to a server or other networked computer system, along with the identifiers $S_1$, $S_2$ of the skeletons 675-1, 675-2, and any visual features of the body parts of the skeletons 675-1, 675-2, and the server may be configured to generate a global skeleton based on the local skeletons 675-1, 675-2 and the visual features. Subsequently, image frames captured by the imaging devices 625-1, 625-2 may be processed to detect body parts and visual features thereof depicted therein. To the extent that the subsequently captured image frames continue to include one or more body parts of the actor 680, the local skeletons 675-1, 675-2 may be updated based on the positions of the body parts of the actor 680 detected in the subsequently captured image frames.

Processors associated with imaging devices may be configured to generate local skeletons based on information or data regarding positions of one or more body parts depicted within image frames captured by such devices. Where it is determined that an image frame depicts two or more heads, necks or other body parts, a detection graph including nodes corresponding to such body parts may be processed to determine which of such body parts are compatible with one another and thus correspond to the same actor, and which of such body parts are incompatible with one another and thus do not correspond to the same actor, based on one or more content-based relationships. Processors associated with an imaging device may be configured to recognize two or more discrete collections of body parts within a detection graph, and to generate one local skeleton for each of the collections of body parts corresponding to discrete actors depicted therein. In some embodiments, the processors may be associated with the imaging device in any other manner, and need not reside or be operated on the imaging device, or embedded within the imaging device.

Referring to FIGS. 7A through 7H, views of aspects of one system 700 for real time tracking of actors using digital imagery in accordance with implementations of the present disclosure are shown. Except where otherwise noted, reference numerals preceded by the number "7" shown in FIGS. 7A through 7H indicate components or features that are similar to components or features having reference numerals preceded by the number "6" shown in FIGS. 6A through 6C, by the number "4" shown in FIGS. 4A through 4E, by the number "2" shown in FIG. 2A or 2B or by the number "1" shown in FIGS. 1A through 1N.

Figure 7A:
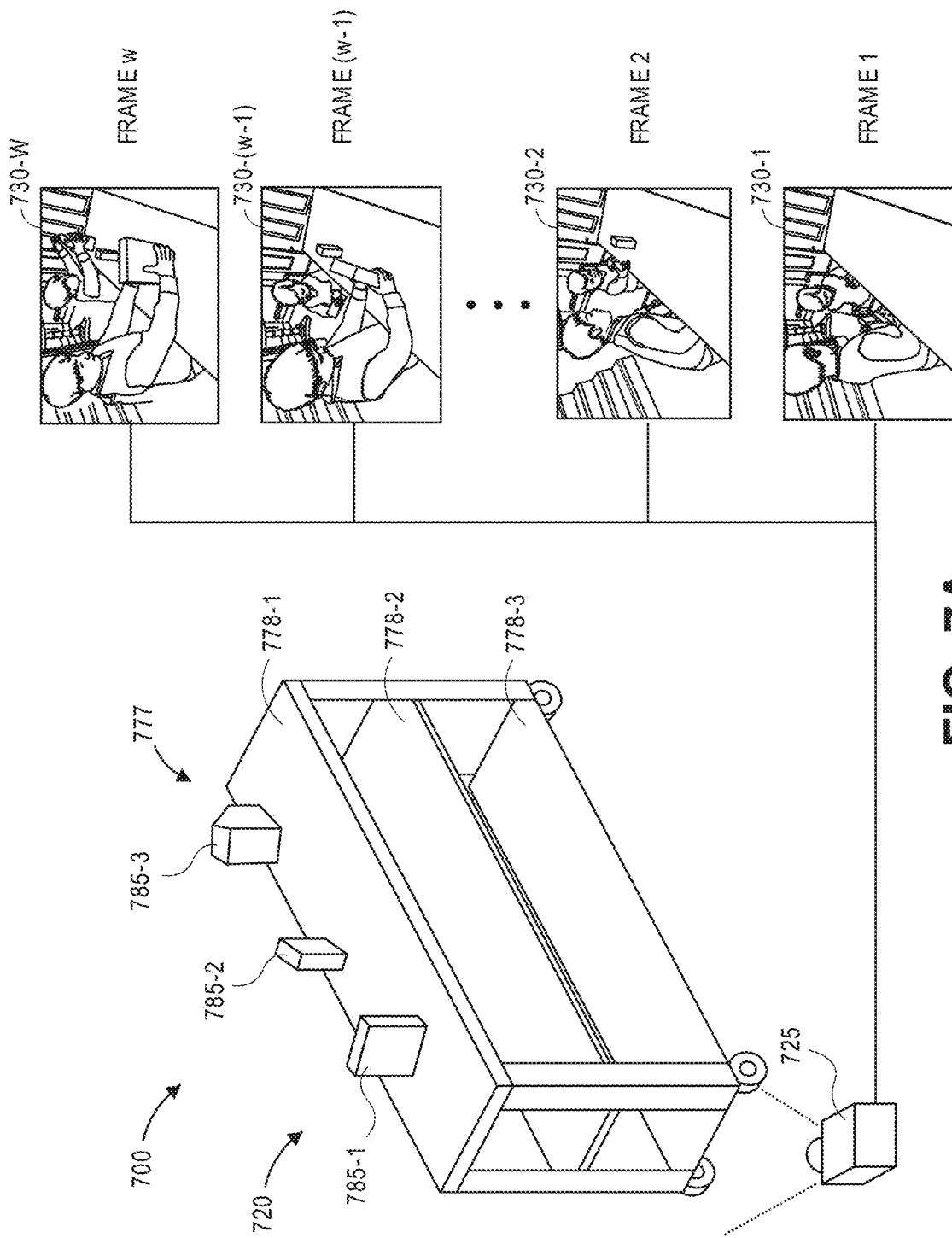

As is shown in FIG. 7A, the system 700 includes a materials handling facility 720 having an imaging device 725 and a storage unit 777 with a plurality of shelves 778-1, 778-2, 778-3. The imaging device 725 is aligned to include all or portions of the storage unit 777 and/or the shelves 778-1, 778-2, 778-3 within their respective fields of view. A plurality of items 785-1, 785-2, 785-3 are deposited on the shelf 778-1. As is also shown in FIG. 7A, the imaging device 725 captures a plurality of image frames 730-w, 730-(w−1) . . . 730-2, 730-1 in series as a pair of actors 780-1, 780-2 interact with the items 785-1, 785-2, 785-3 on the shelf 778-1.

Figure 7B:
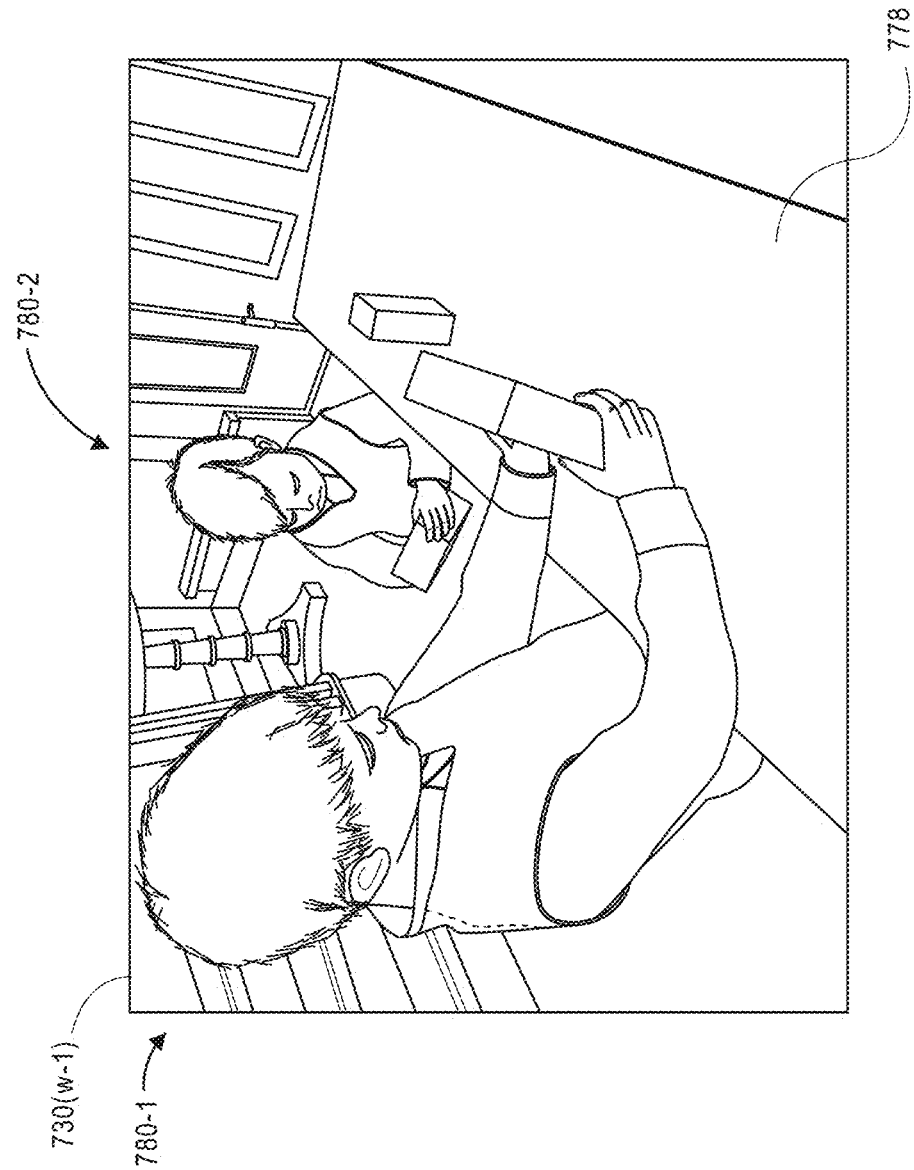

For example, as is shown in FIG. 7B, the image frame 730-(w−1) depicts the actor 780-1 as he evaluates the item 785-1, while the actor 780-2 retrieves the item 785-3 from the shelf 778-1 and places the item 785-3 into a cart. As is shown in FIG. 7C, the imaging device 725 may process the image frame 730-(w−1) using one or more classifiers, algorithms or techniques, and may recognize positions of the heads 760-1-1, 760-1-2, necks 760-2-1, 760-2-2, left shoulders 760-3-1, 760-3-2, right shoulders 760-4-1, 760-4-2, left elbows 760-5-1, 760-5-2, right elbows 760-6-1, 760-6-2, left wrists 760-7-1, 760-7-2, right wrists 760-8-1, 760-8-2, left hips 760-11-1, 760-11-2, and right hips 760-12-1, 760-12-2 of the actors 780-1, 780-2 depicted therein.

The imaging device 725 may recognize the positions 760-1-1, 760-1-2, 760-2-1, 760-2-2, 760-3-1, 760-3-2, 760-4-1, 760-4-2, 760-5-1, 760-5-2, 760-6-1, 760-7-1, 760-7-2, 760-8-1, 760-8-2, 760-11-1, 760-11-2, 760-12-1, 760-12-2 in any manner. For example, the positions 760-1-1, 760-1-2, 760-2-1, 760-2-2, 760-3-1, 760-3-2, 760-4-1, 760-4-2, 760-5-1, 760-5-2, 760-6-1, 760-6-2, 760-7-1, 760-7-2, 760-8-1, 760-8-2, 760-11-1, 760-11-2, 760-12-1, 760-12-2 may be determined based on local or maximum peak values within score maps generated for each of a plurality of body parts based on outputs from one or more classifiers, algorithms or techniques, e.g., a deep neural network, a convolutional neural network or a support vector machine operating on the imaging device 725, or by any other algorithm or technique. Alternatively, the positions 760-1-1, 760-1-2, 760-2-1, 760-2-2, 760-3-1, 760-3-2, 760-4-1, 760-4-2, 760-5-1, 760-5-2, 760-6-1, 760-6-2, 760-7-1, 760-7-2, 760-8-1, 760-8-2, 760-11-1, 760-11-2, 760-12-1, 760-12-2 may be determined by correlating visual and/or depth data captured by the imaging device 725, or based on one or more monocular cues within the field of view of the imaging device 725, e.g., dimensions and/or orientations that may be determined based at least in part on one or more aspects of the shelving unit 777, which may be known or predicted based on one or more of the image frames captured by the imaging device 725.

Figure 7D:
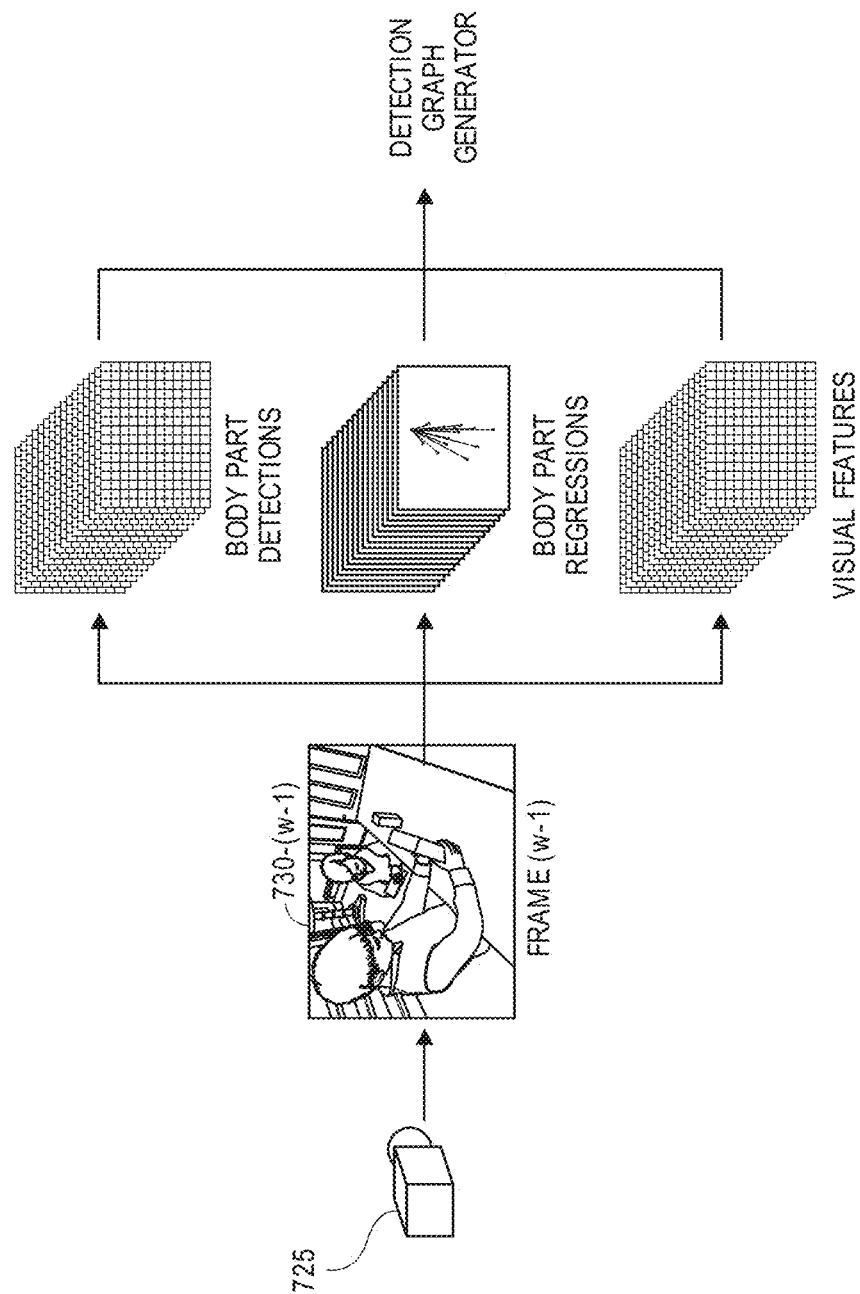

Thus, as is shown in FIG. 7D, the imaging device 725 may be configured to process the image frame 730-(w−1) and recognize a variety of data associated with its contents, including but not limited to body part detections, e.g., the positions 760-1-1, 760-1-2, 760-2-1, 760-2-2, 760-3-1, 760-3-2, 760-4-1, 760-4-2, 760-5-1, 760-5-2, 760-6-1, 760-6-2, 760-7-1, 760-7-2, 760-8-1, 760-8-2, 760-11-1, 760-11-2, 760-12-1, 760-12-2 of the body parts shown in FIG. 7C, as well as body part regressions and/or visual features. For example, the imaging device 725 may generate a plurality of vector fields, such as the vector field (or regression map) 150-1-3L of FIG. 1F, e.g., one vector field for each of a plurality of body parts. Each of the vector fields may include vectors having a distance and/or a bearing from one of the positions 760-1-1, 760-1-2, 760-2-1, 760-2-2, 760-3-1, 760-3-2, 760-4-1, 760-4-2, 760-5-1, 760-5-2, 760-6-1, 760-6-2, 760-7-1, 760-7-2, 760-8-1, 760-8-2, 760-11-1, 760-11-2, 760-12-1, 760-12-2 to another of such positions, such as the vectors 152-1-3L through 152-16-3L shown in FIG. 1G. The imaging device 725 may also identify visual features of the pixels corresponding to the positions 760-1-1, 760-1-2, 760-2-1, 760-2-2, 760-3-1, 760-3-2, 760-4-1, 760-4-2, 760-5-1, 760-5-2, 760-6-1, 760-7-1, 760-7-2, 760-8-1, 760-8-2, 760-11-1, 760-11-2, 760-12-1, 760-12-2, including not only color data (e.g., measures of red, green or blue color within such pixels according to the RGB color model) but also texture data (e.g., measures of pixel intensity variation among such pixels). The visual features associated with such positions may be recognized by any algorithm or technique, e.g., by one or more image segmentation, image filtering, image smoothing and/or image localization techniques, using the one or more processors operating on the imaging device 725.

Figure 7E:
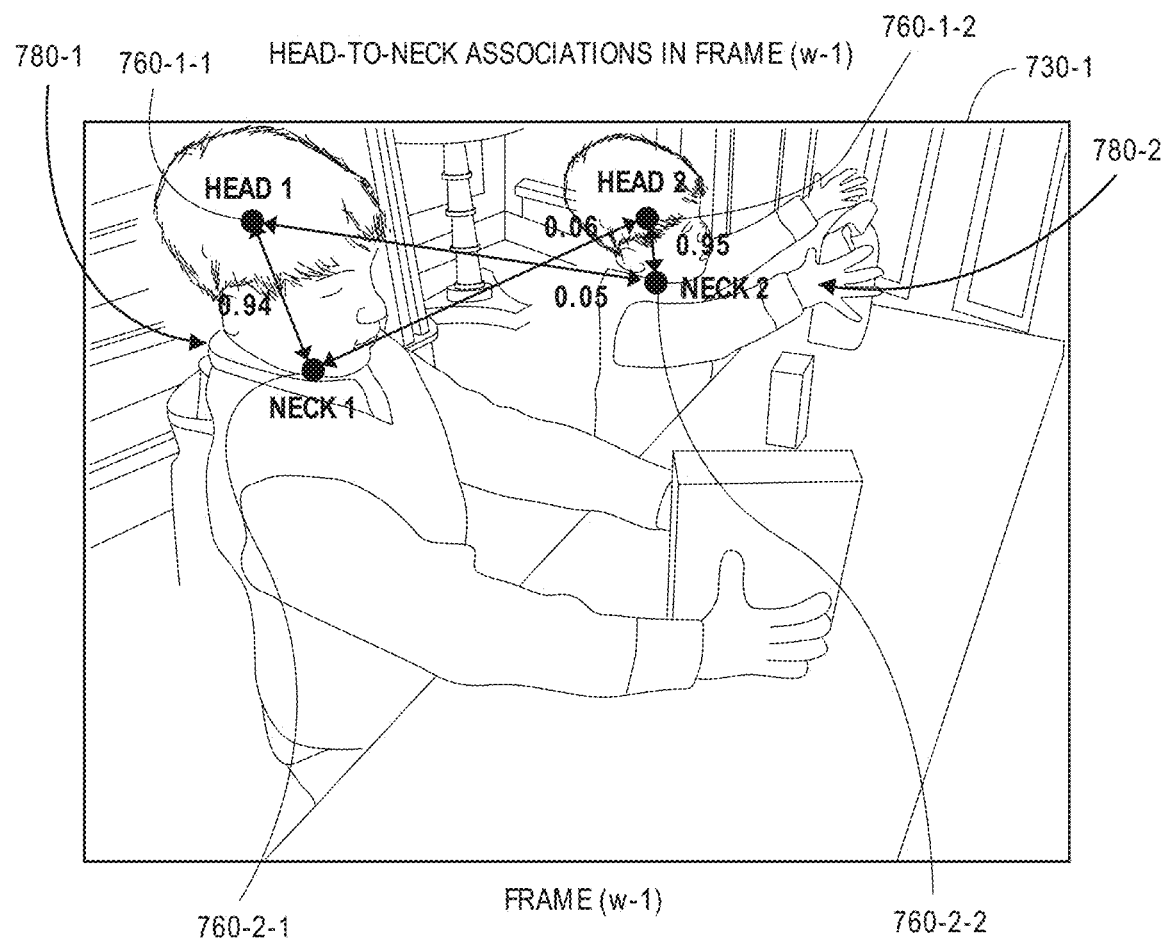

Based on the positions 760-1-1, 760-1-2, 760-2-1, 760-2-2, 760-3-1, 760-3-2, 760-4-1, 760-4-2, 760-5-1, 760-5-2, 760-6-1, 760-6-2, 760-7-1, 760-7-2, 760-8-1, 760-8-2, 760-11-1, 760-11-2, 760-12-1, 760-12-2, the body part regressions and/or the visual features of pixels corresponding to such pixels, the imaging device 725 may generate one or more edges extending between pairs of body parts, and assign probabilities that the pairs of body parts belong to a common actor to each of such edges, based on any number of physiological parameters or constraints, as well as any metrics of compatibility or incompatibility. As is shown in FIG. 7E, the imaging device 725 may determine associations between a detected position of a head 760-1-1 and detected positions of each of a pair of necks 760-2-1, 760-2-2. Likewise, the imaging device 725 may determine associations between a detected position of the head 760-1-2 and detected positions of each of the pair of necks 760-2-1, 760-2-2. Alternatively, or reciprocally, the imaging device 725 may determine associations between the detected position of the neck 760-2-1 and detected positions of each of the pair of heads 760-1-1, 760-1-2, and between the detected position of the neck 760-2-2 and detected positions of each of the pair of heads 760-1-1, 760-1-2. Because each person has only one head and only one neck, the associations may each represent probabilities that one of the heads is associated with a given one of the necks, and that one of the necks is associated with a given one of the heads.

Figure 7F:
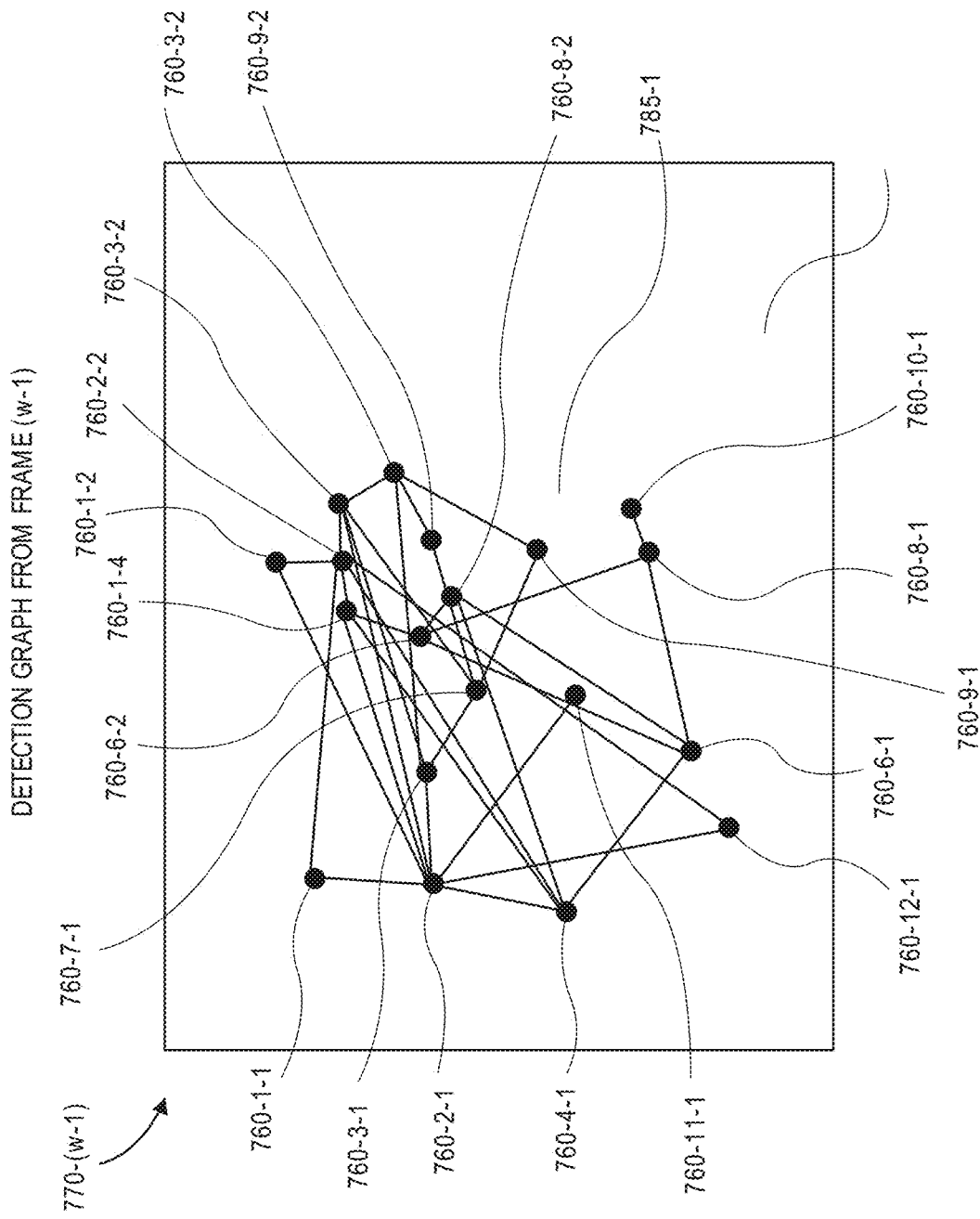

The imaging device 725 may be configured to determine such associations between any pairs of body parts depicted within any of the images captured thereby, in a manner similar to that shown in FIG. 7E, and to generate a detection graph including nodes corresponding to each of such body parts and edges extending between pairs of such nodes. As is shown in FIG. 7F, the imaging device 725 may generate a detection graph 770-(w−1) having nodes corresponding to the positions 760-1-1, 760-1-2, 760-2-1, 760-2-2, 760-3-1, 760-3-2, 760-4-1, 760-4-2, 760-5-1, 760-5-2, 760-6-1, 760-6-2, 760-7-1, 760-7-2, 760-8-1, 760-8-2, 760-11-1, 760-11-2, 760-12-1, 760-12-2, and edges representing probabilities (not shown) that each of a pair of nodes is associated with one another. The imaging device 725 may independently generate the detection graph 770-(w−1) based on the data associated with the contents of the image frame 730-(w−1), such as is shown in FIG. 7D, or, alternatively, may update a detection graph generated based on data associated with contents of the image frame 730-w (not shown). Additionally, the imaging device 725 may further generate a detection graph independently based on data associated with contents of an image frame captured after the image frame 730-(w−1), or, alternatively, may update the detection graph 770-(w−1) based on such data.

Figure 7G:
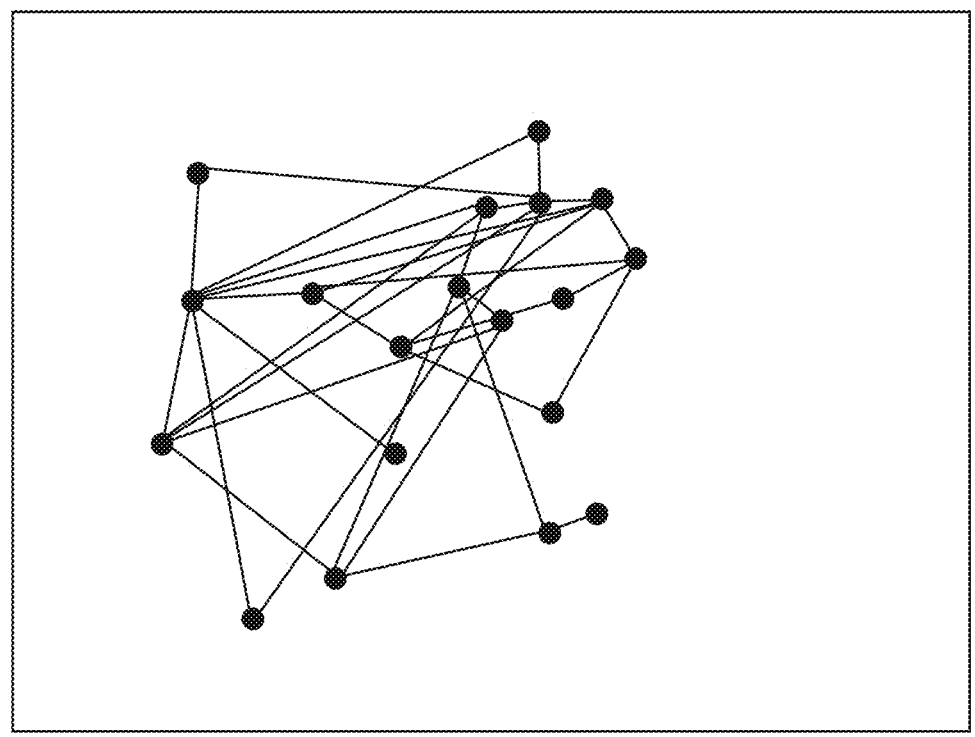

The imaging device 725 may be further configured to generate one or more local skeletons based on the detection graph. As is shown in FIG. 7G, the imaging device 725 generates a pair of discrete skeletons 775-1-(w−1), 775-2-(w−1) based on the detections set forth in the detection graph 770-(w−1). The skeleton 775-1-(w−1) and the skeleton 775-

2-(w−1) each include a single head, a single neck, a single left and right shoulder, and the like. The skeletons 775-1-(w−1), 775-2-(w−1) may be respectively generated from the detection graph 770-(w−1) based on any known physiological parameters or constraints for a human body, including but not limited to lengths or distances of one or more body parts, or configurations of such body parts with respect to one another, or on any other relevant data that may be known regarding the actors 780-1, 780-2 and/or the materials handling facility 720. Identifiers $S_1$, $S_2$ may be assigned to each of the skeletons 775-1-(w−1), 775-2-(w−1).

In some implementations, the imaging device 725 may be configured to independently generate detection graphs based on data regarding contents of each of the image frames captured thereby. Alternatively, the imaging device 725 may be configured to generate detection graphs based not only on data regarding contents of each of the image frames captured thereby, but also on data regarding contents of each of a plurality of image frames previously captured by the imaging device 725. For example, a detection graph generated based on data regarding contents of one image frame may be updated based on data regarding contents of a subsequently captured image frame. The detection graphs may be generated with respect to data regarding contents of each of a predetermined number of image frames in a rolling window, such that as each image frame is successively captured, data regarding an oldest or most distant one of the image frames in the rolling window is no longer considered.

Figure 7H:
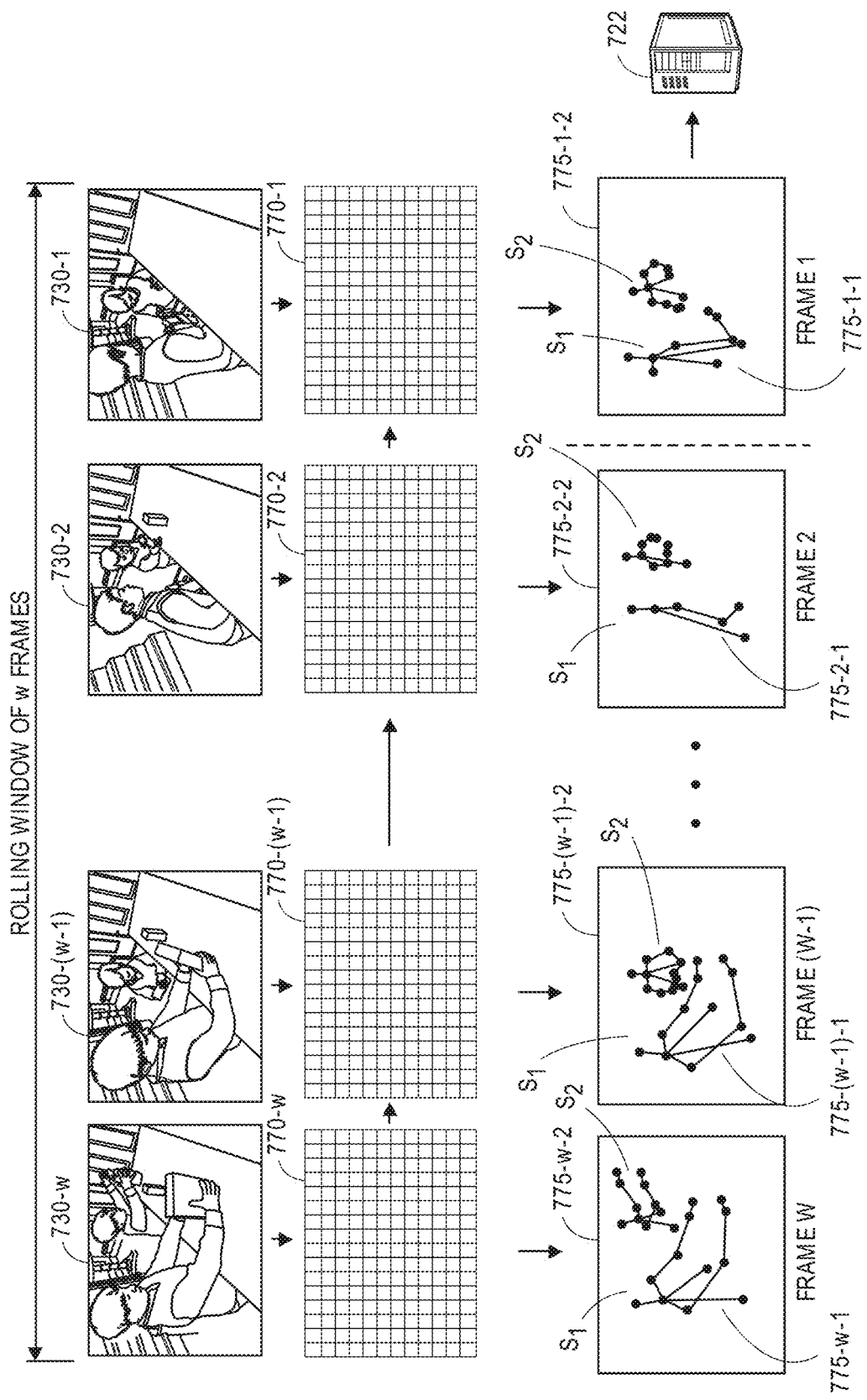

As is shown in FIG. 7H, the generation of detection graphs and skeletons based on w image frames in a rolling window is shown. The rolling window of w image frames includes the image frames 730-w, 730-(w−1) . . . 730-2, 730-1 in series. As is also shown in FIG. 7H, detection graphs 770-w, 770-(w−1) . . . 770-2, 770-1 may be generated and successively updated based on data regarding the image frames 730-w, 730-(w−1) . . . 730-2, 730-1 in the rolling window of the w image frames. By updating the detection graphs 770-w, 770-(w−1) . . . 770-2, 770-1 based on each of the image frames within a rolling window, rather than independently generating the detection graphs 770-w, 770-(w−1) . . . 770-2, 770-1 based on the digital image frames 730-w, 730-(w−1) . . . 730-2, 730-1 alone, the imaging device 725 may propagate the identities of specific body parts from one digital image frame to a succeeding digital image frame, while also ensuring that a body part may be detected and tracked over a period of digital image frames without any statistically aberrant fluctuations in the positions of nodes or edges extending between such nodes, which may result from temporary occlusions within the field of view of the imaging device 725 or any other event or circumstance occurring within the materials handling facility 720.

Similarly, as is also shown in FIG. 7H, the imaging device 725 may generate the local skeletons 775-w-1, 775-w-2 from the detection graph 770-w, and may also generate the local skeletons 775-(w−1)-1, 775-(w−1)-2 from the detection graph 770-(w−1), the local skeletons 775-2-1, 775-2-2 from the detection graph 770-2, and the local skeletons 775-1-1, 775-1-2 from the detection graph 770-1, as each of such graphs is generated and/or updated. The imaging device 725 may provide the local skeletons 775-w, 775-(w−1) . . . 775-2, 775-1 to a server 722, as such skeletons are generated, and the server 722 may correlate the local skeletons 775-w, 775-(w−1) . . . 775-2, 775-1 with one or more other local skeletons generated at the same times by one or more other imaging devices (not shown) at the materials handling facility 720. To the extent that such skeletons may be correlated with one or more other local skeletons, the server 722 may generate a global skeleton based on such local skeletons, and assign a master identifier to the global skeleton, and associate the identifiers $S_1$, $S_2$ of the local skeletons 775-w, 775-(w−1) . . . 775-2, 775-1, and any other correlated local skeletons, with that master identifier.

In accordance with implementations of the present disclosure, by transferring records of local skeletons and/or identifiers thereof generated by imaging devices to a central server for processing, global skeletons may be generated and tracked in a rapid, accurate and efficient manner. By using processors operating on calibrated imaging devices in a network to process image frames captured from a scene by such imaging devices, to recognize body parts and visual features thereof depicted therein and to associate such body parts and visual features with one another, a central server or other machine in communication with each of the imaging devices need only receive records of the local skeletons depicted within image frames from the imaging devices, and correlate the positions and/or appearances of aspects of two or more of the local skeletons in order to generate and track global skeletons within the scene.

Figure 8:
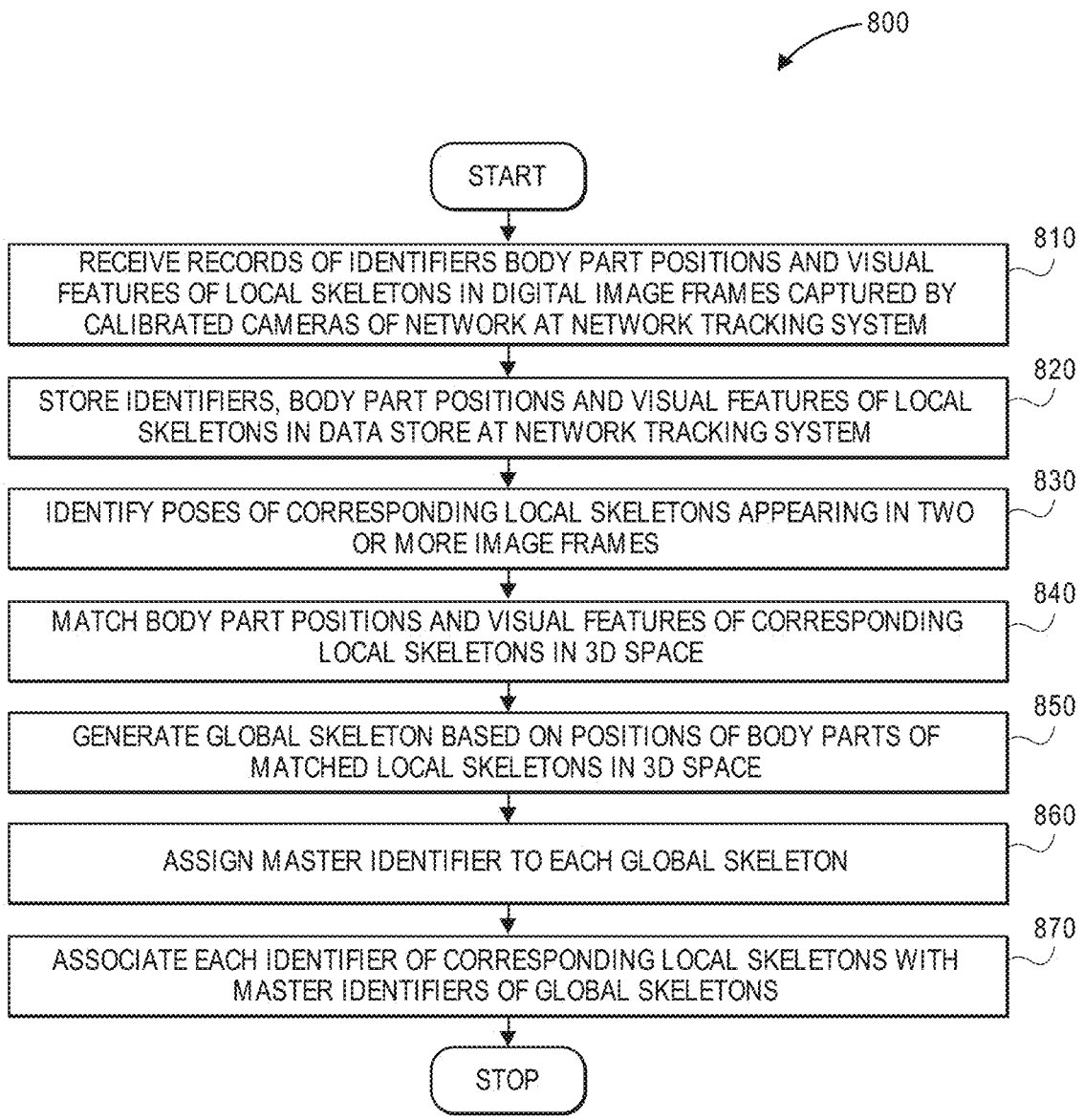
FIG. 8 is a flow chart of one process for real time tracking of actors using digital imagery in accordance with implementations of the present disclosure.

Referring to FIG. 8, a flow chart 800 of one process for real time tracking of actors using digital imagery in accordance with implementations of the present disclosure is shown. At box 810, records of identifiers, body part positions and visual features of local skeletons in digital image frames captured by calibrated cameras of a network by a network tracking system. For example, the network tracking system may receive a record including identifiers of image frames, skeletons and body parts that are visible or invisible in such frames, coordinate positions of such body parts, indicators as to whether the body parts are visible or invisible, confidence intervals or factors as to the reliability of the coordinate positions, and any other information or data regarding the contents of a given image frame. The network tracking system may receive such records from each of the imaging devices in a network, regarding each of the image frames captured by such imaging devices. For example, where an imaging device captures an image and does not identify any body parts therein, the imaging device may generate a record that is empty, and provide the record to the network tracking system. Where an imaging device captures an image, recognizes one or more body parts depicted within the image, and associates such body parts with one or more skeletons, the record may contain information or data regarding each of the body parts and the skeletons, along with one or more identifiers thereof.

At box 820, the identifiers, body part positions and visual features of the local skeletons are stored in a data store at the network tracking system. For example, the network tracking system may maintain copies of records received from each of the calibrated cameras in a network, in one or more data stores. At box 830, poses of corresponding local skeletons are identified in two or more image frames. For example, where a record includes position or appearance information regarding body parts of one or more local skeletons generated by two or more imaging devices, positions and/or orientations of each of the respective heads, necks, shoulders, elbows, wrists, hands, hips, knees, ankles or other body parts of the respective local skeletons may be determined.

At box 840, positions and visual features of the body parts of the corresponding local skeletons are matched in three-dimensional space. For example, where imaging devices are calibrated, their positions and orientations with respect to one another are known. Accordingly, where a given body part (e.g., a head) appears within image frames captured by two or more cameras, the network tracking system may generate three-dimensional virtual rays as having origins at optical elements of each of the cameras (e.g., optical centers) based on the intrinsic properties of such imaging devices and extrinsic properties of a scene, in real time or in near-real time, and extending through positions of pixels corresponding to the given body part within each of the image frames. To the extent that such rays intersect or closely approach one another, the network tracking system may determine that the given body part depicted in each of the image frames belongs to a common actor. Body parts of different skeletons may be determined to match with one another based on their respective positions (e.g., by triangulation) or their respective appearances (e.g., based on common visual features), or by their positions and their appearances. Positions of body parts may be determined for both visible and invisible body parts in accordance with the present disclosure. Alternatively, three-dimensional positions may be determined for one or more body parts in any other manner. For example, image frames captured by one or more imaging devices may include both visual image frames and depth image frames, and a three-dimensional position of one or more body parts may be determined based on both the visual image frames and the depth image frames, e.g., based on a point cloud generated from one or more of the depth image frames.

Correlating body parts that are detected within two or more image frames and/or image planes may result in a three-dimensional position of one or more aspects of such body parts. The precision and/or level of uncertainty of three-dimensional positions generated by triangulation or by appearance matching may depend on one or more factors, including the precision of the orientation of virtual rays originating at the image sensors of the cameras and extending through portions of such image frames corresponding to body parts; the relative orientation of such rays with respect to one another; the extent to which such rays intersect (e.g., a minimum distance between such rays at their closest points) or closely approach one another; and the extent to which the image frames from which the positions were determined are synchronized. For example, the precision of the respective orientations of the rays may depend on a level of resolution or clarity of the image frame through which each of the rays is extended, while the relative orientation of such rays with respect to one another may also affect the precision of a three-dimensional position determined thereby. Additionally, three-dimensional positions that are determined based on rays that are substantially orthogonal to one another will have the lowest uncertainty, while three-dimensional positions that are determined based on rays that are nearly parallel to one another will have the greatest uncertainty. Moreover, while rays extending from sensors through positions of body parts within image frames may never actually intersect, three-dimensional positions that are determined based on rays that closely approach one another will have a low level of uncertainty, while three-dimensional positions that are determined based on rays that deviate sharply from one another will have a high level of uncertainty, or will not correspond to common body parts. Finally, where the image frames from which body parts were detected are not synchronized or nearly synchronized in time, e.g., to within a small margin such as twenty milliseconds (20 ms) of one another, three-dimensional positions of body parts determined based on rays extending through such detections are unreliable, as each of the rays is associated with a position of the same body part at different times.

At box 850, a global skeleton, e.g., a three-dimensional master skeleton, is generated based on the three-dimensional positions of the body parts of each set of the corresponding local skeletons that were matched at box 840. In some implementations, the three-dimensional positions of the body parts or other body parts at box 850 may be generated by converting the positions of such body parts or body parts from a local reference standard (e.g., with respect to each imaging device) to a global reference standard (e.g., with respect to the scene in which each of the imaging devices is provided). The global skeleton may be generated by establishing edges between pairs of body parts of different local skeletons based on probabilities that a given pair of body parts, e.g., heads and necks, necks and shoulders, shoulders and elbows, elbows and wrists, wrists and hands, or the like, identified in different local skeletons corresponds to one another, subject to any number of physiological parameters or constraints, as well as any metrics of compatibility or incompatibility. Any number of global skeletons may be generated based on any two or more local skeletons that are provided by imaging devices in a network, in accordance with the present disclosure.

At box 860, a master identifier is assigned to each of the global skeletons generated at box 850. At box 870, each identifier of the corresponding local skeletons is associated with the master identifier of the global skeletons, and the process ends. For example, the master identifier may refer to the global skeleton by any number of alphanumeric characters or sets of such characters, e.g., letters, numbers, symbols, icons or other indicators, on any basis. The master identifier may indicate an order or level of priority in which a global skeleton was identified (e.g., "Skeleton M-1"), or may be defined as a function of time (e.g., "Customer 201103080626" for a skeleton identified at 6:26 a.m. on Mar. 8, 2011), or based on any intrinsic or extrinsic property of the imaging data from which the global skeleton was generated (e.g., "Red Shirt 3780"). In some implementations, the master identifier may include one or more alphanumeric symbols or other characters in common with one or more of the identifiers of the local skeletons from which the global skeleton was generated, or may take any other form.

Figure 9A:
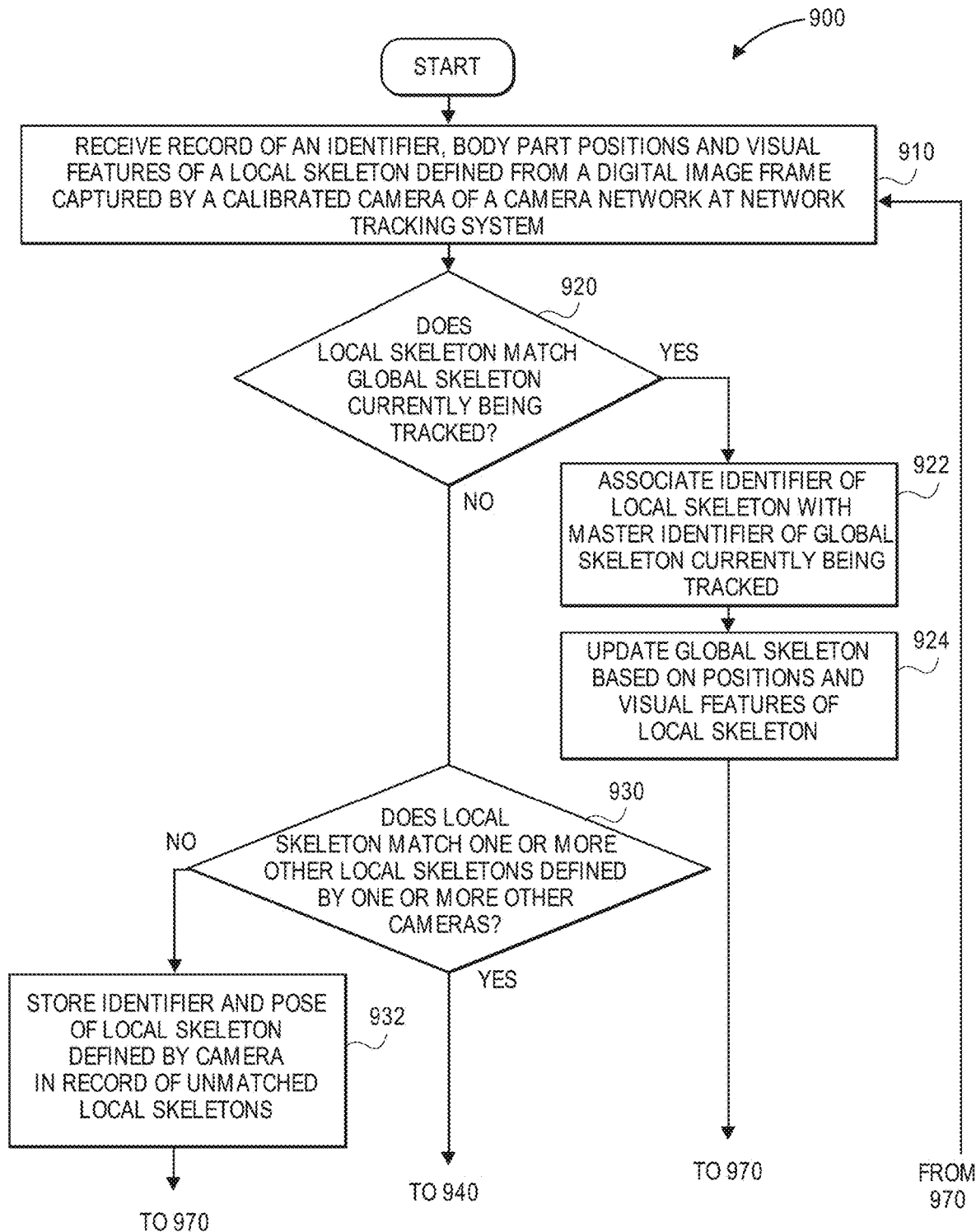
FIGS. 9A and 9B are a flow chart of one process for real time tracking of actors using digital imagery in accordance with implementations of the present disclosure.
Figure 9B:
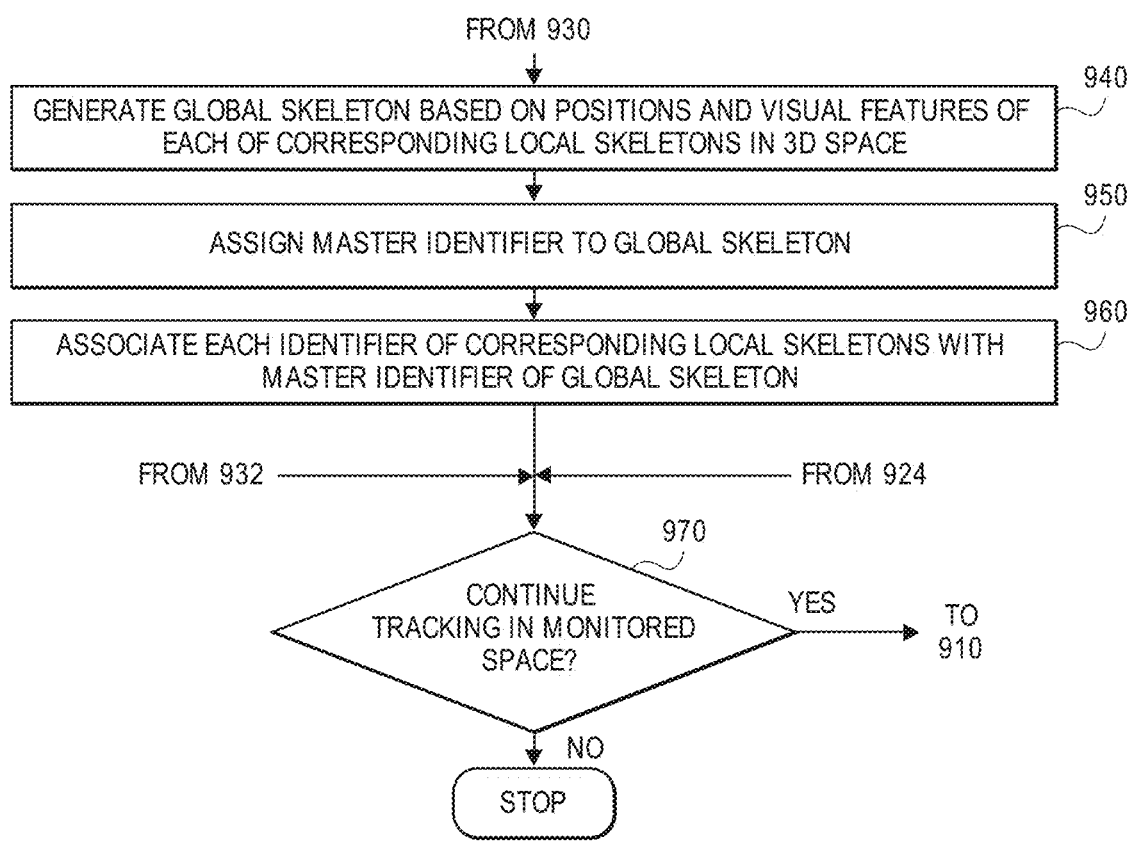

A server or other networked computer device that receives information regarding a local skeleton generated by one imaging device may determine whether the local skeleton corresponds to one or more other local skeletons generated by other imaging devices, or to a global skeleton generated by the server. Alternatively, where a local skeleton may not be matched with any other local skeletons or global skeletons, the server may store a record of the local skeleton in a data store for analysis in the future. Referring to FIGS. 9A and 9B, a flow chart 900 of one process for real time tracking of actors using digital imagery in accordance with implementations of the present disclosure is shown.

At box 910, a record of an identifier, body part positions and visual features of a local skeleton generated from a digital image frame captured by a calibrated camera of a camera network is received at a network tracking system. For example, referring again to FIG. 7H, the record may include information regarding the local skeleton 775-1, including node positions generated based on the updated detection graph 730-1, visual features corresponding to such nodes, and an identifier of the local skeleton 775-1. The network tracking system may receive records corresponding to any number of local skeletons generated by any number of cameras in the camera network.

At box 920, whether the local skeleton matches a global skeleton that is currently being tracked is determined. For example, as is discussed above, body parts of a local skeleton may be compared to corresponding body parts of a global skeleton based on their respective appearances. If the body parts of the local skeleton and one of the global skeletons being tracked match to a sufficiently high degree of confidence, based on their respective positions and/or appearances, the local skeleton may be determined to correspond to the global skeleton. If the local skeleton matches one of the global skeletons then being tracked, to a sufficiently high degree of confidence, then the process advances to box 922, where the identifier of the local skeleton is associated with the master identifier of the global skeleton that has been matched to the local skeleton. Subsequently, where a record of the local skeleton including the identifier and positions and visual features of body parts of the local skeleton is received from the imaging device, positions and visual features of the body parts of the local skeleton may be associated with the global skeleton based on the identifier. At box 924, the global skeleton is updated based on the positions and/or the visual features of the local skeleton. Alternatively, or additionally, if the positions of the local skeleton correspond to predicted positions of a global skeleton that was previously (but not currently) being tracked, and the visual features of the local skeleton correspond to the visual features of the global skeleton that was previously being tracked, the previously tracked global skeleton may be updated based on the local skeleton, and tracked accordingly.

If the local skeleton does not sufficiently match any of the global skeletons then being tracked or, alternatively, previously tracked, then the process advances to box 930, where whether the local skeleton is then being tracked by two or more cameras is determined. For example, if the local skeleton does not correspond to a global skeleton then being tracked, but does correspond to a local skeleton generated by another imaging device, then the network tracking system may generate a global skeleton based on the two or more local skeletons. If the local skeleton does not match any other local skeletons generated by one or more other cameras, then the process advances to box 932, where the identifier and the pose of the local skeleton are stored in a record of unmatched local skeletons, e.g., in one or more data stores associated with the network tracking system.

If the local skeleton matches one or more other local skeletons generated by one or more other cameras, then the process advances to box 940, where a global skeleton is generated based on the positions and visual features of the body parts of each of the corresponding local skeletons. Any number of corresponding local skeletons may be considered when defining a global skeleton, and any number of global skeletons may be generated from two or more local skeletons.

At box 950, a master identifier is assigned to the global skeleton generated at box 940, and at box 960, each of the identifiers of corresponding local skeletons from which the global skeleton was generated is associated with the master identifier. Thus, when the imaging devices that generated the local skeletons provide data regarding the local skeletons (e.g., body part positions and/or visual features) to the server, along with identifiers of such local skeletons, the data may be associated with the global skeleton based on the identifiers.

After the global skeleton has been updated based on the positions and the visual features of the local skeleton at box 924, or after the identifier and the pose of the unmatched local skeleton have been stored in the record of unmatched local skeletons at box 932, or after each of the identifiers of the corresponding local skeletons has been associated with the master identifier of the global skeleton at box 960, the process advances to box 970, where whether the continued tracking within the monitored space is desired is determined. If the continued tracking within the monitored space is desired, then the process returns to box 910, where another record of an identifier, body part positions and visual features of a local skeleton generated from a digital image frame captured by a calibrated camera of a camera network is received at the network tracking system. The record may include identifiers, body part positions and visual features of one or more local skeletons that were previously generated and reported by the camera, or identifiers, body part positions and visual features of local skeletons that were neither previously generated nor previously reported by the camera. If the continued tracking within the monitored space is no longer desired, however, then the process ends.

As is discussed above, one or more implementations of the present disclosure enable a network tracking system or other central server to track the motion of actors within a scene based on local skeletons that are generated for such actors by two or more imaging devices. By relying on the imaging devices to independently detect such actors based on imaging data captured thereby, the network tracking system may track such actors more efficiently than if the network tracking system was required to process the imaging data and detect the actors itself.

Referring to FIGS. 10A through 10G, views of aspects of one system 1000 for real time tracking of actors using digital imagery in accordance with implementations of the present disclosure are shown. Except where otherwise noted, reference numerals preceded by the number "10" shown in FIGS. 10A through 10G indicate components or features that are similar to components or features having reference numerals preceded by the number "7" shown in FIGS. 7A through 7H, by the number "6" shown in FIGS. 6A through 6C, by the number "4" shown in FIGS. 4A through 4E, by the number "2" shown in FIG. 2A or 2B or by the number "1" shown in FIGS. 1A through 1N.

Figure 10A:
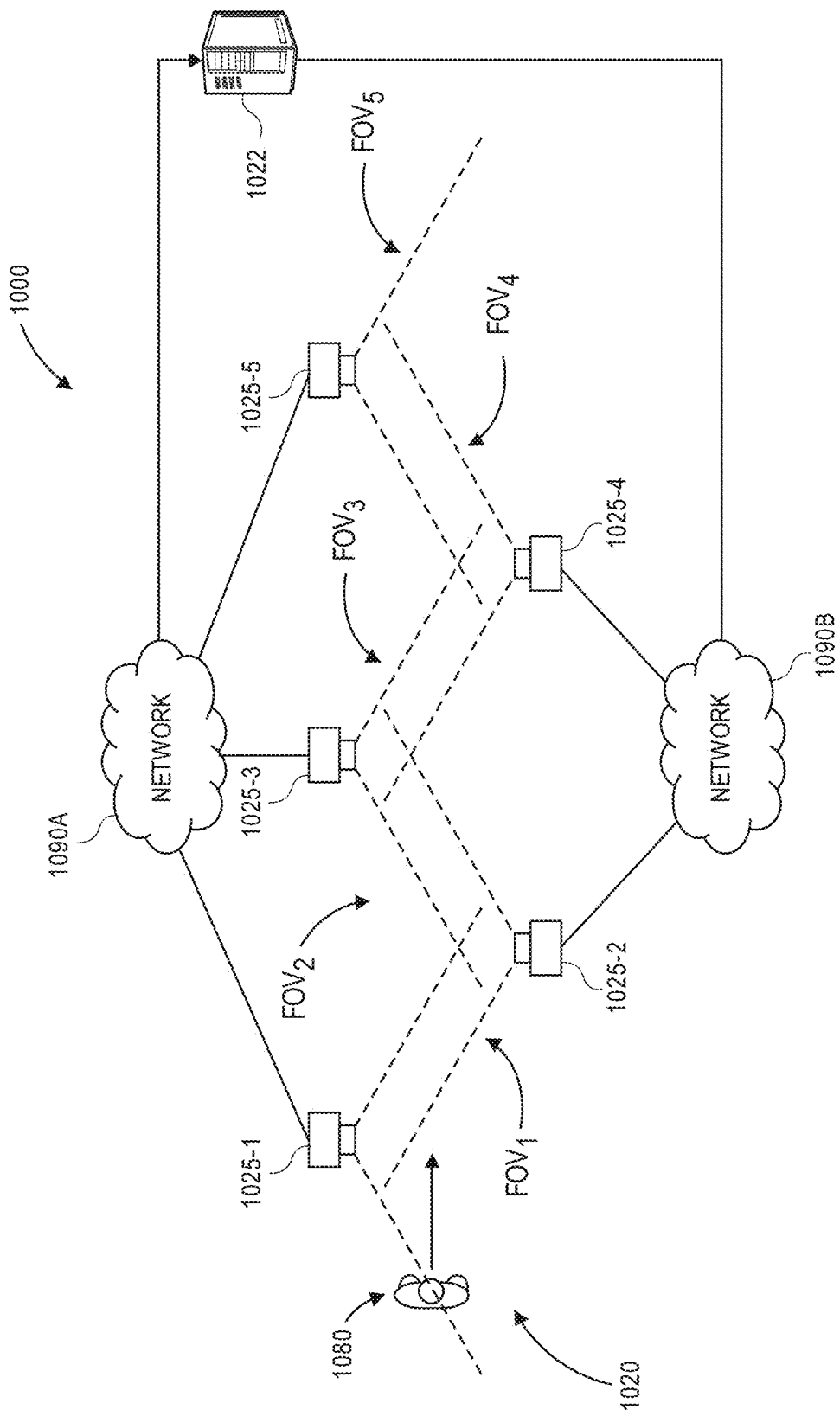

As is shown in FIG. 10A, the system 1000 includes a materials handling facility 1020 having a plurality of imaging devices 1025-1, 1025-2, 1025-3, 1025-4, 1025-5. Each of the imaging devices 1025-1, 1025-2, 1025-3, 1025-4, 1025-5 is aligned to capture imaging data from a corridor, a passageway or another element of the materials handling facility 1020, and is aligned with axes of orientation that are substantially transverse to (or normal to) an axis of orientation of the corridor, the passageway or the other element of the materials handling facility 1020. Moreover, the imaging devices 1025-1, 1025-2, 1025-3, 1025-4, 1025-5 have fields of view that overlap with one another, at least in part. For example, the field of view $FOV_1$ of the imaging device 1025-1 partially overlaps with the field of view $FOV_2$ of the imaging device 1025-2. The field of view $FOV_2$ of the imaging device 1025-2 partially overlaps with the fields of view $FOV_1$, $FOV_3$ of both the imaging device 1025-1 and the imaging device 1025-3. The field of view $FOV_3$ of the imaging device 1025-3 partially overlaps with the fields of view $FOV_2$, $FOV_4$ of both the imaging device 1025-2 and the imaging device 1025-4. The field of view $FOV_4$ of the imaging device 1025-4 partially overlaps with the fields of view $FOV_3$, $FOV_5$ of both the imaging device 1025-3 and the imaging device 1025-5. The field of view $FOV_5$ of the imaging device 1025-5 partially overlaps with the field of view $FOV_4$ of the imaging device 1025-4. Additionally, each of the imaging devices 1025-1, 1025-2, 1025-3, 1025-4, 1025-5 is connected to a server or other computer device by way of a network 1090A, 1090B. In some implementations, the network 1090A, 1090B may be aspects of the same network, and are shown as separate components for illustration purposes only. In some implementations, the network 1090A, 1090B may include an intranet or the Internet in whole or in part.

In accordance with some implementations of the present disclosure, the imaging devices 1025-1, 1025-2, 1025-3, 1025-4, 1025-5 may locally, and independently, detect the presence and motion of an actor 1080, or one or more other actors, within their respective fields of view $FOV_1$, $FOV_2$, $FOV_3$, $FOV_4$, $FOV_5$, based on imaging data captured thereby, and provide local skeletons or other information or data regarding the actor 1080 to the server 1022. In real time, or in near-real time, the server 1022 may be configured to generate a global skeleton 1076 representative of the presence and motion of the actor 1080 within the materials handling facility 1020 in three dimensions, based on the local skeletons or other information or data received from each of the imaging devices 1025-1, 1025-2, 1025-3, 1025-4, 1025-5.

Figure 10B:
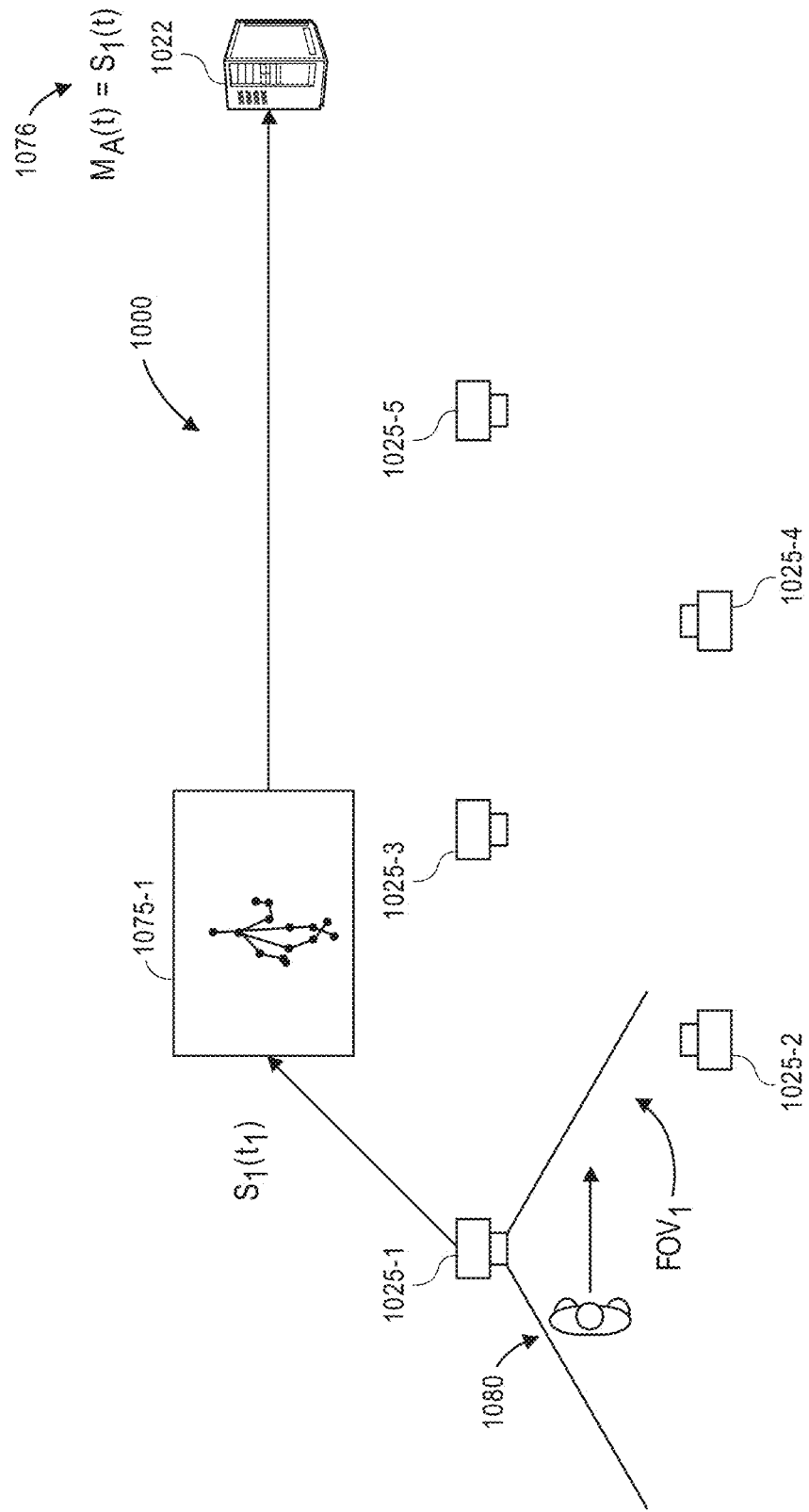

As is shown in FIG. 10B, when the actor 1080 appears within the field of view $FOV_1$ of the imaging device 1025-1 at a time $t_1$, the imaging device 1025-1 may process one or more images captured thereby to detect one or more body parts therein. For example, the imaging device 1025-1 may provide the images captured thereby as inputs to one or more classifiers operating thereon, and detect positions of one or more body parts within such images based on outputs received from the classifiers. The imaging device 1025-1 may further calculate positions of other body parts with respect to each of the body parts detected therein, e.g., by generating a vector field or regression map including one or more vectors extending from each of the body parts detected within such images. The imaging device 1025-1 may also determine visual features of pixels at each of the locations where body parts are detected, e.g., by one or more image segmentation, image filtering, image smoothing and/or image localization techniques. Such visual features may include but are not limited to color data, texture data, or any other relevant data regarding such pixels. A local skeleton 1075-1 representative of the motion of the actor 1080 within images captured by the imaging device 1025-1 may be generated accordingly, based on the positions and/or the visual features of the body parts determined from the images captured by the imaging device 1025-1, and an identifier $S_1$ may be assigned to the local skeleton 1075-1.

The imaging device 1025-1 may then provide the identifier $S_1$ and information or data regarding the positions and/or visual features of the respective body parts of the local skeleton 1075-1 at time $t_1$, or $S_1(t_1)$, to the server 1022, which may then associate the identifier $S_1$ of the local skeleton 1075-1 with a master identifier, $M_A$, of the master skeleton 1076. The global skeleton 1076 may be generated as a vector or function of time representative of the motion of the various body parts of the actor 1080 across the scene.

As is shown in FIG. 10C, when the actor 1080 appears within the fields of view $FOV_1$, $FOV_2$ of the imaging devices 1025-1, 1025-2 at a time $t_2$, each of the imaging devices 1025-1, 1025-2 may independently process one or more images captured thereby to detect one or more body parts therein, e.g., by providing the images as inputs to one or more classifiers operating thereon, and detecting positions of such body parts within such images based on outputs received from the classifiers. The imaging device 1025-1 may process the images that were captured thereby, independently and without input from the imaging device 1025-2, and vice versa. Each of the imaging devices 1025-1, 1025-2 may further independently calculate positions of other body parts with respect to each of the body parts detected therein, e.g., by generating a set of one or more vectors extending from each of the body parts detected therein. The imaging devices 1025-1, 1025-2 may also independently determine visual features of pixels at each of the locations where body parts are detected within the images captured thereby, including but not limited to color data, texture data, or any other relevant data regarding such pixels.

Based on the images captured by the imaging device 1025-1 at time $t_2$, the imaging device 1025-1 may update the local skeleton 1075-1 that was originally generated based on the images captured by the imaging device 1025-1 at time $t_1$. For example, the imaging device 1025-1 may match body parts that were detected within the images captured at time $t_2$ with the body parts that were detected within the images captured at time $t_1$, e.g., by matching the respective positions of such body parts, or by matching the visual appearances of such body parts, and may update the motion of the local skeleton 1075-1 accordingly. The imaging device 1025-1 may then provide information or data regarding the positions of the respective body parts of the local skeleton 1075-1 at time $t_2$, or $S_1(t_2)$, to the server 1022, which may then recognize the information or data regarding the positions and/or visual features of the body parts of the local skeleton 1075-1 as being associated with the global skeleton 1076 and/or the master identifier $M_A$ based on the identifier $S_1$.

Additionally, the imaging device 1025-2 may process one or more images captured thereby to detect one or more body parts within such images, e.g., by providing the images as inputs to one or more classifiers operating thereon, and detecting positions of such body parts within such images based on outputs received from the classifiers. In some implementations, the imaging device 1025-2 may execute the same classifiers, algorithms or techniques that were executed by the imaging device 1025-1, or may execute one or more other classifiers, algorithms or techniques. The imaging device 1025-2 may further calculate positions of other body parts with respect to each of the body parts detected within such images, e.g., by generating a set of one or more vectors extending from each of the body parts detected therein. The imaging device 1025-2 may also determine visual features of pixels at each of the locations where body parts are detected, including but not limited to color data, texture data, or any other relevant data regarding such pixels. A local skeleton 1075-2 representative of the motion of the actor 1080 within images captured by the imaging device 1025-2 may be generated accordingly, based on the positions and/or the visual features of the body parts determined from the images captured by the imaging device 1025-2, and an identifier $S_2$ may be assigned to the local skeleton 1075-2.

The imaging device 1025-2 may then provide information or data regarding the positions and/or visual features of the respective body parts of the local skeleton 1075-2 at time $t_2$, or $S_2(t_2)$, to the server 1022. Based on similarity between the positions and/or visual features of the respective body parts of the local skeleton 1075-1 at time $t_2$, as reported by the imaging device 1025-1, and the local skeleton 1075-2 at time $t_2$, as reported by the imaging device 1025-2, the server 1022 may determine that the local skeleton 1075-1 and the local skeleton 1075-2 correspond to a common actor, viz., the actor 1080. The server 1022 may then associate the identifier $S_2$ of the local skeleton 1075-2 with the master identifier $M_A$. Additionally, based on the information or data received from the imaging devices 1025-1, 1025-2 at time $t_2$, the server 1022 may update the global skeleton 1076 indicative of the motion of the actor 1080 in three-dimensional space at the materials handling facility 1020.

Figure 10D:
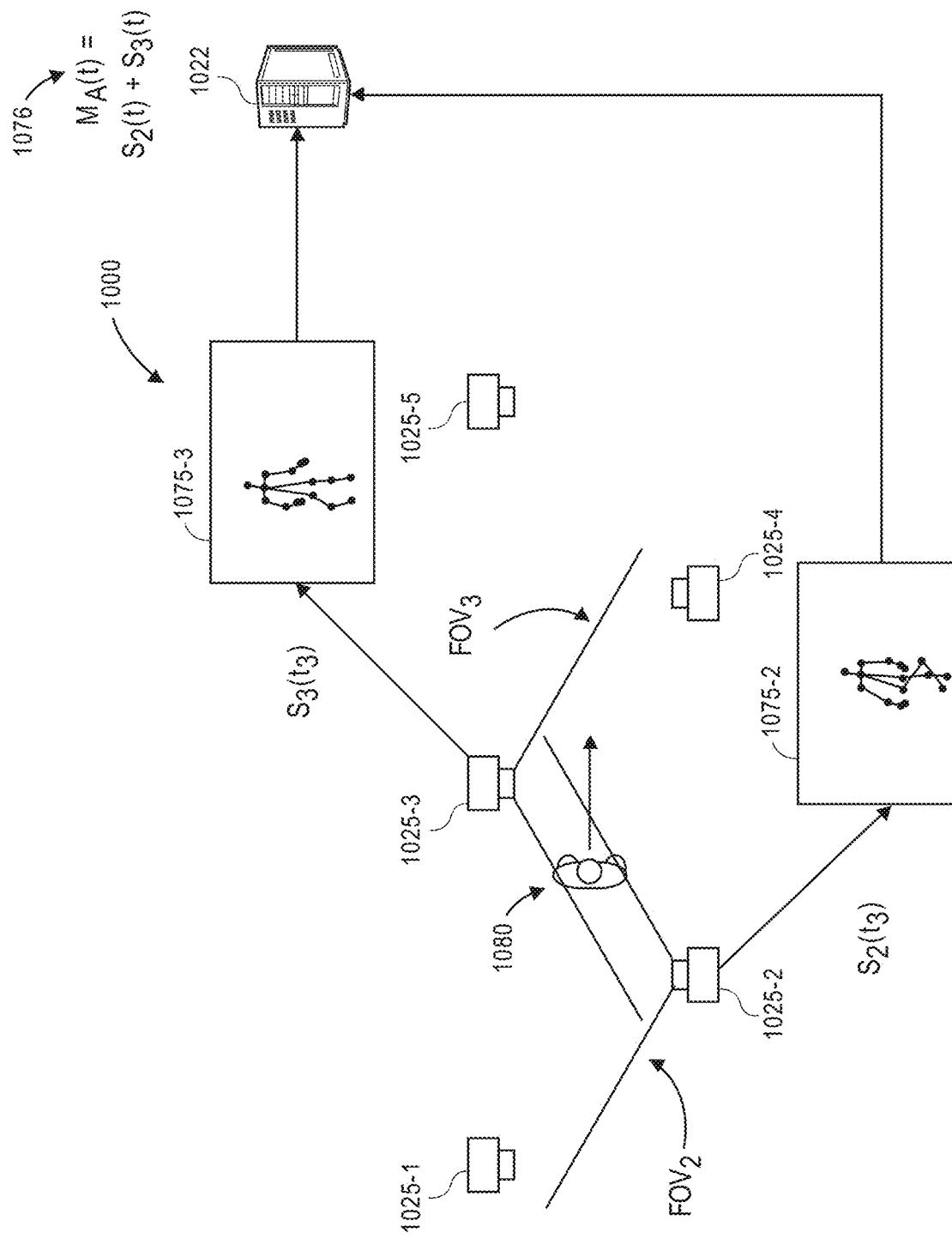

As is shown in FIG. 10D, the server 1022 may continue to track the actor 1080 within the materials handling facility 1020, even after the actor 1080 has departed the field of view $FOV_1$ of the imaging device 1025-1 that first detected the actor 1080 within images captured thereby. For example, when the actor 1080 appears within the fields of view $FOV_2$, $FOV_3$ of the imaging devices 1025-2, 1025-3 at a time $t_3$, each of the imaging devices 1025-2, 1025-3 may independently process one or more images captured thereby to detect one or more body parts therein, e.g., by providing the images as inputs to one or more classifiers operating thereon, and detecting positions of such body parts within such images based on outputs received from the classifiers. The imaging device 1025-2 may process the images that were captured thereby, independently and without input from the imaging device 1025-3, and vice versa. Each of the imaging devices 1025-2, 1025-3 may further independently calculate positions of other body parts with respect to each of the body parts detected therein, e.g., by generating a set of one or more vectors extending from each of the body parts detected therein. The imaging devices 1025-2, 1025-3 may also independently determine visual features of pixels at each of the locations where body parts are detected within the images captured thereby, including but not limited to color data, texture data, or any other relevant data regarding such pixels.

Based on the images captured by the imaging device 1025-2 at time $t_3$, the imaging device 1025-2 may update the local skeleton 1075-2 that was originally generated by the imaging device 1025-2 based on the images captured at time $t_2$. For example, the imaging device 1025-2 may match body parts that were detected within the images captured at time $t_2$ with the body parts that were detected within the images captured at time $t_1$, e.g., by matching the respective positions of such body parts, or by matching the visual appearances of such body parts, and may update the motion of the local skeleton 1075-2 accordingly. The imaging device 1025-2 may then provide information or data regarding the positions and visual features of the respective body parts of the skeleton 1075-2 at time $t_3$, or $S_2(t_3)$, to the server 1022, which may then recognize the information or data regarding the positions and/or visual features of the body parts of the local skeleton 1075-2 as being associated with the global skeleton 1076 and/or the master identifier $M_A$ based on the identifier $S_2$.

Additionally, the imaging device 1025-3 may process one or more images captured thereby to detect one or more body parts within such images, e.g., by providing the images as inputs to one or more classifiers operating thereon, and detecting positions of such body parts within such images based on outputs received from the classifiers. In some implementations, the imaging device 1025-3 may execute the same classifiers, algorithms or techniques that were executed by the imaging device 1025-2, or may execute one or more other classifiers, algorithms or techniques. The imaging device 1025-3 may further calculate positions of other body parts with respect to each of the body parts detected within such images, e.g., by generating a set of one or more vectors extending from each of the body parts detected therein. The imaging device 1025-3 may also determine visual features of pixels at each of the locations where body parts are detected, including but not limited to color data, texture data, or any other relevant data regarding such pixels. A local skeleton 1075-3 representative of the motion of the actor 1080 within images captured by the imaging device 1025-3 may be generated accordingly, based on the positions and/or the visual features of the body parts determined from the images captured by the imaging device 1025-3, and an identifier $S_3$ may be assigned to the local skeleton 1075-3 accordingly.

The imaging device 1025-3 may then provide information or data regarding the positions and/or visual features of the respective body parts of the local skeleton 1075-3 at time $t_3$, or $S_3(t_3)$, to the server 1022. Based on similarity between the positions and/or visual features of the respective body parts of the global skeleton 1076 at time $t_2$, or the local skeleton 1075-2 at time $t_3$, as reported by the imaging device 1025-2, and the skeleton 1075-3 at time $t_3$, as reported by the imaging device 1025-3, the server 1022 may determine that the local skeleton 1075-3 corresponds to the same actor, viz., the actor 1080, as the local skeleton 1075-1 and the local skeleton 1075-2. The server 1022 may then associate the identifier $S_3$ of the skeleton 1075-3 with the master identifier $M_A$. Additionally, based on the information or data received from the imaging devices 1025-2, 1025-3 at time $t_3$, the server 1022 may update the global skeleton 1076 indicative of the motion of the actor 1080 at the materials handling facility 1020.

Thus, the global skeleton 1076 that is associated with the master identifier $M_A$ and was originally generated for the actor 1080 based on imaging data captured by the imaging device 1025-1, may be continuously updated by the server 1022 based on imaging data captured by the imaging devices 1025-2, 1025-3, even after the actor 1080 has departed the field of view $FOV_1$ of the imaging device 1025-1. The tracking and updating of the global skeleton 1076 by the server 1022 may continue as long as the actor 1080 remains within at least one of the fields of view $FOV_1$, $FOV_2$, $FOV_3$, $FOV_4$, $FOV_5$ of one of the imaging devices 1025-1, 1025-2, 1025-3, 1025-4, 1025-5.

Figure 10E:
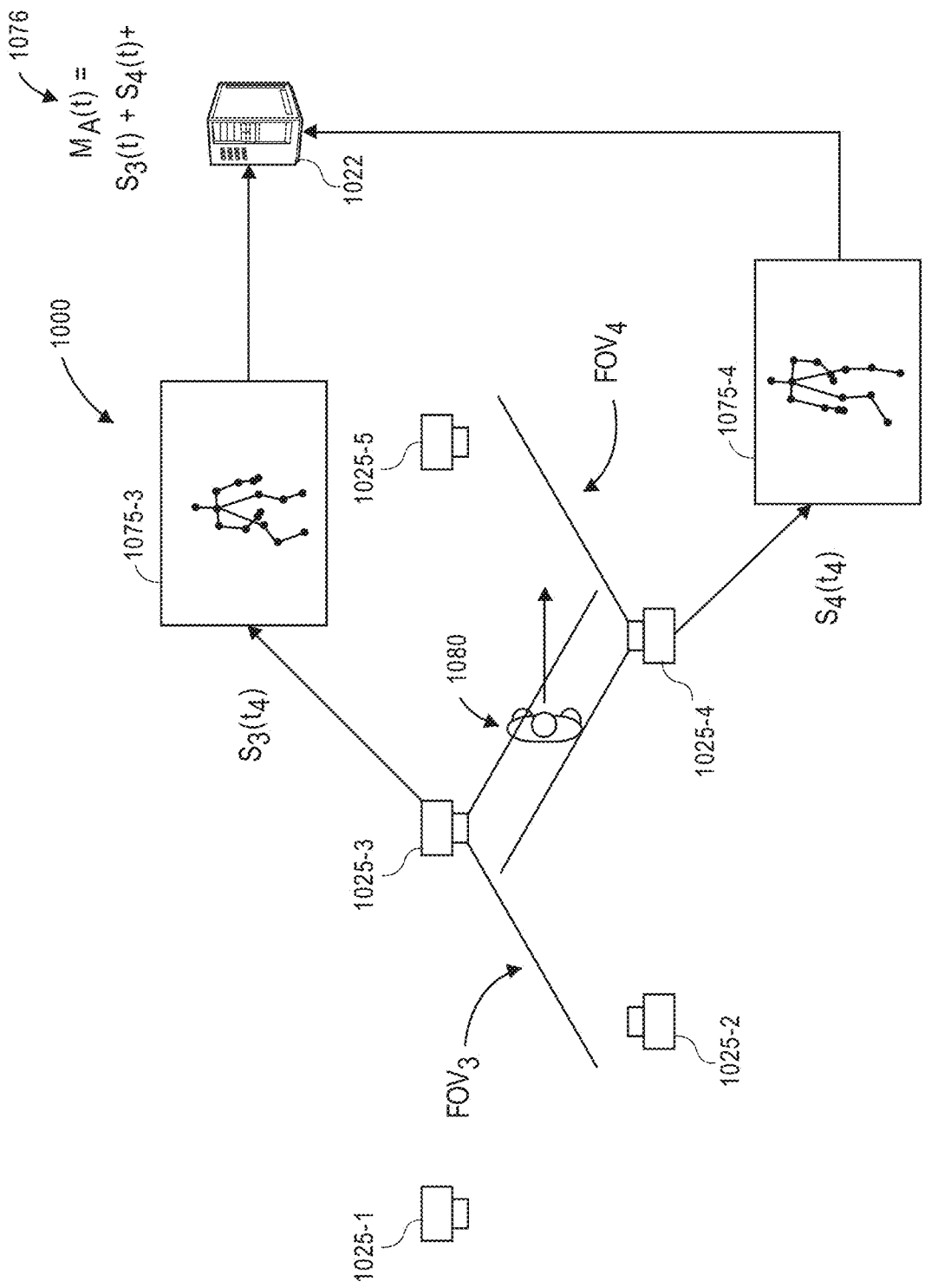

For example, as is shown in FIG. 10E, as of time $t_4$, the actor 1080 remains within the field of view $FOV_3$ of the imaging device 1025-3 but has departed the field of view $FOV_2$ of the imaging device 1025-2 and entered the field of view $FOV_4$ of the imaging device 1025-4. The imaging devices 1025-3, 1025-4 may process one or more images captured thereby to detect one or more body parts within such images, e.g., according to one or more classifiers, algorithms or techniques, and to determine visual features of such body parts within such images. The imaging device 1025-3 may then update the local skeleton 1075-3 based on the images captured thereby at time $t_4$, while the imaging device 1025-4 may generate a local skeleton 1075-4 based on the images captured thereby at time $t_4$, and assign an identifier $S_4$ to the local skeleton 1075-4 accordingly. The imaging devices 1025-3, 1025-4 may then provide information or data regarding the positions and/or visual features of the respective body parts of the local skeletons 1075-3, 1075-4 at time $t_4$, or $S_3(t_4)$ and $S_4(t_4)$, to the server 1022. Because the local skeleton 1075-3 is already associated with the global skeleton 1076, based on the identifier $S_3$, the server 1022 may update the global skeleton 1076 indicative of the motion of the actor 1080 at the materials handling facility 1020, based on the local skeleton 1075-3 at time $t_4$, or $S_3(t_4)$. Based on similarity between the positions and/or visual features of the respective body parts of the global skeleton 1076 at time $t_3$, or the local skeleton 1075-3 at time $t_4$, as reported by the imaging device 1025-3, and the local skeleton 1075-4 at time $t_4$, as reported by the imaging device 1025-4, the server 1022 may determine that the local skeleton 1075-4 corresponds to the same actor, viz., the actor 1080, as the global skeleton 1076 or the local skeletons 1075-1, 1075-2, 1075-3. The server 1022 may then associate the identifier $S_4$ of the skeleton 1075-4 with the master identifier $M_4$. Additionally, based on the information or data received from the imaging devices 1025-3, 1025-4 at time $t_4$, the server 1022 may update the global skeleton 1076 indicative of the motion of the actor 1080 at the materials handling facility 1020.

Figure 10F:
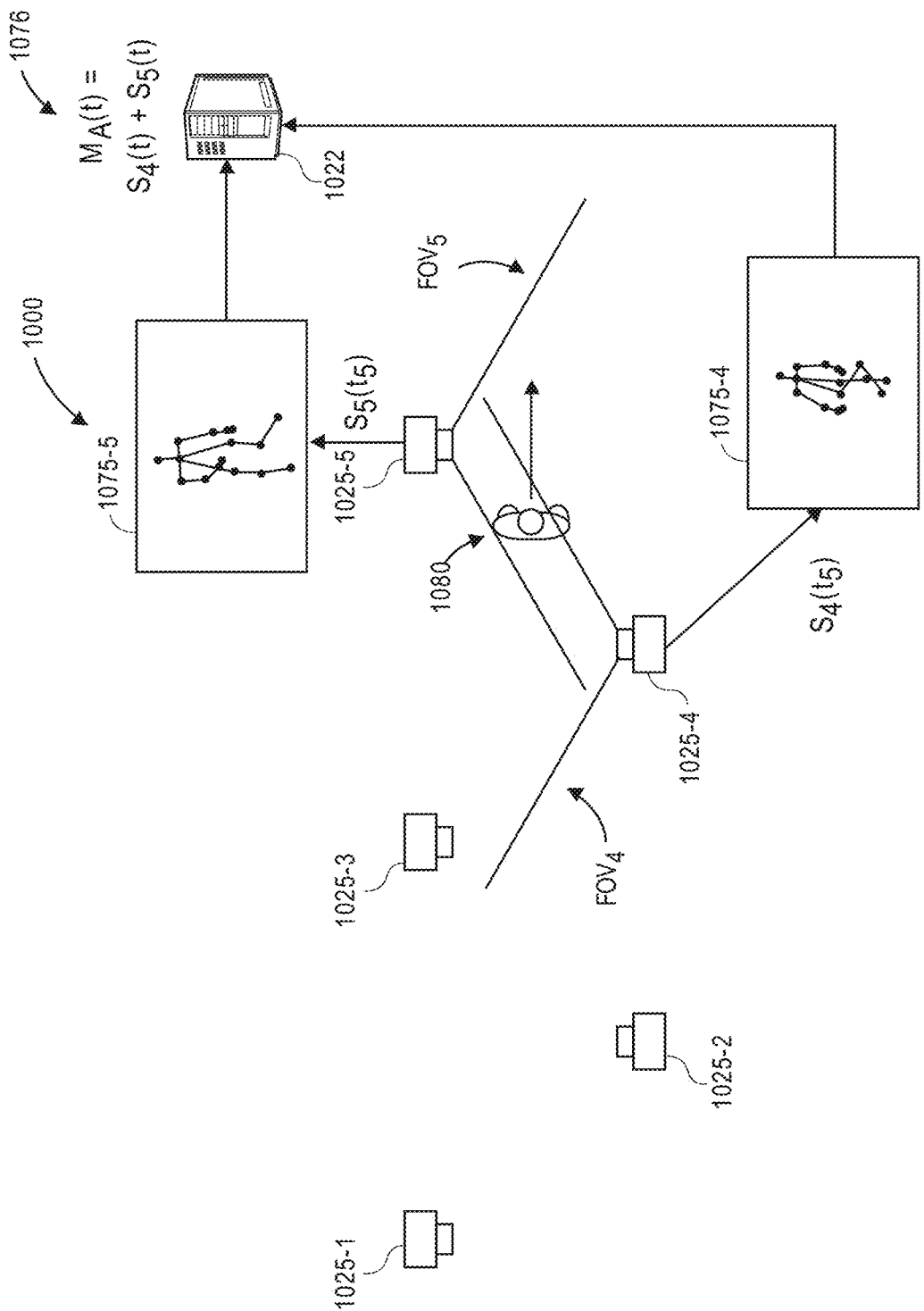

Similarly, as is shown in FIG. 10F, as of time $t_5$, the actor 1080 remains within the field of view $FOV_4$ of the imaging device 1025-4 but has departed the field of view $FOV_3$ of the imaging device 1025-3 and entered the field of view $FOV_5$ of the imaging device 1025-5. The imaging devices 1025-4, 1025-5 may process one or more images captured thereby to detect one or more body parts within such images, e.g., according to one or more classifiers, algorithms or techniques executed thereby, and to determine visual features of such body parts within such images. The imaging device 1025-4 may then update the local skeleton 1075-4 based on the images captured thereby at time $t_5$, while the imaging device 1025-5 may generate a local skeleton 1075-5 based on the images captured thereby at time $t_5$, and assign an identifier $S_5$ to the local skeleton 1075-5 accordingly. The imaging devices 1025-4, 1025-5 may then provide information or data regarding the positions and/or visual features of the respective body parts of the local skeletons 1075-4, 1075-5 at time $t_5$, or $S_4(t_5)$ and $S_5(t_5)$, to the server 1022. Because the local skeleton 1075-4 is already associated with the global skeleton 1076, based on the identifier $S_4$, the server 1022 may update the global skeleton 1076 indicative of the motion of the actor 1080 at the materials handling facility 1020, based on the local skeleton 1075-4 at time $t_5$, or $S_4(t_5)$. Based on similarity between the positions and/or visual features of the respective body parts of the global skeleton 1076 at time $t_4$, or the local skeleton 1075-4 at time $t_5$, as reported by the imaging device 1025-4, and the local skeleton 1075-5 at time $t_5$, as reported by the imaging device 1025-5, the server 1022 may determine that the local skeleton 1075-5 corresponds to the same actor, viz., the actor 1080, as the global skeleton 1076 or the local skeletons 1075-1, 1075-2, 1075-3, 1075-4. The server 1022 may then associate the identifier $S_5$ of the local skeleton 1075-5 with the master identifier $M_4$. Additionally, based on the information or data received from the imaging devices 1025-4, 1025-5 at time $t_5$, the server 1022 may update the global skeleton 1076 indicative of the motion of the actor 1080 at the materials handling facility 1020.

Figure 10G:
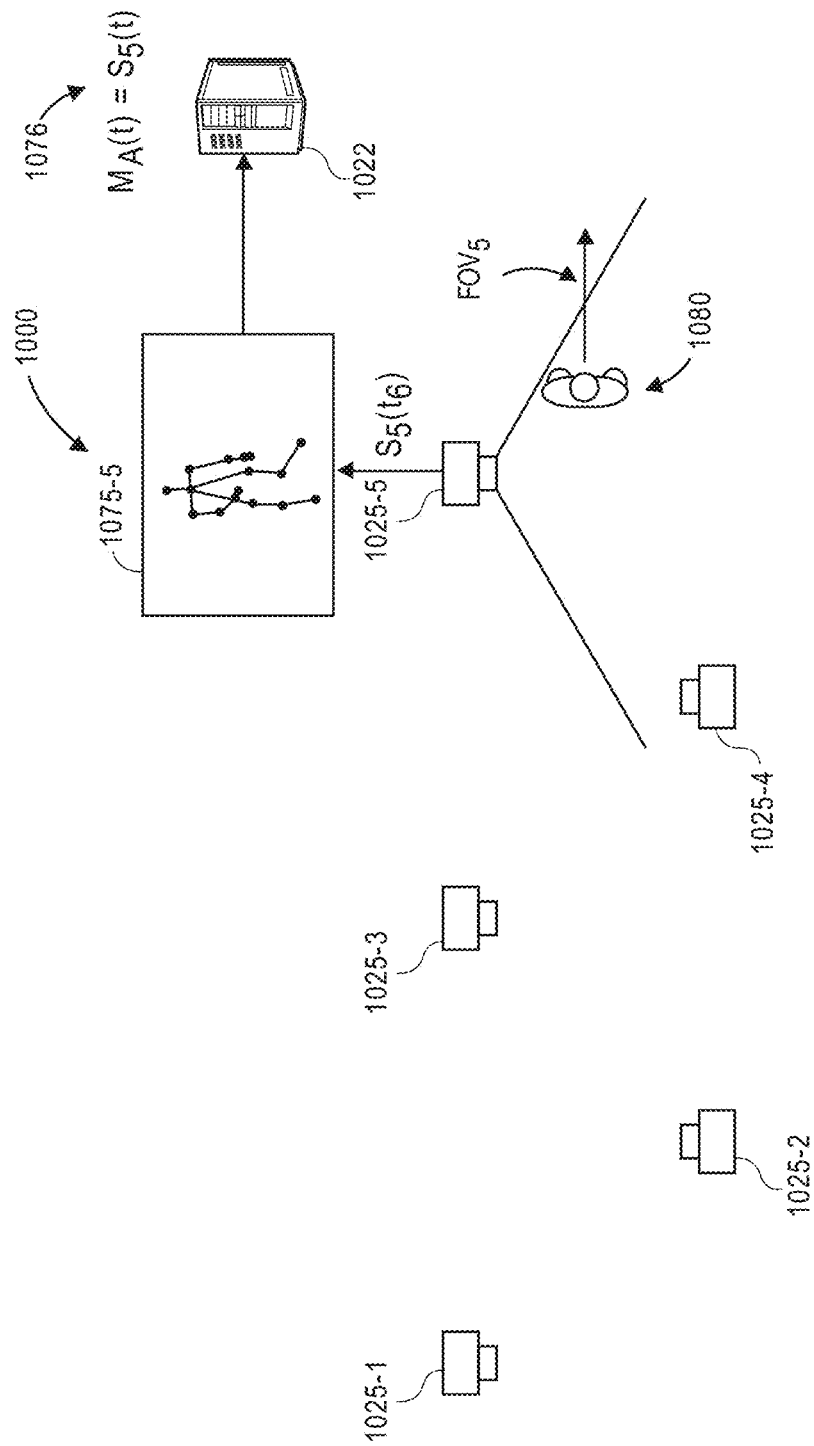

As is shown in FIG. 10G, as of time $t_6$, the actor 1080 remains within the field of view $FOV_5$ of the imaging device 1025-5 but has departed the field of view $FOV_4$ of the imaging device 1025-4. The imaging device 1025-5 may process one or more images captured thereby to detect one or more body parts within such images, e.g., according to one or more classifiers, algorithms or techniques executed thereby, and to determine visual features of such body parts within such images. The imaging device 1025-5 may then update the local skeleton 1075-5 based on the images captured thereby at time $t_6$, and provide information or data regarding the positions and/or visual features of the respective body parts of the local skeleton 1075-5 at time $t_6$, or $S_5(t_6)$, to the server 1022. Because the local skeleton 1075-5 is already associated with the global skeleton 1076, based on the identifier $S_5$, the server 1022 may update the global skeleton 1076 indicative of the motion of the actor 1080 at the materials handling facility 1020, based on the local skeleton 1075-5 at time $t_6$, or $S_5(t_6)$.

As is discussed above, one or more implementations of the present disclosure enable a network tracking system or other central server to track the motion of actors within a scene by generating global skeletons based on local skeletons that are generated for such actors by two or more imaging devices in a network. A network tracking system may continue to track a global skeleton representing motion of an actor on a scene, as long as local skeletons that are generated based on image frames depicting the actor are received from one or more imaging devices. Additionally, the network tracking system may maintain information or data regarding a global skeleton even after the last of the local skeletons is received from an imaging device. Subsequently, where information or data regarding a local skeleton (e.g., body part positions, an identifier, and/or visual features) is received by the network tracking system from an imaging device, the local skeleton may be compared to the global skeleton. If the local skeleton is determined to correspond to the global skeleton, the identifier of the local skeleton may be associated with the global skeleton, and the tracking of the global skeleton may resume.

Referring to FIGS. 11A through 11G, views of aspects of one system 1100 for real time tracking of actors using digital imagery in accordance with implementations of the present disclosure are shown. Except where otherwise noted, reference numerals preceded by the number "11" shown in FIGS. 11A through 11G indicate components or features that are similar to components or features having reference numerals preceded by the number "10" shown in FIGS. 10A through 10G, by the number "7" shown in FIGS. 7A through 7H, by the number "6" shown in FIGS. 6A through 6C, by the number "4" shown in FIGS. 4A through 4E, by the number "2" shown in FIG. 2A or 2B or by the number "1" shown in FIGS. 1A through 1N.

Figure 11A:
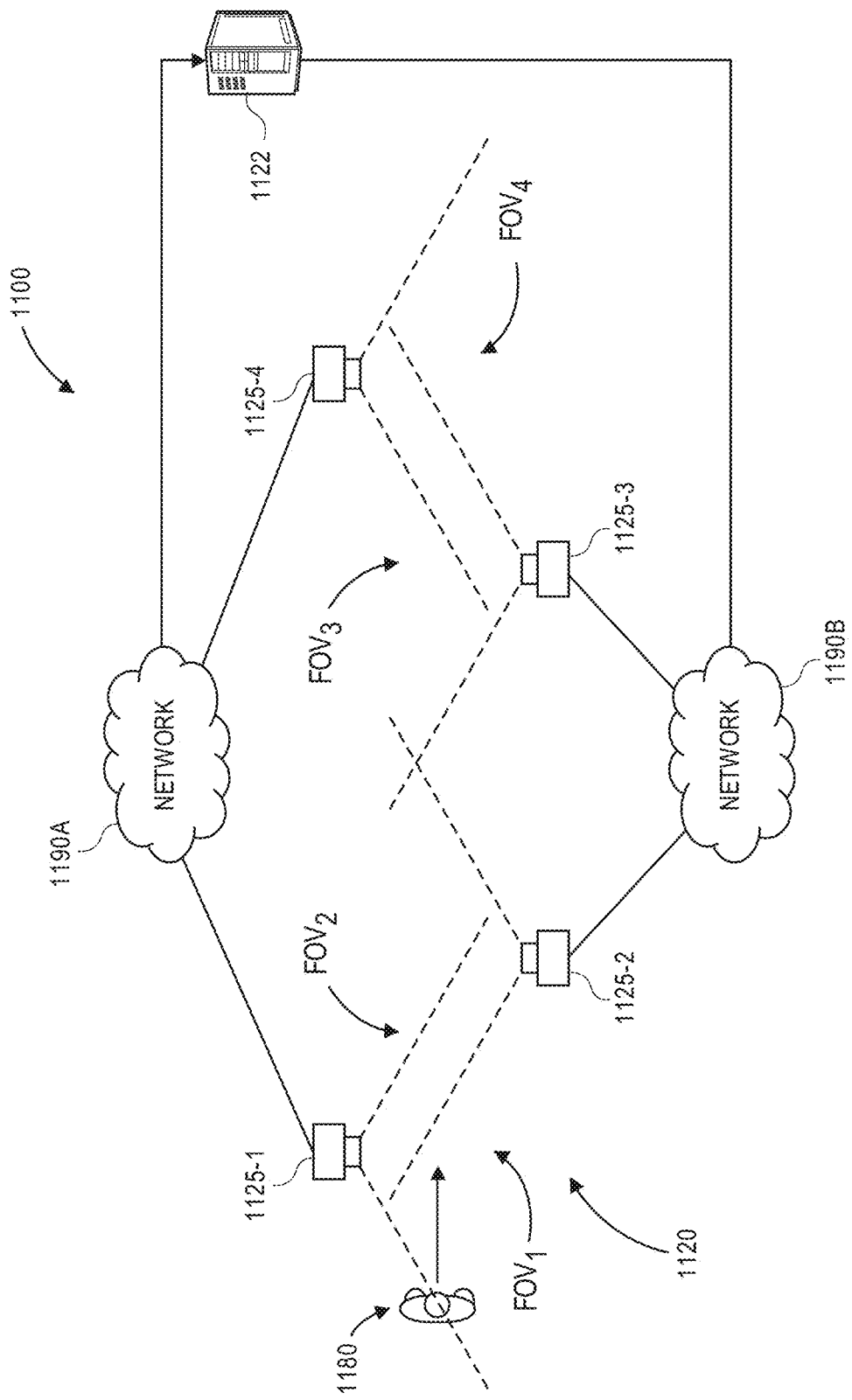
FIGS. 11A through 11G are views of aspects of one system for real time tracking of actors using digital imagery in accordance with implementations of the present disclosure.

As is shown in FIG. 11A, the system 1100 includes a materials handling facility 1120 having a plurality of imaging devices 1125-1, 1125-2, 1125-3, 1125-4. Each of the imaging devices 1125-1, 1125-2, 1125-3, 1125-4 is aligned to capture imaging data from a corridor, a passageway or another element of the materials handling facility 1120, and is aligned with axes of orientation that are substantially transverse to (or normal to) an axis of orientation of the corridor, the passageway or the other element of the materials handling facility 1120. Moreover, the imaging devices 1125-1, 1125-2, 1125-3, 1125-4 have fields of view that overlap with one another, at least in part. For example, the field of view $FOV_1$ of the imaging device 1125-1 partially overlaps with the field of view $FOV_2$ of the imaging device 1125-2. The field of view $FOV_3$ of the imaging device 1125-3 partially overlaps with the field of view $FOV_4$ of the imaging device 1125-4. Additionally, each of the imaging devices 1125-1, 1125-2, 1125-3, 1125-4 is connected to a server or other computer device by way of a network 1190A, 1190B. In some implementations, the network 1190A, 1190B may be aspects of the same network, and are shown as separate components for illustration purposes only. In some implementations, the network 1190A, 1190B may include an intranet or the Internet in whole or in part.

In accordance with some implementations of the present disclosure, the imaging devices 1125-1, 1125-2, 1125-3, 1125-4 may locally, and independently, detect the presence and motion of an actor 1180, or one or more other actors, within their respective fields of view $FOV_1$, $FOV_2$, $FOV_3$, $FOV_4$, based on imaging data captured thereby, and provide local skeletons or other information or data regarding the actor 1180 to the server 1122. In real time, or in near-real time, the server 1122 may be configured to generate a global skeleton 1176 representative of the presence and motion of the actor 1180 within the materials handling facility 1120 in three dimensions, based on the local skeletons or other information or data received from each of the imaging devices 1125-1, 1125-2, 1125-3, 1125-4.

Figure 11B:
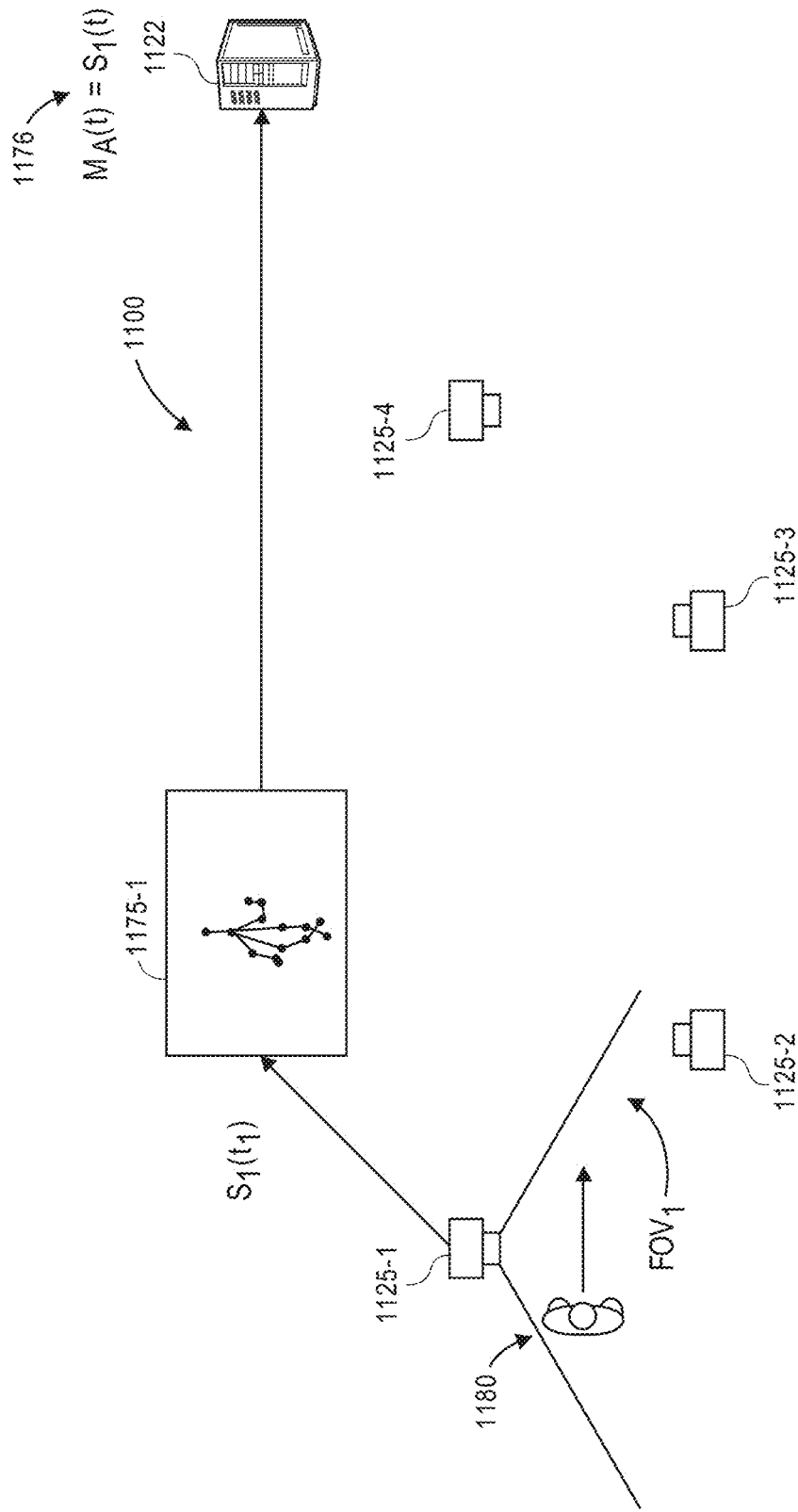

As is shown in FIG. 11B, when the actor 1180 appears within the field of view $FOV_1$ of the imaging device 1125-1 at a time $t_1$, the imaging device 1125-1 may process one or more images captured thereby to detect one or more body parts therein. For example, the imaging device 1125-1 may provide the images captured thereby as inputs to one or more classifiers operating thereon, and detect positions of one or more body parts within such images based on outputs received from the classifiers. The imaging device 1125-1 may further calculate positions of other body parts with respect to each of the body parts detected therein, e.g., by generating a vector field or regression map including one or more vectors extending from each of the body parts detected within such images. The imaging device 1125-1 may also determine visual features of pixels at each of the locations where body parts are detected, e.g., by one or more image segmentation, image filtering, image smoothing and/or image localization techniques. Such visual features may include but are not limited to color data, texture data, or any other relevant data regarding such pixels. A local skeleton 1175-1 representative of the motion of the actor 1180 within images captured by the imaging device 1125-1 may be generated accordingly, based on the positions and/or the visual features of the body parts determined from the images captured by the imaging device 1125-1, and an identifier $S_1$ may be assigned to the local skeleton 1175-1.

The imaging device 1125-1 may then provide the identifier $S_1$ and information or data regarding the positions and/or visual features of the respective body parts of the local skeleton 1175-1 at time $t_1$, or $S_1(t_1)$, to the server 1122, which may then associate the identifier $S_1$ of the local skeleton 1175-1 with a master identifier, $M_A$, of the global skeleton 1176. The global skeleton 1076 may be generated as a vector or function of time representative of the motion of the various body parts of the actor 1080 across the scene.

Figure 11C:
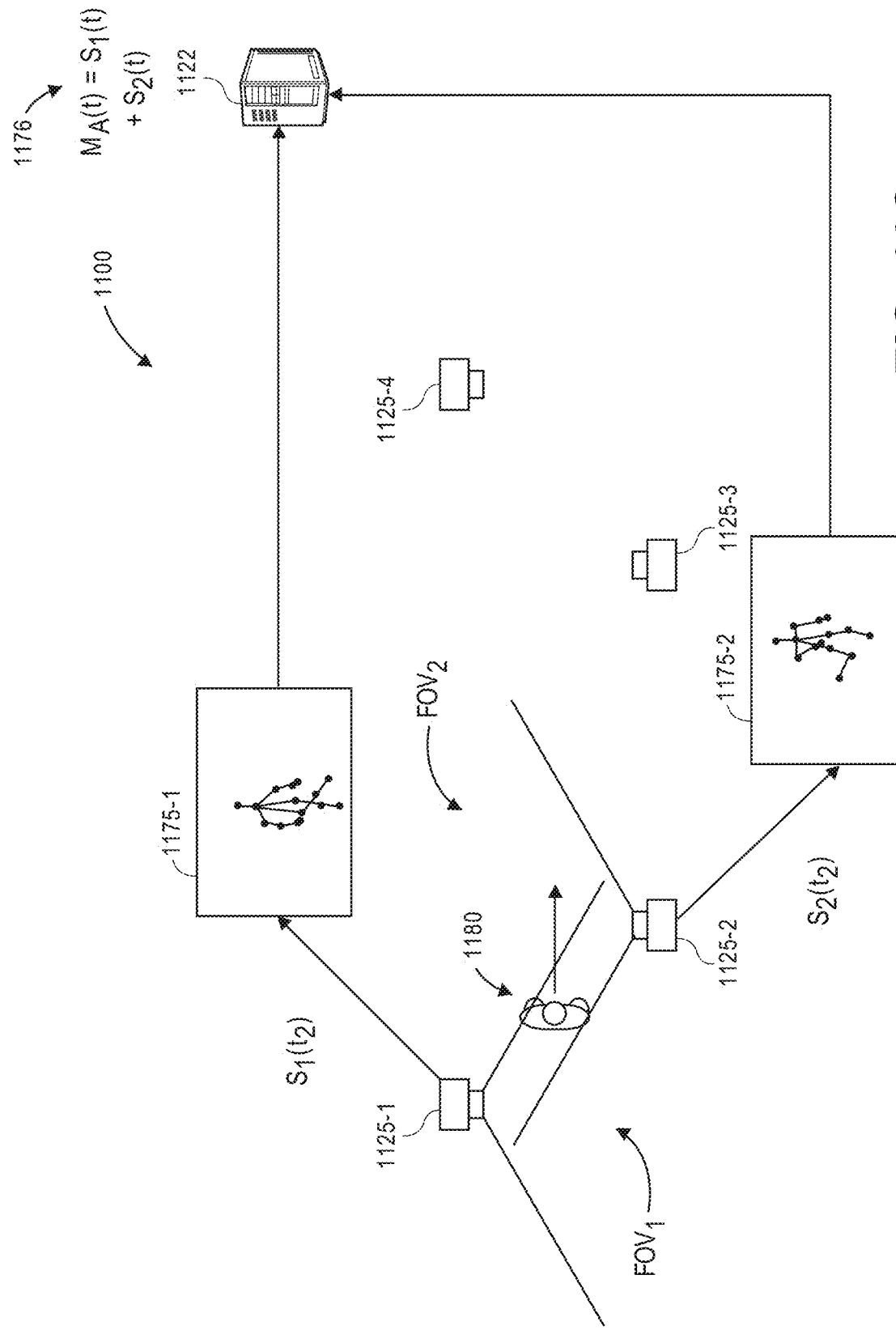

As is shown in FIG. 11C, when the actor 1180 appears within the fields of view $FOV_1$, $FOV_2$ of the imaging devices 1125-1, 1125-2 at a time $t_2$, each of the imaging devices 1125-1, 1125-2 may independently process one or more images captured thereby to detect one or more body parts therein, e.g., by providing the images as inputs to one or more classifiers operating thereon, and detecting positions of such body parts within such images based on outputs received from the classifiers. The imaging device 1125-1 may process the images that were captured thereby, independently and without input from the imaging device 1125-2, and vice versa. Each of the imaging devices 1125-1, 1125-2 may further independently calculate positions of other body parts with respect to each of the body parts detected therein, e.g., by generating a set of one or more vectors extending from each of the body parts detected therein. The imaging devices 1125-1, 1125-2 may also independently determine visual features of pixels at each of the locations where body parts are detected within the images captured thereby, including but not limited to color data, texture data, or any other relevant data regarding such pixels.

Based on the images captured by the imaging device 1125-1 at time $t_2$, the imaging device 1125-1 may update the local skeleton 1175-1 that was originally generated based on the images captured by the imaging device 1125-1 at time $t_1$. For example, the imaging device 1125-1 may match body parts that were detected within the images captured at time $t_2$ with the body parts that were detected within the images captured at time $t_1$, e.g., by matching the respective positions of such body parts, or by matching the visual appearances of such body parts, and may update the motion of the local skeleton 1175-1 accordingly. The imaging device 1125-1 may then provide information or data regarding the positions of the respective body parts of the local skeleton 1175-1 at time $t_2$, or $S_1(t_2)$, to the server 1122, which may then recognize the information or data regarding the positions and/or visual features of the body parts of the local skeleton 1175-1 as being associated with the global skeleton 1176 and/or the master identifier $M_A$ based on the identifier $S_1$.

Additionally, the imaging device 1125-2 may process one or more images captured thereby to detect one or more body parts within such images, e.g., by providing the images as inputs to one or more classifiers operating thereon, and detecting positions of such body parts within such images based on outputs received from the classifiers. In some implementations, the imaging device 1125-2 may execute the same classifiers, algorithms or techniques that were executed by the imaging device 1125-1, or may execute one or more other classifiers, algorithms or techniques. The imaging device 1125-2 may further calculate positions of other body parts with respect to each of the body parts detected within such images, e.g., by generating a set of one or more vectors extending from each of the body parts detected therein. The imaging device 1125-2 may also determine visual features of pixels at each of the locations where body parts are detected, including but not limited to color data, texture data, or any other relevant data regarding such pixels. A local skeleton 1175-2 representative of the motion of the actor 1180 within images captured by the imaging device 1125-2 may be generated accordingly, based on the positions and/or the visual features of the body parts determined from the images captured by the imaging device 1125-2, and an identifier $S_2$ may be assigned to the local skeleton 1175-2.

The imaging device 1125-2 may then provide information or data regarding the positions and/or visual features of the respective body parts of the local skeleton 1175-2 at time $t_2$, or $S_2(t_2)$, to the server 1122. Based on similarity between the positions and/or visual features of the respective body parts of the local skeleton 1175-1 at time $t_2$, as reported by the imaging device 1125-1, and the local skeleton 1175-2 at time $t_2$, as reported by the imaging device 1125-2, the server 1122 may determine that the local skeleton 1175-1 and the local skeleton 1175-2 correspond to a common actor, viz., the actor 1180. The server 1122 may then associate the identifier $S_2$ of the local skeleton 1175-2 with the master identifier $M_A$. Additionally, based on the information or data received from the imaging devices 1125-1, 1125-2 at time $t_2$, the server 1122 may update the global skeleton 1176 indicative of the motion of the actor 1180 in three-dimensional space at the materials handling facility 1120, and assign the master identifier $M_A$ to the global skeleton 1176.

Figure 11D:
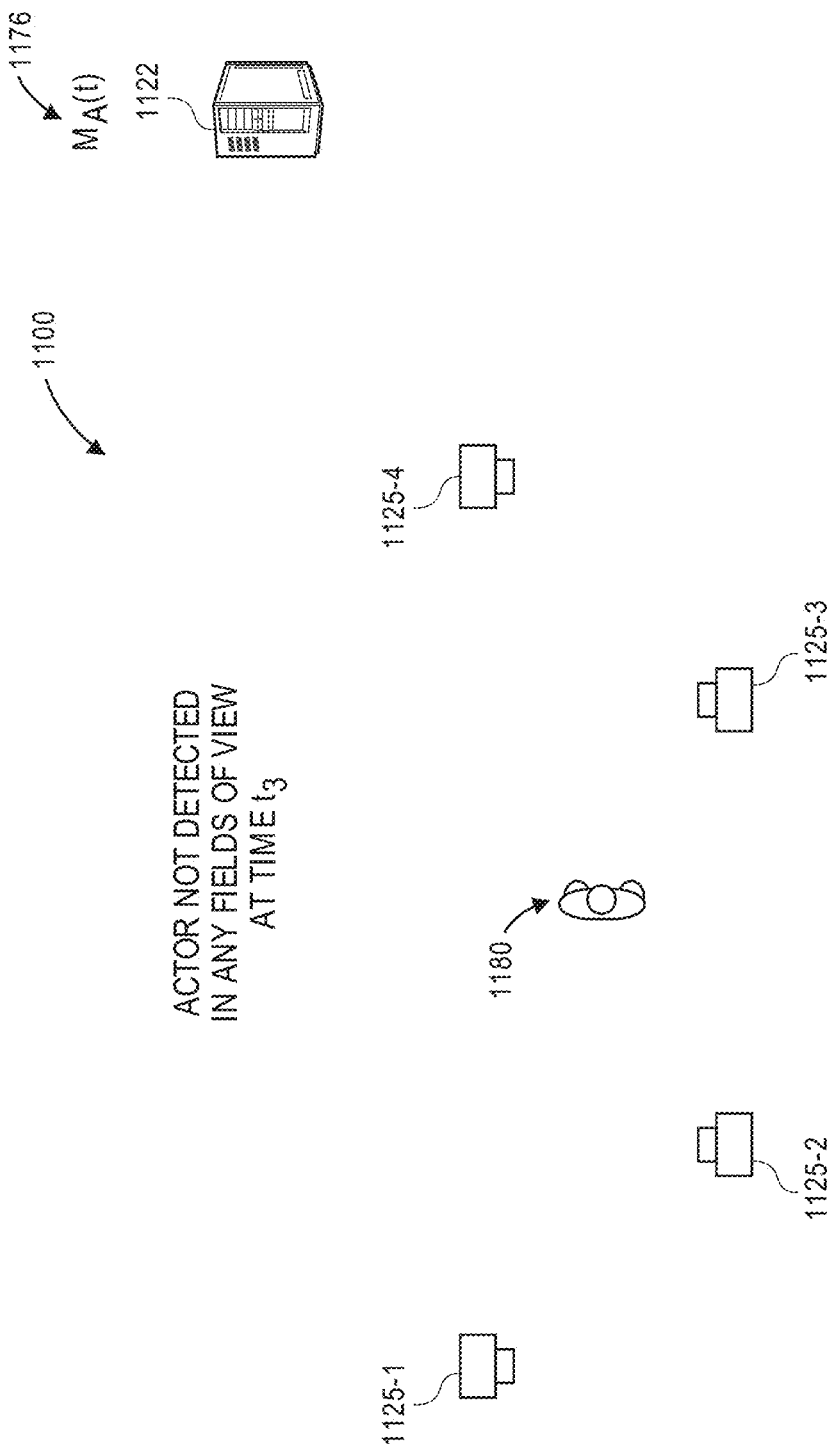

As is shown in FIG. 11D, the server 1122 may continue to track the actor 1180 within the materials handling facility 1120, even after the actor 1180 has departed the field of view $FOV_2$ of the imaging device 1125-2, and is no longer within the fields of view of any of the imaging devices 1125-1, 1125-2, 1125-3, 1125-4. Where the global skeleton 1176 has been generated as a vector or function representative of the motion of the actor 1180, positions of the body parts of the actor 1180 within the materials handling facility 1120 at a later time may be determined or predicted based on the global skeleton 1176. Thus, even though the actor 1180 is not within a field of view of any of the imaging devices 1125-1, 1125-2, 1125-3, 1125-4 at time $t_3$, the server 1122 may determine or predict a position of the actor 1180 at time $t_3$ based on the global skeleton 1176.

Figure 11E:
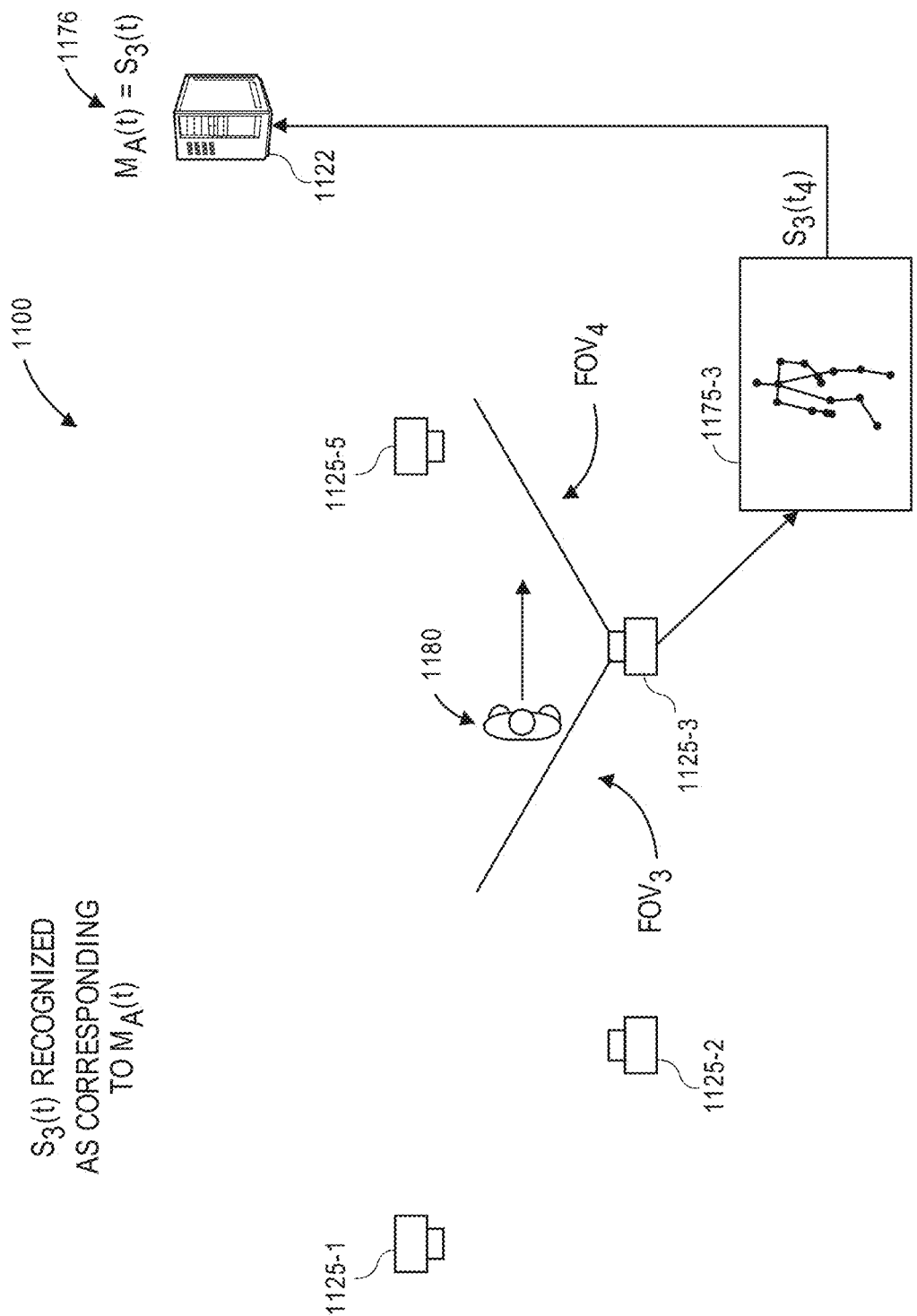

As is shown in FIG. 11E, as of time $t_4$, the actor 1180 enters the field of view $FOV_3$ of the imaging device 1125-3. The imaging devices 1125-3 may then process one or more images captured thereby to detect one or more body parts within such images, e.g., according to one or more classifiers, algorithms or techniques, and to determine visual features of such body parts within such images. The imaging device 1125-3 may generate a local skeleton 1175-3 based on the images captured thereby at time $t_4$, and an identifier $S_3$ may be assigned to the local skeleton 1175-3. The imaging device 1125-3 may then provide information or data regarding the positions and/or visual features of the respective body parts of the local skeleton 1175-3, or $S_3(t_4)$, to the server 1122. Based on similarity between the positions and/or visual features of the respective body parts of the local skeleton 1175-3 at time $t_4$, as reported by the imaging device 1125-3, and the predicted positions and the visual features of the body parts of the global skeleton 1176 at time $t_4$, the server 1122 may determine that the local skeleton 1175-3 corresponds to the global skeleton 1176. The server 1122 may then associate the identifier $S_3$ of the skeleton 1175-3 with the master identifier $M_A$, and may update the global skeleton 1176 indicative of the motion of the actor 1180 at the materials handling facility 1120 based on the positions and/or visual features of the local skeleton 1175-3 at time $t_4$.

Figure 11F:
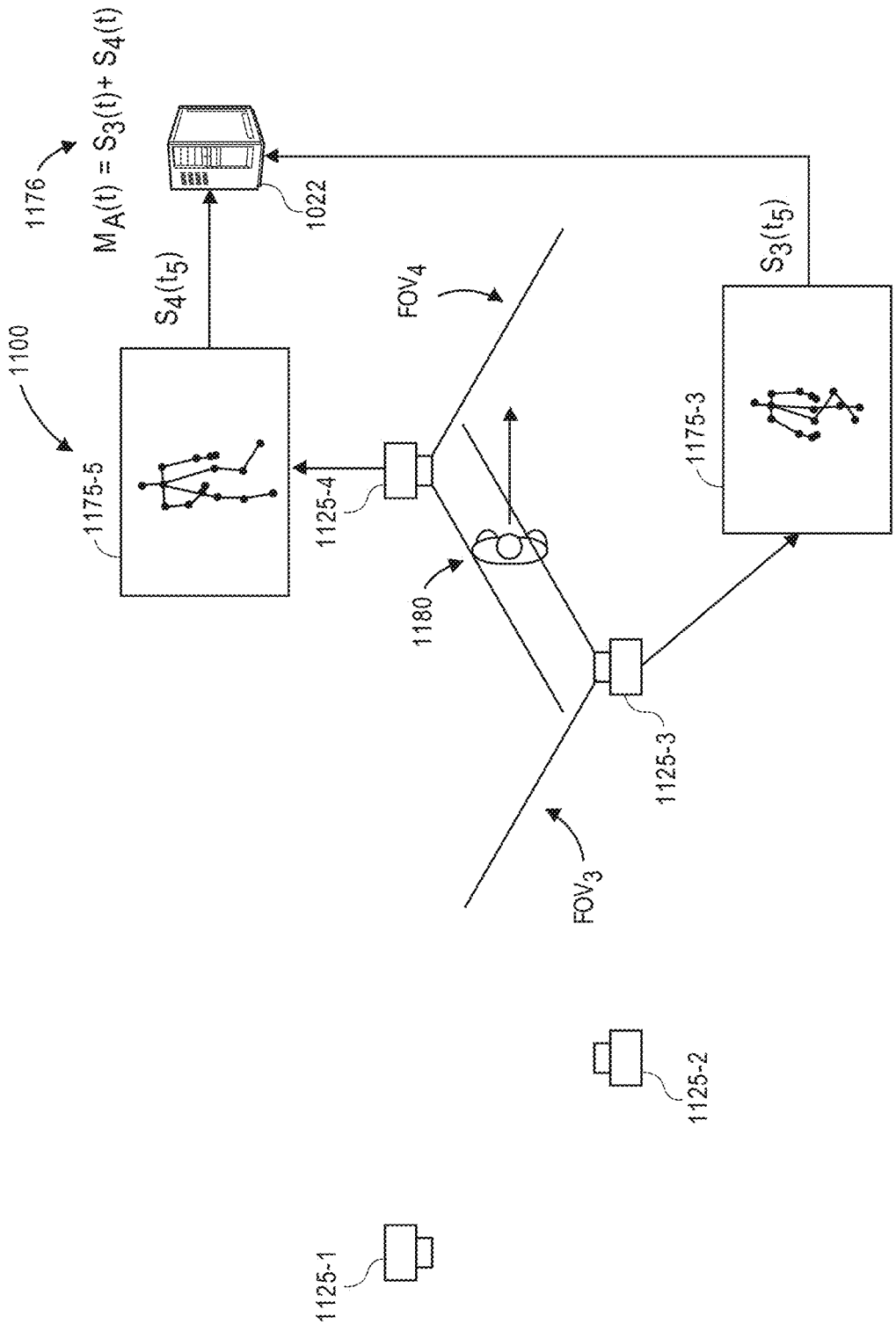

Similarly, as is shown in FIG. 11F, as of time $t_5$, the actor 1180 remains within the field of view $FOV_3$ of the imaging device 1125-3 and has entered the field of view $FOV_4$ of the imaging device 1125-4. The imaging devices 1125-3, 1125-4 may process one or more images captured thereby to detect one or more body parts within such images, e.g., according to one or more classifiers, algorithms or techniques executed thereby, and to determine visual features of such body parts within such images. The imaging device 1125-3 may then update the local skeleton 1175-3 based on the images captured thereby at time $t_5$, while the imaging device 1125-4 may generate a local skeleton 1175-4 based on the images captured thereby at time $t_5$, and assign an identifier $S_4$ to the local skeleton 1175-4 accordingly. The imaging devices 1125-3, 1125-4 may then provide information or data regarding the positions and/or visual features of the respective body parts of the local skeletons 1175-3, 1175-4 at time $t_5$, or $S_3(t_5)$ and $S_4(t_5)$, to the server 1122. Because the local skeleton 1175-3 is already associated with the global skeleton 1176, based on the identifier $S_3$, the server 1122 may update the global skeleton 1176 indicative of the motion of the actor 1180 at the materials handling facility 1120, based on the local skeleton 1175-4 at time $t_5$, or $S_4(t_5)$. Based on similarity between the positions and/or visual features of the global skeleton 1176 at time $t_4$, or the respective body parts of the local skeleton 1175-3 at time $t_5$, as reported by the imaging device 1125-3, and the global skeleton 1176 or the local skeleton 1175-4 at time $t_5$, as reported by the imaging device 1125-4, the server 1122 may determine that the local skeleton 1175-4 corresponds to the same actor, viz., the actor 1180, as the local skeletons 1175-1, 1175-2, 1175-3. The server 1122 may then associate the identifier $S_5$ of the local skeleton 1175-5 with the master identifier $M_A$ of the global skeleton 1176. Additionally, based on the information or data received from the imaging devices 1125-3, 1125-4 at time $t_5$, the server 1122 may update the global skeleton 1176 indicative of the motion of the actor 1180 at the materials handling facility 1120, that is associated with the master identifier $M_A$.

Figure 11G:
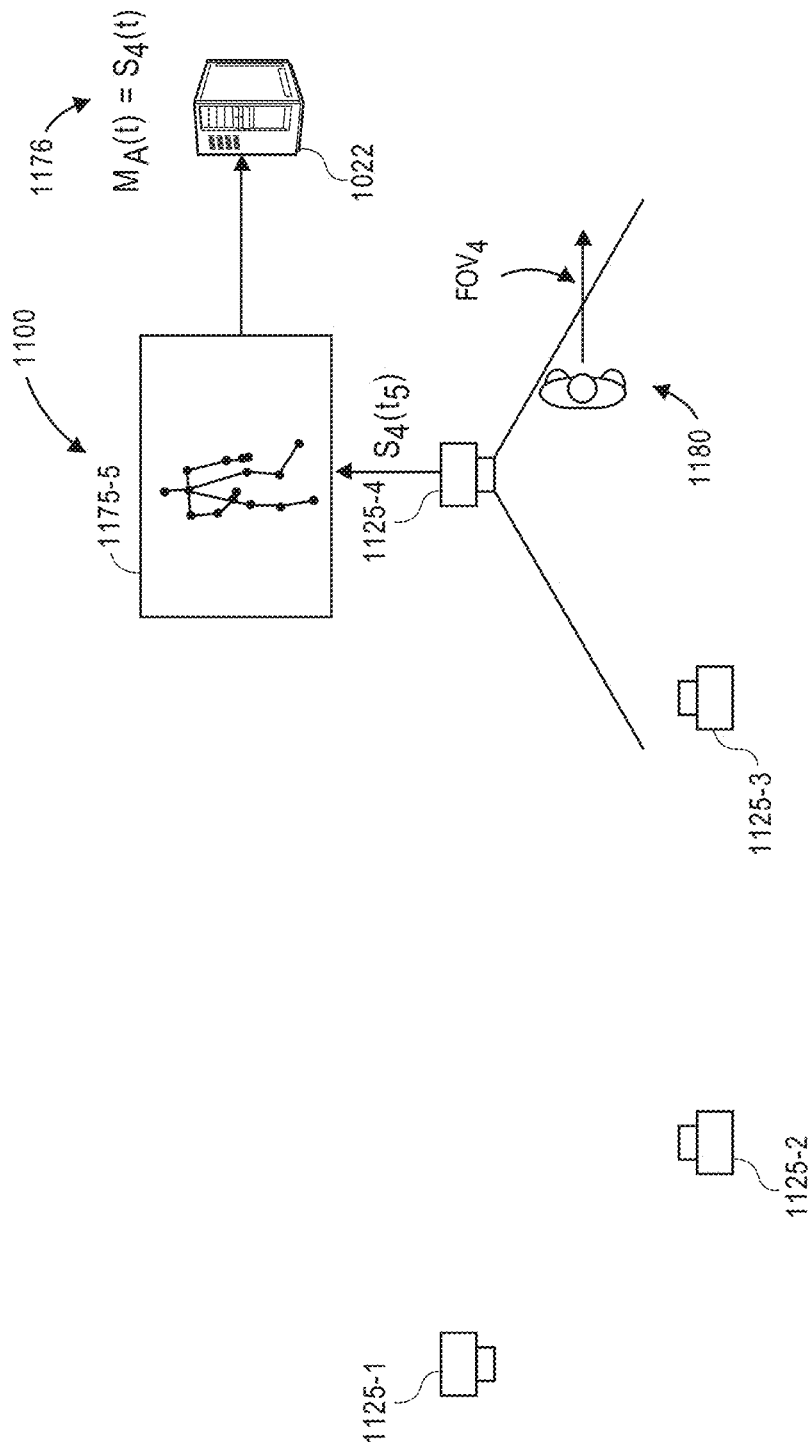

As is shown in FIG. 11G, as of time $t_6$, the actor 1180 remains within the field of view $FOV_4$ of the imaging device 1125-4 but has departed the field of view $FOV_3$ of the imaging device 1125-3. The imaging device 1125-4 may process one or more images captured thereby to detect one or more body parts within such images, e.g., according to one or more classifiers, algorithms or techniques executed thereby, and to determine visual features of such body parts within such images. The imaging device 1125-4 may then update the local skeleton 1175-4 based on the images captured thereby at time $t_6$, and provide information or data regarding the positions and/or visual features of the respective body parts of the local skeleton 1175-5 at time $t_6$, or $S_5(t_6)$, to the server 1122. Based on similarity between the positions and/or visual features of the global skeleton 1176 at time $t_4$, and the respective body parts of the local skeleton 1175-5 at time $t_6$, as reported by the imaging device 1125-5, the server 1122 may update the global skeleton 1076 indicative of the motion of the actor 1180 at the materials handling facility 1120, that is associated with the master identifier $M_A$.

Figure 12:
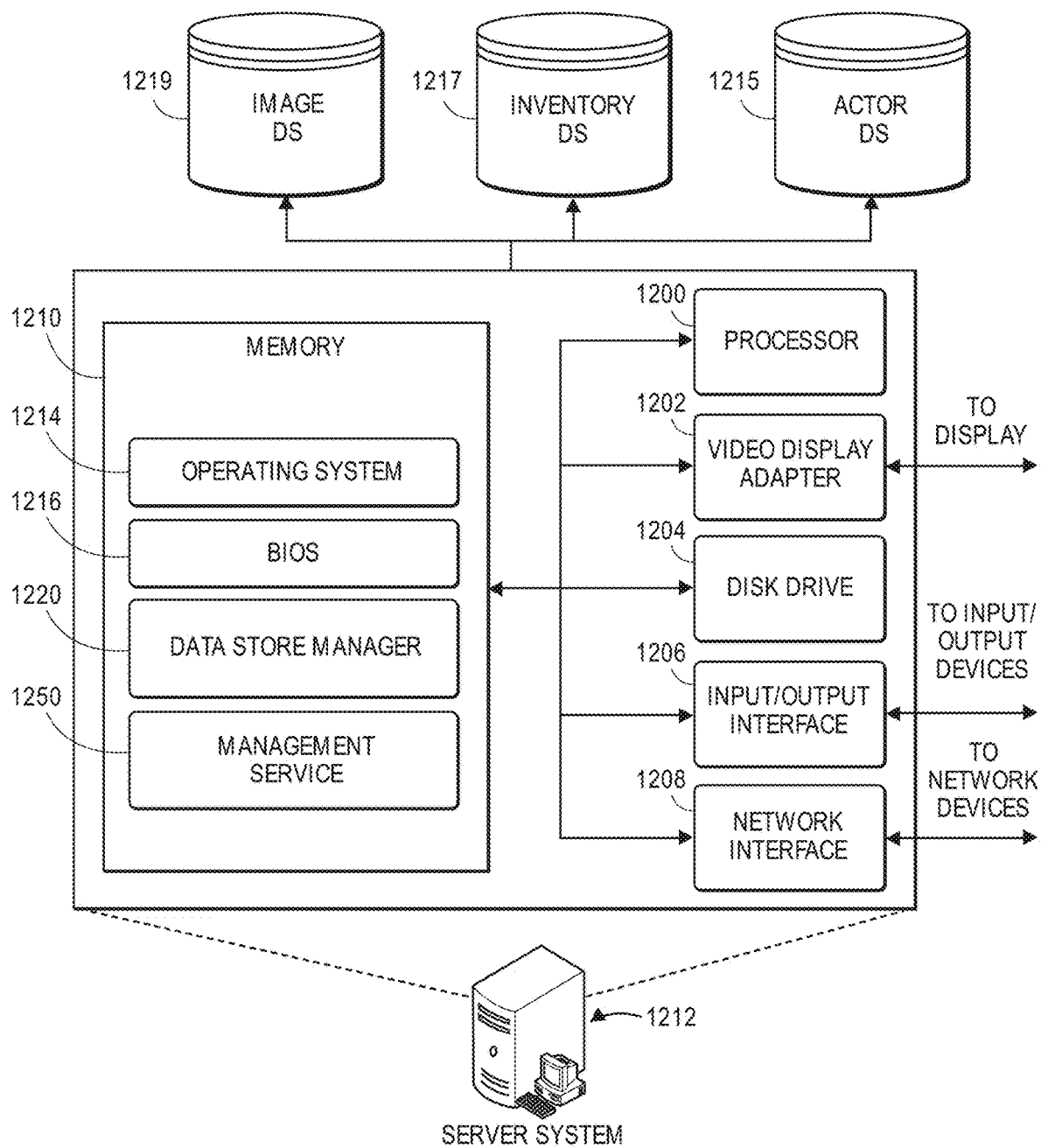
FIG. 12 is a block diagram of components of one system for associating events with actors based on digital imagery in accordance with implementations of the present disclosure.

Referring to FIG. 12, a block diagram of components of one system 1212 for associating events with actors based on digital imagery in accordance with implementations of the present disclosure is shown. The system 1212 is a server or other computer device configured for executing one or more of the functions or applications described herein, e.g., the server 112 shown in FIGS. 1K through 1N, the server 212 shown in FIG. 2A, the server 612 shown in FIG. 6A, the server 1112 shown in FIGS. 11A and 11B, the server 1312 shown in FIGS. 13A and 13B, or any of the other servers or other computer devices shown or described herein.

The server system 1212 may include a processor 1200, such as one or more redundant processors, a video display adapter 1202, a disk drive 1204, an input/output interface 1206, a network interface 1208, and a memory 1210. The processor 1200, the video display adapter 1202, the disk drive 1204, the input/output interface 1206, the network interface 1208, and the memory 1210 may be communicatively coupled to each other by a communication bus.

The video display adapter 1202 provides display signals to a local display permitting an operator of the server system 1212 to monitor and configure operation of the server system 1212. The input/output interface 1206 likewise communicates with external input/output devices, such as a mouse, keyboard, scanner, or other input and output devices that can be operated by an operator of the server system 1212. The network interface 1208 includes hardware, software, or any combination thereof, to communicate with other computing devices. For example, the network interface 1208 may be configured to provide communications between the server system 1212 and other computing devices via a network, such as the network shown in FIG. 12.

The memory 1210 generally comprises random access memory (RAM), read-only memory (ROM), flash memory, and/or other volatile or permanent memory. The memory 1210 is shown storing an operating system 1214 for controlling the operation of the server system 1212. A binary input/output system (BIOS) 1216 for controlling the low-level operation of the server system 1212 is also stored in the memory 1210.

The memory 1210 additionally stores program code and data for providing network services. The data store manager application 1220 facilitates data exchange between an actor data store 1215, an inventory data store 1217, and/or an image data store 1219. The actor data store 1215 may include any information or data regarding one or more actors within a materials handling facility, including but not limited to identities, images or avatars, prior browsing or purchasing histories, known or predicted personal preferences, family members, billing and/or shipping addresses, payment instrument information (e.g., credit card data), or the like. The inventory data store 1217 may include any type or form of information regarding inventory maintained at a materials handling facility, including numbers, types, categories, prices or sizes of items, locations at which such items are stored within the materials handling facility, points of origin for the items, or the like. The image data store 1219 may include any number of images of items that are maintained in inventory at the materials handling facility, including images that are cropped or otherwise adjusted, or varied in brightness or scale, as well as images of objects that are not maintained at the materials handling facility.

As used herein, the term "data store" may refer to any device or combination of devices capable of storing, accessing and retrieving data which may include any combination and number of data servers, databases, data storage devices and data storage media in any standard, distributed or clustered environment. The server system 1212 can include any appropriate hardware and software for integrating with the actor data store 1215, the inventory data store 1217 and/or the image data store 1219, as needed to execute one or more functions or aspects of the present disclosure.

The data stores 1215, 1217, and 1219 can include several separate data tables, databases or other data storage mechanisms and media for storing data relating to a particular aspect. For example, the data stores 1215, 1217, and 1219 illustrated include mechanisms for maintaining actor information, inventory information (e.g., item locations, images of item when properly positioned, depth map information for an item located on an inventory shelf, item features), image information, and the like.

It should be understood that there can be many other aspects that may be stored in the data stores 1215, 1217, and 1219. The data stores 1215, 1217, and 1219 are operable, through logic associated therewith, to receive instructions from the server system 1212 and obtain, update or otherwise process data in response thereto.

It will be appreciated by those of ordinary skill in the art that any number of servers or other computer systems could operate equally well with fewer components than are shown in FIG. 12, or a greater number of components than are shown in FIG. 12. Thus, the block diagram shown in FIG. 12 should be taken as being illustrative in nature and not limiting to the scope of the disclosure.

Although some of the implementations disclosed herein reference the detection and tracking of body parts of human actors, the systems and methods of the present disclosure are not so limited. For example, the systems and methods disclosed herein may be used to detect and track candidate body parts of any non-human animals, as well as candidate parts of any number of machines or robots, and are not limited to detecting and tracking humans. Furthermore, although some of the implementations disclosed herein reference detecting and tracking interactions with specific items in a commercial setting, e.g., within a materials handling facility such as a fulfillment center, the systems and methods of the present disclosure are likewise not so limited. Rather, the systems and methods disclosed herein may be utilized to detect and track actors within any type of commercial or non-commercial settings, such as the live filming of performances in a stadium or theater, where one or more of the implementations disclosed herein may be used to determine whether an athlete's poses or gestures are associated with man-to-man or zone defense, or are indicative of an injury.

Additionally, although some of the implementations described herein refer to the detection and tracking of body parts such as joints, the terms "body part" and "joint" may be deemed interchangeable as used herein. For example, although some of the implementations refer to heads or other body parts that are not commonly referred to as "joints," the systems and methods for recognizing, detecting and tracking "joints" may be equally applicable to the recognition, detection and tracking of heads, or any other body parts. Moreover, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

Although some of the implementations disclosed herein refer to the use of processors that are embedded or installed within imaging devices, e.g., within housings or other structures along with one or more lenses, sensors, photosensitive surfaces, filters, chips, electrodes, clocks, boards, timers or other components, the systems and methods disclosed herein are not so limited. Rather, any of the functions or operations that are described as being executed or performed by one or more processors of an imaging device may also be performed by one or more processors that are associated with an imaging device in any way, and are not limited to processors that are actually embedded or installed within such imaging devices.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Additionally, it should also be appreciated that the detailed description is set forth with reference to the accompanying figures. In the figures, the use of the same reference numbers in different figures indicates similar or identical items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Moreover, with respect to the one or more methods or processes of the present disclosure shown or described herein, including but not limited to the flow charts shown in FIGS. 3, 5A and 5B, 8, or 9A and 9B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system for tracking a subject in three-dimensional space, the system comprising:
 a processing system programmed to execute one or more sets of instructions, comprising:
  at least one set of instructions for receiving a plurality of synchronized sequences of images from a plurality of cameras, wherein each of the cameras has a respective field of view in three-dimensional space;
  at least one set of instructions for processing images in a first sequence of images in the plurality of synchronized sequences at a first time to identify features of the subject, wherein each of the features has first locations represented by positions in three-dimensional space;
  at least one set of instructions for processing images in a second sequence of images in the plurality of synchronized sequences at a second time to identify candidate features for matching with the features of the subject, wherein each of the candidate features has second locations represented by positions in three-dimensional space; and
  at least one set of instructions for tracking movement of the subject by matching the features of the subject from the first sequence of images with the candidate features of the subject from the second sequence of images and to updating the first locations of the features of the subject with the second locations of the candidate features, wherein the features comprise joints of a plurality of different types, and wherein the subject is represented by a set of candidate joints; and
  at least one set of instructions for updating the set of candidate joints representing the subject using the candidate features.

2. The system of claim 1, wherein the plurality of synchronized sequences includes a first set of sequences of images captured by a first camera and a second set of sequences of images captured by a second camera,
 wherein the first set of sequences includes at least the first sequence, and
 wherein the second set of sequences includes at least the second sequence.

3. The system of claim 2, wherein a field of view of the first camera does not overlap with a field of view of the second camera.

4. The system of claim 3, wherein the plurality of synchronized sequences includes at least a first set of sequences of images captured by a first camera and a second set of sequences of images captured by a second camera,
 wherein the first set of sequences includes at least the first sequence and the second sequence, and
 wherein the second set of sequences includes at least a third sequence and a fourth sequence.

5. The system of claim 4, wherein a field of view of the first camera overlaps with a field of view of the second camera.

6. The system of claim 4, wherein a field of view of the first camera does not overlap with a field of view of the second camera.

7. The system of claim 1, wherein the one or more sets of instructions further comprises:
 at least one set of instructions for determining distances between the features of the subject in the first sequence and the candidate features in the second sequence.

8. The system of claim 1, wherein the processing system is configured to execute one or more image recognition engines to identify the features of the subject, and
 wherein the one or more image recognition engines comprise a convolutional neural network.

9. The system of claim 1, wherein the candidate features comprise an ankle joint.

10. A method comprising:
    identifying features of at least a first subject, wherein the features have first locations represented by positions in three-dimensional space using data in a first set of sequences of images captured over a first period of time;
    identifying candidate features for matching with the features of the first subject, wherein the candidate features have second locations represented by positions in three-dimensional space using data in a second set of sequences of images captured over a second period of time;
    tracking movement of the first subject by matching the features of the first subject over the first period of time with the candidate features over the second period of time; and
    updating the first locations of features of the first subject with the second locations of the candidate features,
    wherein the features comprise joints of a plurality of different types,
    wherein the first subject is represented by a set of candidate joints, and
    wherein the set of candidate joints is updated using the candidate features.

11. The method of claim 10, wherein the first set of sequences of images includes at least a first sequence and a second sequence, and
    wherein the second set of sequences of images includes at least the second sequence and a third sequence not in the first set.

12. The method of claim 11, wherein a first field of view of a first camera that captured a first sequence in the first set of sequences of images does not overlap with a second field of view of a second camera that captured the third sequence in the second set of sequences of images.

13. The method of claim 10, wherein the first set of sequences of images includes at least a first sequence and a second sequence, and
    wherein the second set of sequences of images includes at least a third sequence and a fourth sequence not in the first set.

14. The method of claim 13, wherein the first sequence in the first set of sequences is captured by a first camera having a first field of view and the second sequence in the first set of sequences of images is captured by a second camera having a second field of view overlapping the first field of view.

15. The method of claim 13, wherein fields of view of cameras that captured each of the images in the first set of sequences of images do not overlap with any fields of view of cameras that captured each of the images in the second set of sequences of images.

16. The method of claim 10, further comprising:
    determining that at least some of the candidate features do not match to the features of the first subject; and
    identifying a second subject based at least in part on the at least some of the candidate features that do not match to the features of the first subject.

17. The method of claim 10, wherein the candidate features comprise an ankle joint.

18. A system for tracking subjects in three-dimensional space comprising:
    a processing system receiving a plurality of synchronized sequences of images captured by cameras with fields of view in the three-dimensional space, wherein the processing system is programmed with one or more sets of instructions that, when executed, cause the processing system to at least:
    process images in a first set of sequences of the plurality of synchronized sequences captured during a first period of time to generate at least a first set of joint data corresponding to a first subject, wherein the first set of joint data maps first locations of a plurality of joints of the first subject to positions in three-dimensional space at a first time;
    process images in a second set of sequences of the plurality of synchronized sequences captured during a second period of time to identify candidate joints having second locations represented by positions in three-dimensional space at a second time; and
    track movement of at least the first subject by matching at least some of the candidate joints having the second locations with joints having the first locations in the first set of joint data; and
    update the positions of the plurality of joints of the first subject in three-dimensional space at the second time based at least in part on the second locations at the second time.

19. The system of claim 18, wherein at least one sequence in the first set of sequences is captured by a first camera having a first field of view,
    wherein at least one sequence in the second set of sequences is captured by a second camera having a second field of view, and
    wherein the first field of view does not overlap the second field of view.

20. The system of claim 18, wherein the one or more sets of instructions, when executed, further cause the processing system to at least:
    process images in the second set of sequences of the plurality of synchronized sequences captured during the second period of time to identify candidate joints having third locations represented by positions in three-dimensional space at the second time;
    determine that the candidate joints having the third locations do not match the joints having the first locations; and
    in response to determining that the candidate joints having the third locations do not match the joints having the first locations,
        generate at least a second set of joint data corresponding to a second subject, wherein the second set of joint data maps the third locations of a plurality of joints of the second subject to positions in three-dimensional space at the second time.

* * * * *